(12) United States Patent
Sarioglu

(10) Patent No.: US 10,914,669 B2
(45) Date of Patent: Feb. 9, 2021

(54) ELECTRONIC SENSORS FOR MULTIPLEXED DETECTION OF PARTICLES ON MICROFLUIDIC CHIPS AND USES THEREOF

(71) Applicant: Georgia Tech Research Corporation, Atlanta, GA (US)

(72) Inventor: Ali Faith Sarioglu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 285 days.

(21) Appl. No.: 15/770,399

(22) PCT Filed: Oct. 21, 2016

(86) PCT No.: PCT/US2016/058299
§ 371 (c)(1),
(2) Date: Apr. 23, 2018

(87) PCT Pub. No.: WO2017/070602
PCT Pub. Date: Apr. 27, 2017

(65) Prior Publication Data
US 2019/0204204 A1    Jul. 4, 2019

Related U.S. Application Data

(60) Provisional application No. 62/405,508, filed on Oct. 7, 2016, provisional application No. 62/311,605, filed on Mar. 22, 2016, provisional application No. 62/244,918, filed on Oct. 22, 2015.

(51) Int. Cl.
*G01N 15/10*    (2006.01)
*B01L 3/00*    (2006.01)

(52) U.S. Cl.
CPC .... *G01N 15/1056* (2013.01); *B01L 3/502761* (2013.01); *G01N 15/1031* (2013.01); *B01L 2200/0652* (2013.01); *B01L 2200/143* (2013.01); *B01L 2300/0645* (2013.01); *B01L 2300/0816* (2013.01); *B01L 2300/0864* (2013.01); *G01N 2015/1006* (2013.01)

(58) Field of Classification Search
None
See application file for complete search history.

(56) References Cited

U.S. PATENT DOCUMENTS

| 5,854,684 | A   | * | 12/1998 | Stabile    | B01L 3/5085   |
|-----------|-----|---|---------|------------|---------------|
|           |     |   |         |            | 356/440       |
| 6,377,057 | B1  | * | 4/2002  | Borkholder | G01N 33/4836  |
|           |     |   |         |            | 324/447       |
| 2003/0155237 | A1 | * | 8/2003 | Surridge | C12Q 1/001    |
|           |     |   |         |            | 204/403.14    |
| 2005/0210962 | A1 |   | 9/2005 | Bohm et al. |              |
| 2006/0036416 | A1 |   | 2/2006 | Lee et al.  |              |

(Continued)

OTHER PUBLICATIONS

International Search Report for PCT/US2016/058299 dated Jan. 3, 2017.

*Primary Examiner* — Jill E Culler
(74) *Attorney, Agent, or Firm* — Thomas|Horstemeyer LLP

(57) ABSTRACT

Provided herein are coded fluid paths. Also provided herein are devices and systems containing one or more of the coded fluid paths. Also provided herein are methods of using the coded fluid paths, devices, and systems provided herein.

13 Claims, 87 Drawing Sheets

(56) References Cited

U.S. PATENT DOCUMENTS

2008/0024111 A1* 1/2008 Dorfmueller ...... G01N 15/0656
　　　　　　　　　　　　　　　　　　　　　324/71.4
2011/0279130 A1　11/2011　Reccius et al.
2014/0378352 A1　12/2014　Daridon

* cited by examiner

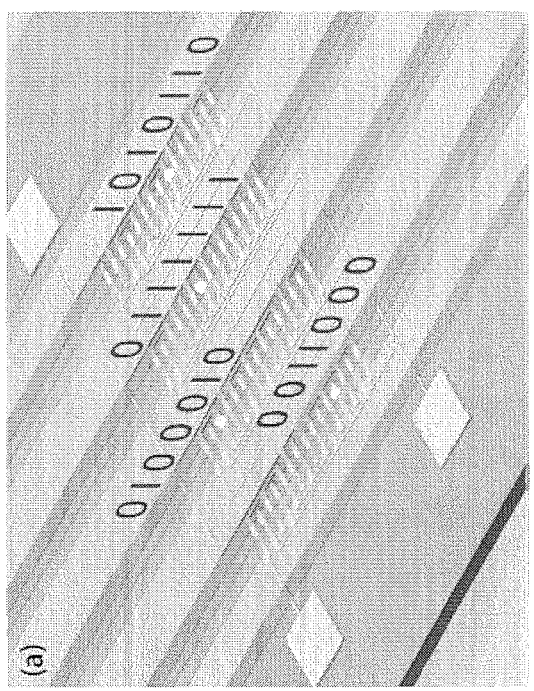
FIG. 1A
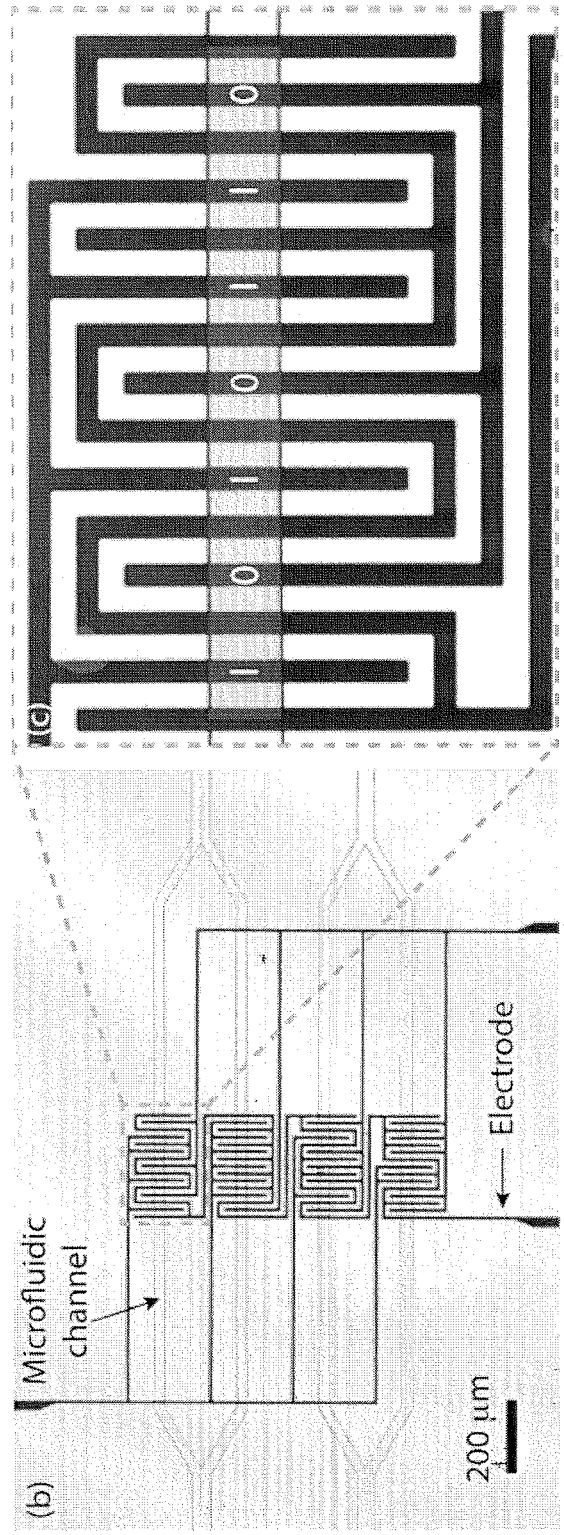
FIG. 1B
FIG. 1C

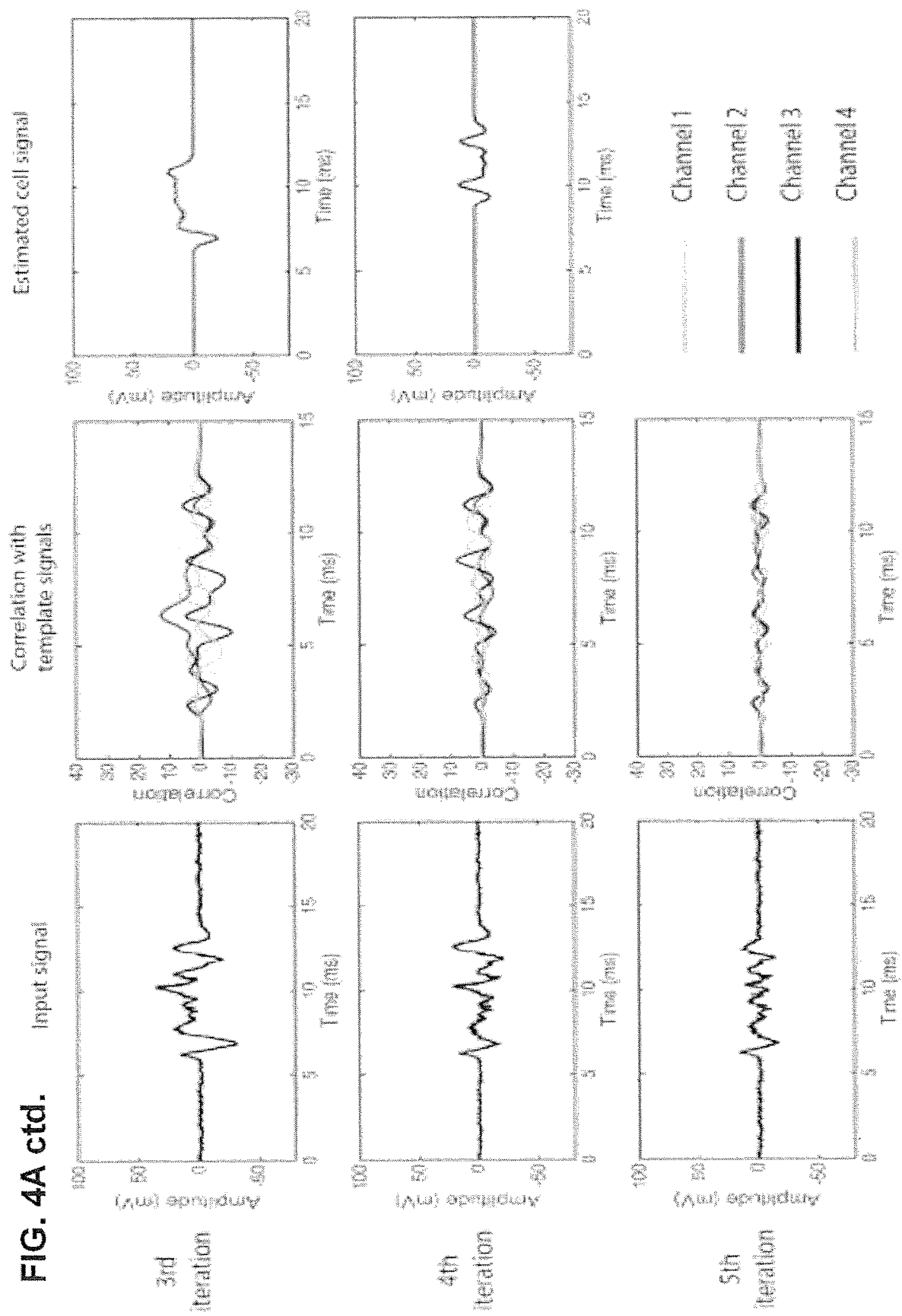
FIG. 4A ctd.

| Step | $q_0$ | $q_1$ | $q_2$ | $q_{out}$ |
|---|---|---|---|---|
| 0 | 0 | 0 | 1 | 1 |
| 1 | 1 | 0 | 0 | 0 |
| 2 | 0 | 1 | 0 | 0 |
| 3 | 1 | 0 | 1 | 1 |
| 4 | 1 | 1 | 0 | 0 |
| 5 | 1 | 1 | 1 | 1 |
| 6 | 0 | 1 | 1 | 1 |
| 7 | 0 | 0 | 1 | 1 |

1- Spin photoresist on silicon

2- Photolithograpy

3- Spin and cure PDMS

4- Demold

1- Spin photoresist on glass

2- Photolithograpy

3- E-beam deposition

4- Lift-off

Final device assembly

| Set 1 | Set 2 |
|-------|-------|
| 0 0 0 1 | 1 1 1 0 0 |
| 0 0 1 0 | 1 1 0 1 0 |
| 0 0 1 1 | 1 1 0 0 1 |
| 0 1 0 0 | 1 0 1 1 0 |
| 0 1 0 1 | 1 0 1 0 1 |
| 0 1 1 0 | 1 0 0 1 1 |
| 0 1 1 1 | 0 1 1 1 0 |
| 1 0 0 0 | 0 1 1 0 1 |
| 1 0 0 1 | 0 1 0 1 1 |
| 1 0 1 0 | 0 0 1 1 1 |

(c)

ELECTRONIC SENSORS FOR MULTIPLEXED DETECTION OF PARTICLES ON MICROFLUIDIC CHIPS AND USES THEREOF

CROSS-REFERENCE TO RELATED APPLICATIONS

This application is the 35 U.S.C. § 371 national stage application of PCT Application No. PCT/US2016/058299, filed Oct. 21, 2016, where the PCT claims the benefit of and priority to U.S. Provisional Patent Application No. 62/244,918, filed on Oct. 22, 2015, entitled "Electronic Sensor for Multiplexed Detection of Particles on Microfluidic Chips," U.S. Provisional Patent Application No. 62/311,605, filed on Mar. 22, 2016, entitled "Electronic Sensor for Multiplexed Detection of Particles on Microfluidic Chips," and U.S. Provisional Patent Application No. 62/405,508, filed on Oct. 7, 2016, entitled "Electronic Sensor for Multiplexed Detection of Particles on Microfluidic Chips," the contents of which are incorporated by reference herein in their entireties.

BACKGROUND

Numerous biophysical and biochemical assays rely on spatial manipulation of particles (e.g. cells, nucleic acids, bacteria, and viruses) as they are processed on lab-on-a-chip devices. Analysis of spatially distributed particles on these devices typically requires microscopy to interpret any results from a device, which negates the cost and size advantages of these chip based devices. As such there exists a need for improved fluidic devices that can maximize the potential of these chip based devices.

SUMMARY

Provide herein are devices comprising a coded fluid path, wherein the coded fluid path can contain a first sensor configured to generate an output code corresponding to the coded fluid path based upon a first sensed distortion in a fluid flowing along the coded fluid path over the electronic sensor. The first sensed distortion can be generated by a particle in the fluid flowing along the fluid path. The first sensor can contain a first electrode and a second electrode, wherein the first electrode and the second electrode can be coplanar, wherein the first electrode and the second electrode can each contain electrode fingers that are arranged across the coded fluid path, and wherein each finger of the electrode fingers are separated from any other finger by a distance greater than zero. The first electrode and the second electrode can be affixed on opposite sides of the coded fluid path. The first electronic sensor further can contain a third electrode, wherein the third electrode can be coplanar with the first electrode and the second electrode, and wherein the third electrode comprises electrode fingers that are arranged across the coded fluid path, and wherein each electrode finger is separated from any other electrode finger by a distance greater than zero. The third electrode fingers can be arranged between each first electrode finger and second electrode finger. The first electrode fingers and the second electrode fingers can be arranged across the coded fluid path in one or more pairs consisting of one first electrode finger and one second electrode finger. The first electrode fingers and the second electrode fingers can be arranged across the coded fluid path in one or more pairs consisting of one first electrode finger and two second electrode fingers. The first electrode fingers and the second electrode fingers can be arranged across the coded fluid path in one or more pairs consisting of two first electrode fingers and one second electrode finger. The distance between electrode fingers can be uniform. The distance between electrode fingers, in some embodiments, is not uniform. The distance between electrode fingers can be about the size of the particle being analyzed. In some embodiments, all of the electrode fingers are rectangular. In some embodiments, at least one of the electrode fingers can be rectangular. In some embodiments, at least one of the electrode fingers is not rectangular. In some embodiments, all of the electrode fingers are not rectangular. In some embodiments, all of the electrode fingers are uniform in width. In other embodiments, the electrode fingers are not uniform in width.

The device can further include a second sensor, wherein the second sensor is placed across the coded fluid path at a distance from the first electronic sensor, and wherein the second sensor is configured to generate an output based upon a second sensed distortion in a fluid flowing along the coded fluid path. The second sensor can be located up flow from the first sensor. The second sensor can be located down flow from the first sensor. The second sensed distortion can be generated by a particle in the fluid flowing along the fluid path. The fluid path in any of the embodiments provide herein can be a microchannel.

Also provided herein are embodiments of a device that can include a plurality of coded fluid paths, wherein each coded fluid path can contain a sensor configured to generate an output code based upon a first sensed distortion in a fluid flowing along the coded fluid path over the sensor, and wherein the output code can be different in each of the coded fluid paths. The sensed distortion is generated by a particle in the fluid flowing along the coded fluid path.

Also provided herein are embodiments of a device that can include a plurality of coded fluid paths, wherein each coded fluid path of the plurality of coded fluid paths can have at least two sensors, wherein each sensor can be configured to generate an output based upon a sensed distortion in the fluid flowing along the coded fluid path, wherein the distance between the at least two sensors can be different in each coded fluid paths of the plurality of coded fluid paths. The sensed distortion can be generated by a particle in the fluid flowing along the coded fluid path. The fluid path can be a microchannel.

Also provided herein are embodiments of a device having a plurality of coded fluid paths, wherein each coded fluid path of the plurality of coded fluid paths can have at least two sensors, wherein each sensor is configured to generate an output based upon a sensed distortion in the fluid flowing along the coded fluid path, wherein the size and/or shape of each of the least two sensors is different in each coded fluid path of the plurality of coded fluid paths. The sensed distortion can be generated by a particle in the fluid flowing along the coded fluid path. The coded fluid path can be a microchannel.

Also provided herein are embodiments of a device having a plurality of coded fluid paths, wherein each coded fluid path of the plurality of coded fluid paths can have at least two sensors, wherein each sensor can be configured to generate an output based upon a sensed distortion in the fluid flowing along the coded fluid path, wherein each coded fluid path of the plurality of coded fluid paths can have a shaped portion between the at least two sensors, and wherein the shaped portion has a different shape in each of the coded fluid paths. The sensed distortion can be generated by a particle in the fluid flowing along the coded fluid path. The coded fluid path can be a microchannel.

Also provided herein are embodiments of a device having a plurality of sensors; and a plurality of coded fluid paths, wherein the coded fluid paths can be passed over the plurality of sensors in pattern, and wherein the pattern of each of the coded fluid paths in the plurality of coded fluid paths is different for each of coded fluid paths. The sensed distortion can be generated by a particle in the fluid flowing along the coded fluid path. The coded fluid path can be a microchannel.

Also provided herein are embodiments of a method that can include the steps of applying a fluid sample to a device as provided herein, moving the sample through the coded fluid path, collecting output signals produced by the coded fluid path; and determining the presence of a particle in a fluid sample in the coded fluid path.

BRIEF DESCRIPTION OF THE DRAWINGS

Further aspects of the present disclosure will be readily appreciated upon review of the detailed description of its various embodiments, described below, when taken in conjunction with the accompanying drawings.

FIGS. 1A-1C demonstrate one embodiment of a design of coded microfluidic channels. FIG. 1A shows a schematic to demonstrate generation of orthogonal digital spreading codes as particles flow over coding surface electrodes. FIG. 1B shows an image of the fabricated device showing coding electrodes on a glass substrate aligned with PDMS microfluidic channels. FIG. 1C shows a close-up of coding electrodes designed to generate the digital spreading code "1010110" shown in FIG. 1B. Each bit is overlaid on the section of the device that generates it.

FIG. 4A show graphs demonstrating that the input signal was correlated with the template library to identify the template that leads to maximum correlation amplitude. Using this template as well as the amplitude and time of the correlation peak, signal due to largest overlapping cell was estimated. Estimated signal was then subtracted from the original signal effectively canceling the interference due to the specific cell. The process was repeated until residual signal did not resemble any of the templates in the library (i.e., correlation coefficient<0.5). FIG. 4B shows a graph demonstrating later optimization of cell signal amplitudes and durations to obtain the best fit with the measured signal using least-squares approximation. FIG. 4C shows a graph demonstrating results of the optimization process for timing and amplitude of signals corresponding to individual cells. FIG. 4D shows images from simultaneously recorded high-speed microscopy video, which confirmed the estimated results for location, timing and size of the cells.

FIG. 6B demonstrates the autocorrelation and cross-correlation properties of the designed 4 gold codes; $g_1$=1010110; $g_2$=0111111; $g_3$=0100010; and $g_4$=0011000.

As shown in FIG. 70A, using the time-delay between the pre-coding sensor signal and the first pulse of the code signal ($\Delta t_1$), the speed of the cell can be determined ($\Delta t_1 = \Delta t_3 = \Delta t_2 * (1/3)$). In FIG. 70B, the top graph shows an input waveform, the middle graph shows the first fitting iteration, and the bottom shows the second fitting iteration.

DETAILED DESCRIPTION

Figure 2:
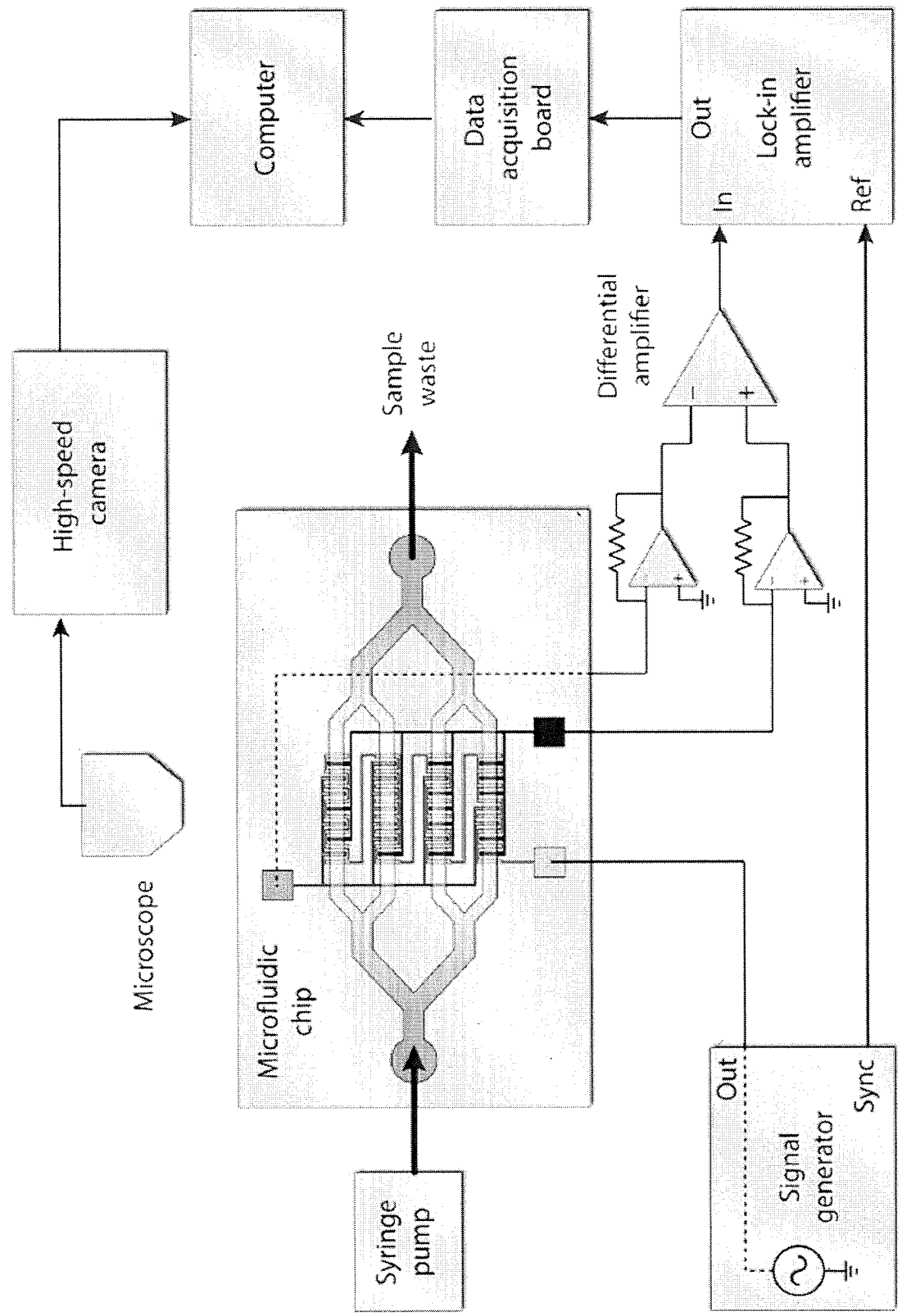
FIG. 2 shows a system that includes a microfluidic chip that can include electronic sensors designed for multiplexed detection of particles, such as cells. A cell suspension can be driven through the microfluidic chip using a syringe pump. A bipolar electrical signal can be obtained using a differential amplifier and can be sampled into a computing device for decoding. High-speed optical microscopy can then be used to validate the decoded electrical signal.
Figure 3A:
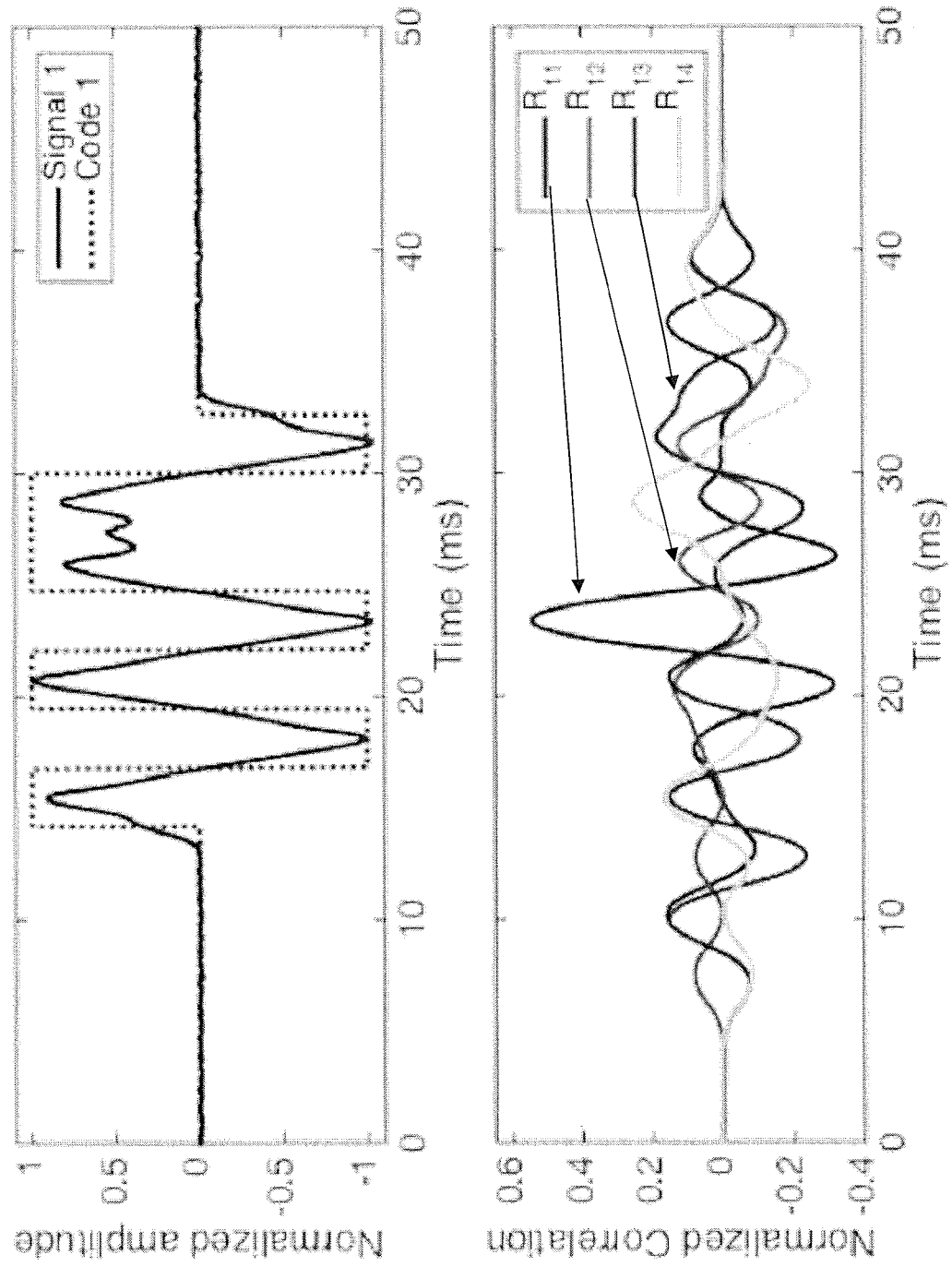
FIGS. 3A-3D show graphs demonstrating the measured electrical signals, which can also be used as templates (top graph in each figure) and their correlation (bottom graph in each figure) for each of 4 multiplexed sensors (Microchannel 1, FIG. 3A; Microchannel 2, FIG. 3B; Microchannel 3, FIG. 3C; and Microchannel 4, FIG. 3D). Representative normalized digital code signals (templates-top graphs) corresponding to each sensor are shown together with the corresponding ideal square pulse sequence. The signals are recorded as the cells are driven through the microfluidic device at about 100 μL per hour. As shown in the bottom graph for each figure, each template signal is correlated with itself and three other template signals corresponding to the other sensors. In each case, an autocorrelation peak can be identified because the digital codes for each microfluidic channel are specifically designed to be orthogonal to each other.
Figure 3B:
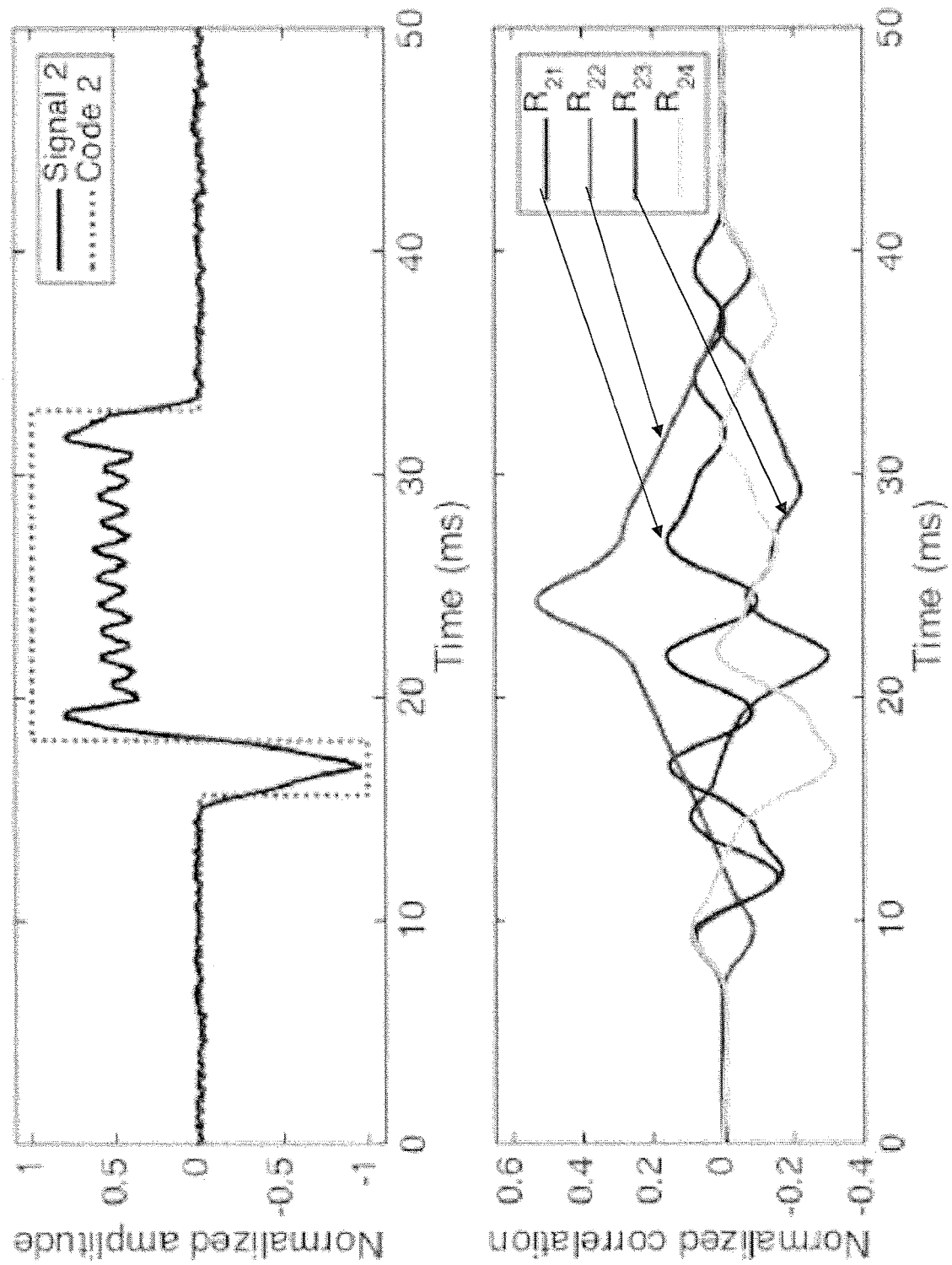
Figure 3C:
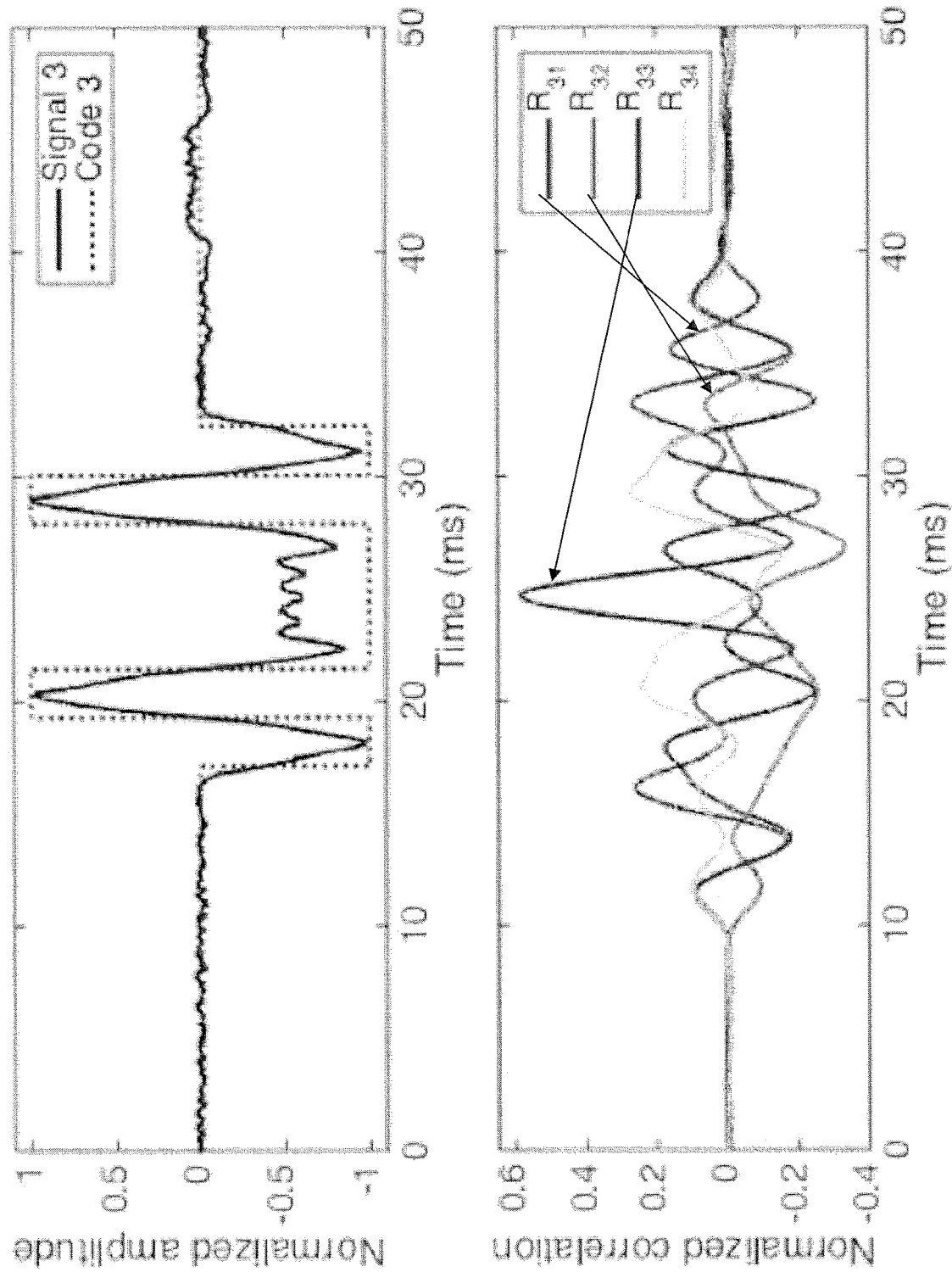
Figure 3D:
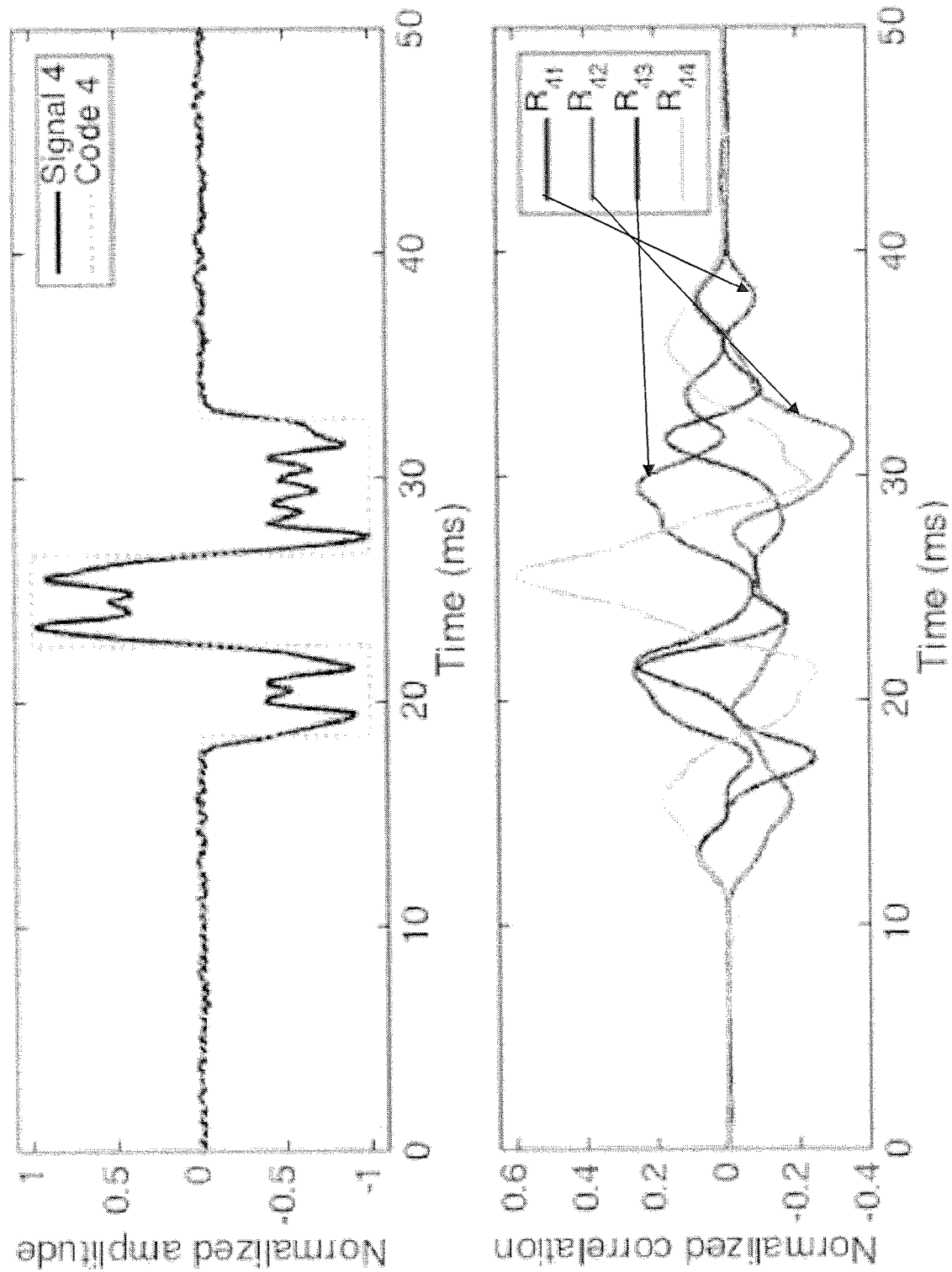

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of molecular biology, microbiology, nanotechnology, organic chemistry, biochemistry, botany and the like, microfluidics, electrical engineering, which are within the skill of the art. Such techniques are explained fully in the literature.

Definitions

As used herein, "particle" can refer to any particulate matter that can be contained in a liquid. "Particles" can include, but are is not limited to, cells, organelles, virus particles, nucleic acids, proteins, peptides, bacteria, worms (e.g., *C. Elegans*), exosomes, vesicles, pollen, sieved drug fractions, polymers, copolymers, silicon, glass, metal, metal oxide nanopartiples, or any combination of two or more components shown above.

As used herein, "functionalized" as it refers to the surface of any fluid path provided herein, can refer to any chemical or biological treatment, compound, composition, and/or molecule that can be applied to a surface that would alter the path and/or rate of travel of a particle (whether the particle itself is functionalized or not) through any fluid path provided herein. "Functionalized" as it refers to a particle present in a fluid flowing through any fluid path provided herein, can refer to any treatment (chemical, biological, or otherwise) of the particle that can alter the path and/or rate of travel of the particle through any fluid path (whether the fluid path itself is functionalized or not) directly or indirectly when an outside force (e.g. a magnetic field) is applied to the particle when the particle is within any fluid path provided herein. Functionalization of fluid path surfaces and particles is generally known in the art and will be instantly appreciated by those of ordinary skill in the art. Such techniques are thus within the spirit and scope of this disclosure.

As used herein, "about," "approximately," and the like, when used in connection with a numerical variable, generally refers to the value of the variable and to all values of the variable that are within the experimental error (e.g., within the 95% confidence interval for the mean) or within ±10% of the indicated value, whichever is greater.

DISCUSSION

Detection and analysis of small particles in liquids are of particular interest in numerous applications ranging from biomedicine to environmental monitoring. By spatially tracking particles/cells as they are manipulated on lab-on-a-chip devices (e.g., determining the microfluidic channel they are sorted into or the location on the microfluidic device where they are captured), many biophysical or biochemical assays can be performed. To obtain such spatial information however, lab-on-a-chip assays almost always require subsequent microscopic analysis negating the cost and portability benefits of these microfluidic devices.

With that said, described herein are devices that can include one or more coded fluidic paths that are configured to generate a unique output, which can be a unique waveform, digital, analogue, or other signal such that the fluidic paths are distinguishable from one another from a single output. Also provided herein are systems that can include one or more of these coded fluidic paths or devices. Also provided herein are methods of using the coded fluidic paths, devices, and systems described herein. The coded fluidic paths, devices, and systems provided herein can increase the use of microfluidic devices, particularly in settings with limited resources. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Coded Fluidic Paths, Devices, and Systems

Provided herein are coded fluid paths that can be incorporated into a device, including but not limited to, a microfluidic device or chip-based device. The coded fluidic paths can be configured such that each path can produce a unique and distinguishable digital code in response to a particle present in a fluid flowing though the fluid path. In this way, output from multiple channels can be obtained simultaneously and yet the output from each specific fluid path can be discerned from the output from any other fluid path. It will be appreciated that were the term "coded" is used herein in connection with a fluid path or sensor, refers to the feature that the fluid path or sensor can produce a unique code, which can be a signal or waveform produced by that coded fluid path or coded sensor that is specific to that fluid path or particular sensor. The code produced can be digital, analog, or otherwise.

It will also be appreciated that where the term "electronic sensor" is used, that it is not limited to only electronic sensors, but can also mean any suitable type of sensor, such as magnetic, optical, mechanical, thermal. It will be appreciated that where electrodes (or electrode fingers) are described herein as being arranged that in the case of a magnetic sensor, instead of electrodes being used to implement the coding feature, the fluid path can be micropatterned appropriately to form the magnetic sensor with a unique output. It will be appreciated that where electrodes (or electrode fingers) are described herein as being arranged that in the case of an optical sensor, that the fluid path can be micropatterened with opaque and transparent regions to generate a unique signal. Other configurations will be appreciated based on the exact nature of the sensor being employed in the coded sensor or fluid path in view of this disclosure.

Figure 59:
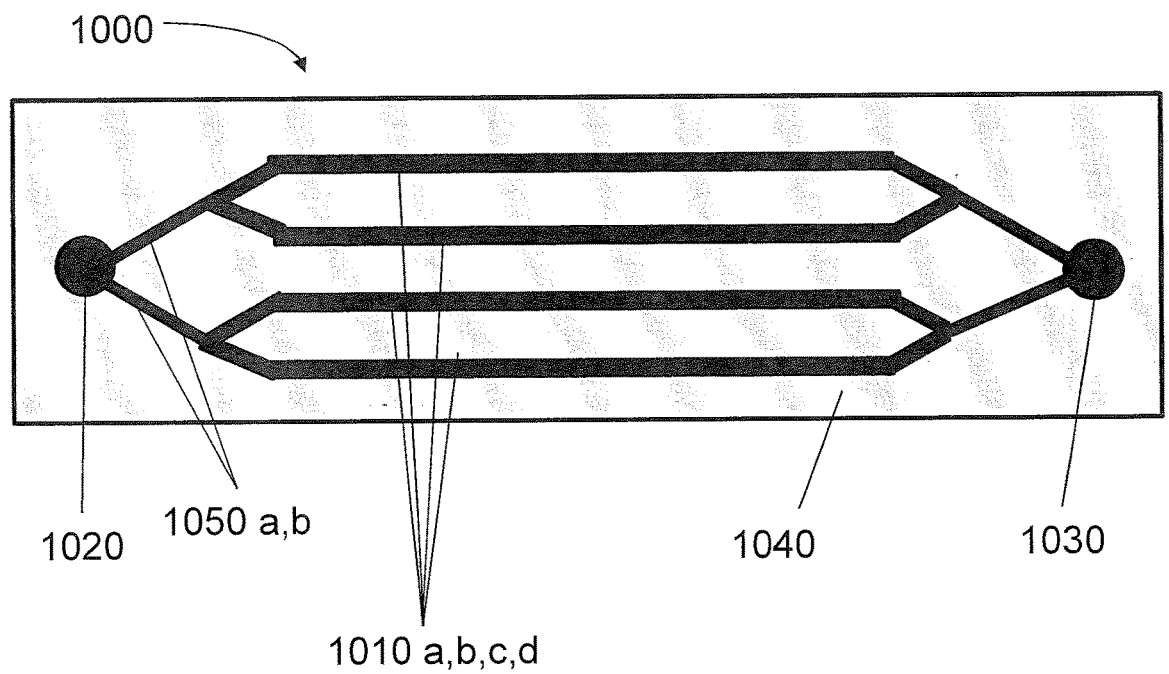
FIG. 59 shows embodiments of a device having one or more coded fluidic paths.

Given this, attention is directed to FIG. 59, which shows embodiments of a device 1000 having one or more coded fluid paths 1010a, b, c, d (collectively 1010). The coded fluid paths 1010 can be configured to any shape or size. It will be appreciated that the coded fluid paths 1010 can be fluidically coupled to one or more inlets 1020, outlets 1030, and/or non-coded fluid paths, 1050a,b in any desired manner. It will be appreciated that the coded fluid paths 1010 can be defined by a volume of fluid (as opposed to a physically defined space, such as a channel or microchannel.) or by a physical space, such as a channel or microchannel. The coded fluid paths 1010, when defined by a physical space, can be closed (e.g. form a tube or closed-channel) or open on one side (e.g. to form an open channel). The physical space of the coded fluid paths 1010, can be any three dimensional shape, including but not limited to, cylindrical, cuboidal, a prism of any shape, and irregularly shape. The coded fluid paths 1010 can be uniform in shape, width, diameter and/or height as applicable along their length. The coded fluid paths 1010 can be irregular (or non-uniform) in shape, width, diameter and/or height as applicable along their length. In some embodiments, the height of the coded can range from 0.001 nm to 1 cm or more. In some embodiments, the width of the coded can range from 0.001 nm to 1 cm or more. In some embodiments, the length of the coded can range from 0.001 nm to 10 m or more.

The coded fluid paths 1010 can be functionalized. The coded fluid paths 1010 can be composed of a suitable material. Suitable materials include, but are not limited to, polymer, copolymer, glass, metal, ceramic, silicon, graphene, carbon nanotubes, resin, epoxy and any combination thereof. The coded fluid paths 1010 can be composed of a suitable material. Suitable materials include, but are not limited to, polydimethylsiloxane (PDMS), polymethylmethacrylate (PMMA), borosilicate glass, quartz, gold, platinum, silver, alloys, paper, etc.

The coded fluid paths 1010 can be attached to, integrated with, and/or otherwise coupled to a substrate 1040. The substrate can be any desired size or shape. The substrate can be a polymer, co-polymer, plastic, glass, metal, non-metal (e.g., silicon) or any combination thereof. In some embodiments, the substrate can be glass, polystyrene, silicon, steel, wood, paper, or any combination thereof. The coded fluid paths 1010 can be incorporated into a device, such as a chip, cell culture vessel, tubing, piping, and/or other containers and also on open surfaces. The fluid paths (non-coded fluid paths 1050 and coded fluid paths 1010) incorporated in any device or substrate can be arranged in any desired pattern as will be appreciated by one of ordinary skill in the art.

Figure 60:
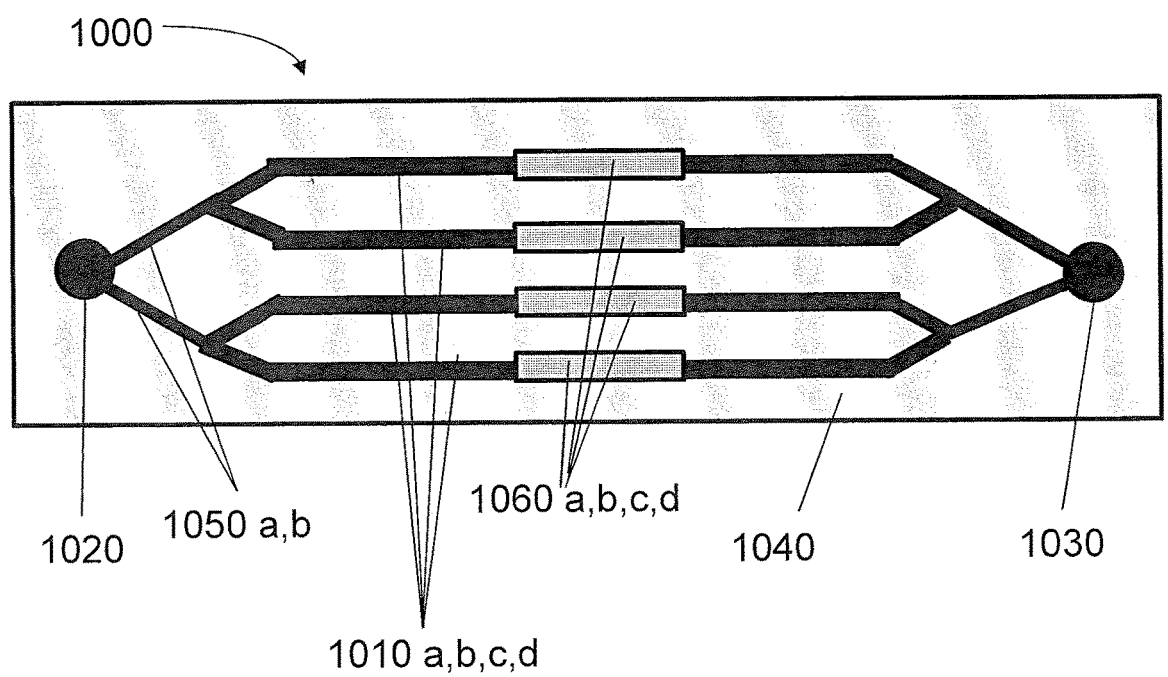
FIG. 60 shows embodiments of a device having one or more coded fluidic paths, where the coded fluidic paths can contain a coded electronic sensor.
Figure 61:
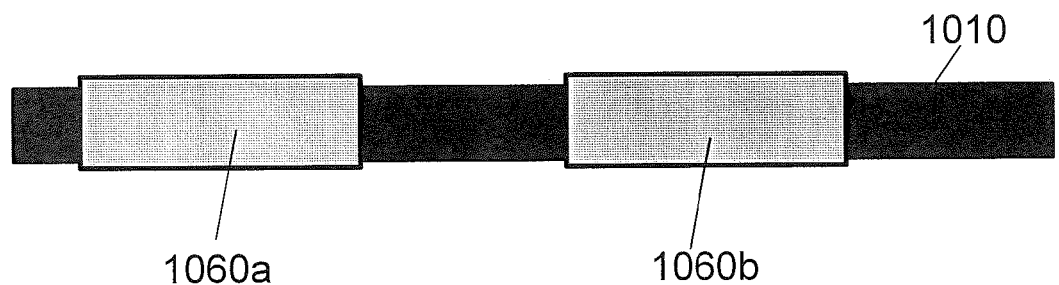
FIG. 61 shows embodiments of a coded fluidic path having more than one coded electronic sensor.

As shown in FIG. 60, the coded fluid paths 1010 can each contain a coded electronic sensor 1060a,b,c,d (collectively 1060) configured to generate a digital output code corresponding to the coded fluid path based upon a sensed distortion in a fluid flowing along the coded fluid path over the electronic sensor. The distortion in the fluid can be induced by a particle 1100 present in the fluid. Each coded electronic sensor 1060 can be configured so as to generate a different digital output from every other coded electronic sensor 1060. For example, the code generated by the coded electronic sensor 1060a, which is associated with coded fluid path 1010a is different from the code generated by the coded electronic sensor 1060b, which is associated with coded fluid path 1010b. It will be appreciated that the different code produced by each coded electronic sensor 1060 is not necessarily limited to distinguishing different coded fluid paths 1010 from each other, but can be used to distinguish different points on the same coded fluid path 1010. As shown in FIG. 61, at least two coded electronic sensors 1060a,b can be placed at different locations along the same coded fluid path 1010.

It will also be appreciated that multiple coded electronic sensors 1060 can be placed in the same coded fluidic path 1010 and be configured to generate the same code corresponding to identify the same microchannel but be placed at different intervals along the coded fluidic paths, wherein the intervals are different between the coded electronic sensors 1060 are different the different coded fluidic paths. In operation this produces a coded output for each coded fluidic path that is generated at different frequencies between different coded fluidic paths. An embodiment of this is demonstrated in FIG. 18.

Figure 62:
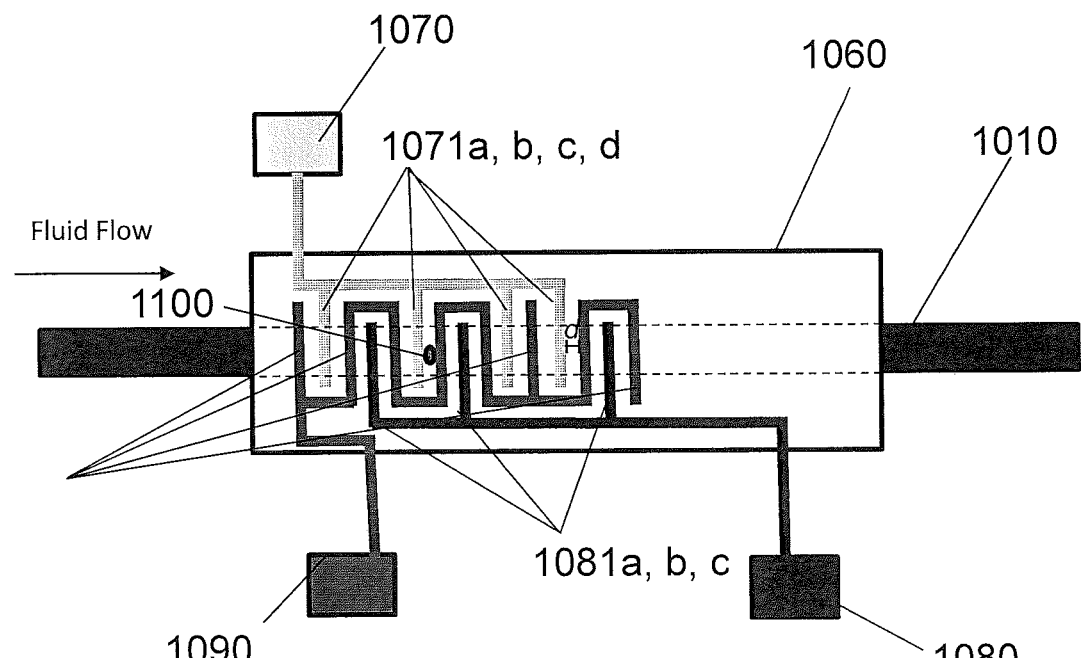
FIG. 62 shows embodiments of a coded electronic sensor.

The coded electronic sensor can be composed of one or more electrodes. The electrodes can be parallel (vertical or horizontal or at an arbitrary angle with fluidic direction) or co-planar to each other. In some embodiments, the coded electronic sensor 1060 can have 2 electrodes: a first electrode 1070 and a second electrode 1080 (FIG. 62A). In some embodiments the coded electronic sensor 1060 can have 3 electrodes: a first electrode 1070, a second electrode 1080, and a third electrode 1090 (FIG. 62). Each electrode can be micropatterned to form electrode fingers, such that there can be first electrode fingers (1071a, b, c, d, . . . n, collectively 1071), second electrode fingers (1081a, b, c, . . . n, collectively 1081), and third electrode fingers (1091a, b, c, d . . . n collectively 1091). The first electrode 1070 and the second electrode 1080 can be placed on opposite sides of the coded fluidic path 1010.

In some embodiments, the first electrode 1070 can be a positive electrode. In some embodiments, the second electrode 1080 can be a negative electrode. In some embodiments the third electrode 1090 can be a reference electrode. As shown in FIG. 62, in some embodiments, the coded electronic sensor 1060 can have at least 3 coplanar electrodes: a positive electrode 1070, a negative electrode 1080, and a reference electrode 1090 (FIG. 62C). Each electrode can be micropatterned to form electrode fingers such that there can be positive electrode fingers (1071a, b, c, d, . . . n, collectively 1071), negative electrode fingers (1081a, b, c, . . . n, collectively 1081), and reference electrode fingers (1091a, b, c, d . . . n collectively 1091). The electrode fingers can be arranged in the electronic sensor 1060 such that they extend partially or wholly across the coded fluidic path 1010. The negative electrode 1080 and positive electrode 1070 can be placed on opposite sides of the coded fluidic path 1010. As shown in FIG. 62, in some embodiments the reference electrode fingers 1091 can be arranged in the electronic sensor 1060 such that they cross the coded fluid path 1010 and are arranged between the any positive or negative electrode fingers.

Each finger of the electrode fingers (e.g., 1071, 1081, 1091) are separated from any other electrode finger by a distance that is greater than zero. The distance can be about the width, diameter, circumference, or largest dimension of the particle in the fluid being detected. In some embodiments, the distance between electrode fingers is greater than the width, diameter, circumference, or largest dimension of the particle in the fluid being detected. The distance d between any two or more electrode fingers can be uniform (i.e. about the same) or the distance between any two or more electrode fingers can be non-uniform (i.e. different). In some embodiments, the distance between all electrode fingers in a single electronic sensor 1060 can be uniform. In some embodiments, the distance between any two or more electrode fingers can be about 8 µm to about 12 µm. In some embodiments, the distance between any two or more electrode fingers can be about 10 µm.

The shape of any two or more electrode fingers can be uniform (i.e. about the same) or the shape of any two or more electrode fingers can be non-uniform (i.e. different). In some embodiments, the shape of all the electrode fingers in a single electronic sensor 1060 can be uniform. The finger electrodes can be any desired shape. The finger electrodes can be any regular shape or irregular shape. Some shapes include but are not limited to, rectangles, squares, parallelograms, trapezoids, triangles, crescent, oval, circles, and ellipses, or any other shapes. The electrodes can be arranged symmetrically or asymmetrically relative to the longitudinal and/or vertical axis of the fluid path.

Figure 63:
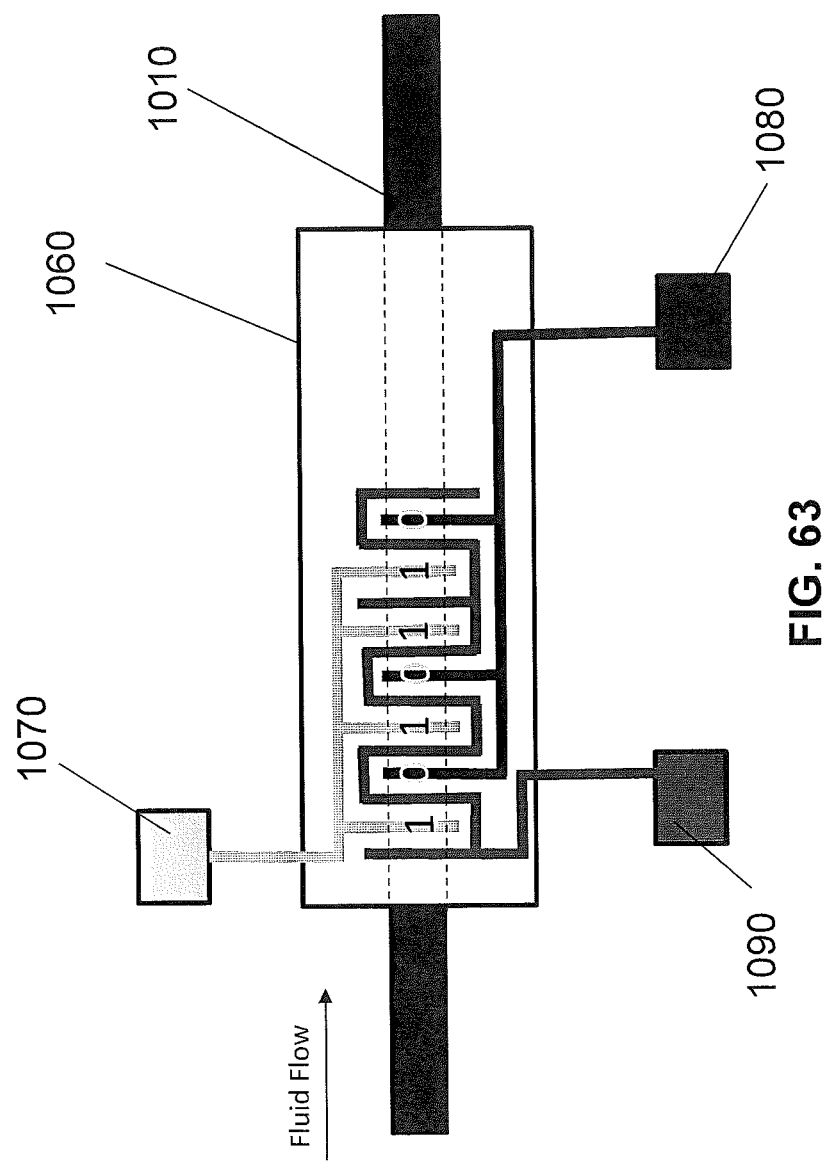
FIG. 63 shows embodiments of a coded electronic sensor.

As shown in FIG. 63, in some embodiments as a particle flows through the coded fluid path 1010, the particle will generate disturbances in the fluid flowing through the coded fluid path 1010. These disturbances can be sensed by the electrode fingers as the particle moves by the electrode fingers. The output from each of the electrode finger sensors can be decoded into a bit of a binary code with a signal from a positive electrode finger corresponding to a "1" and a signal from a negative electrode corresponding to a "0." The positive and negative electrode finger arrangement can differ between different electronic sensors and thus different coded fluid paths or different points on the same coded fluid sensor can be distinguished from each other based on the code generated. It will be appreciated that the positive electrode could correspond to a "0" and the negative electrode could correspond to a "1" with the same effect of providing a code to uniquely identify a given coded fluid path or region of a coded fluid path. In some embodiments the codes used to identify the position of the particle within a coded fluid path, can be orthogonal to one another. In other embodiments, the codes can be non-orthogonal.

In some embodiments where the coding electronic sensor has two electrodes, the electrode fingers can be arranged so as to form 2-electrode finger pairs (see e.g., FIGS. 24-30 and 65) or 3-electrode finger pairs (see e.g., FIGS. 31-36 and 66). Each pair in the 2-electrode (or electrode finger) pair can contain a reference electrode (or electrode finger) and a non-reference (e.g. polarized (negative or positive)) (or electrode finger). Each pair in the 3-electrode (or electrode finger) pair can contain 2 reference electrodes (or electrode fingers) and a non-reference electrode (or electrode finger). The pairs of electrode fingers can be placed at any interval from one another along the length of the coded fluid path 1010. In operation, each electrode finger pair corresponds to 1 bit in the digital code generated by the coding electronic sensor 1060 in response to a distortion in the fluid flowing through the fluid path 1010.

Figure 64:
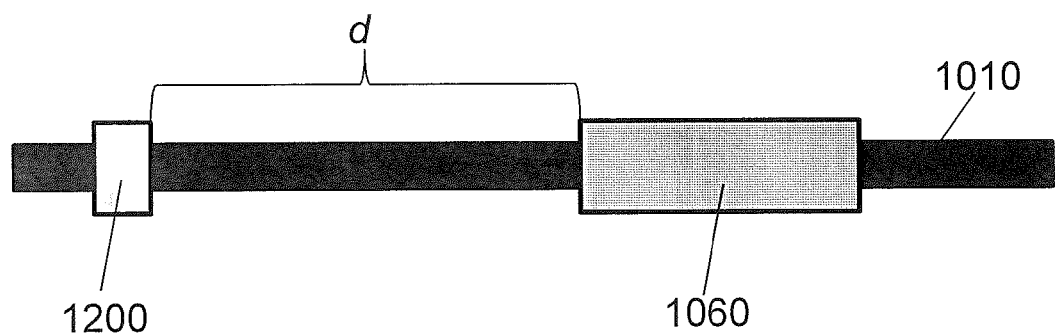
FIG. 64 shows embodiments of coded fluidic path having a coded electronic sensor and a non-coded sensor.
Figure 65:
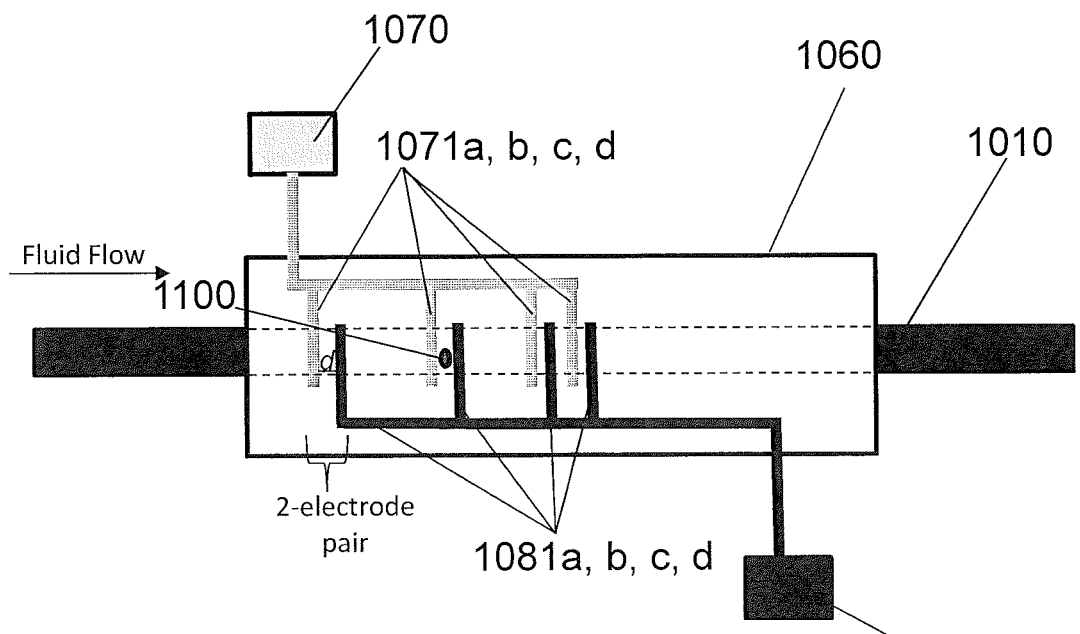
FIG. 65 shows embodiments of a coded electronic sensor, where the electrodes can contain 2-electrode finger pairs.
Figure 66:
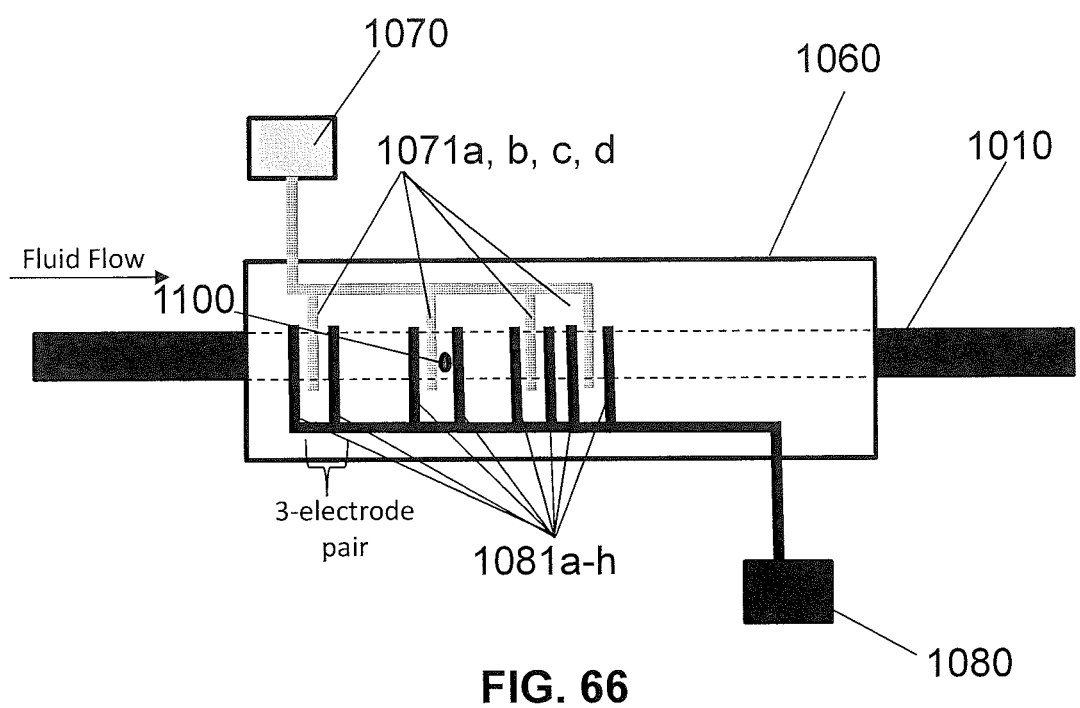
FIG. 66 shows embodiments of a coded electronic sensor, where the electrodes can contain 3-electrode finger pairs.

As shown in FIG. 64 some embodiments, the coded fluid path 1010 can further include a second electronic sensor 1200 that does not necessarily generate a digital code when a disturbance created by a particle in the fluid flowing through the coded fluid path is sensed. The second sensor 1200 can be configured to generate an output when a disturbance created by a particle in the fluid flowing through the coded fluid path is sensed. The second sensor 1200 can be placed at a distance d from a first electronic sensor 1060, which can generate the distinguishing code. The distance can be any distance greater than zero. In some embodiments, the distance can range from 0.1 nm to 10 m or more. The second electronic sensor 1200 can be placed up flow and/or down flow from a first electronic sensor 1060. The second sensor 1200 can be unipolar. The second sensor 1200 can be bipolar.

Figure 22:
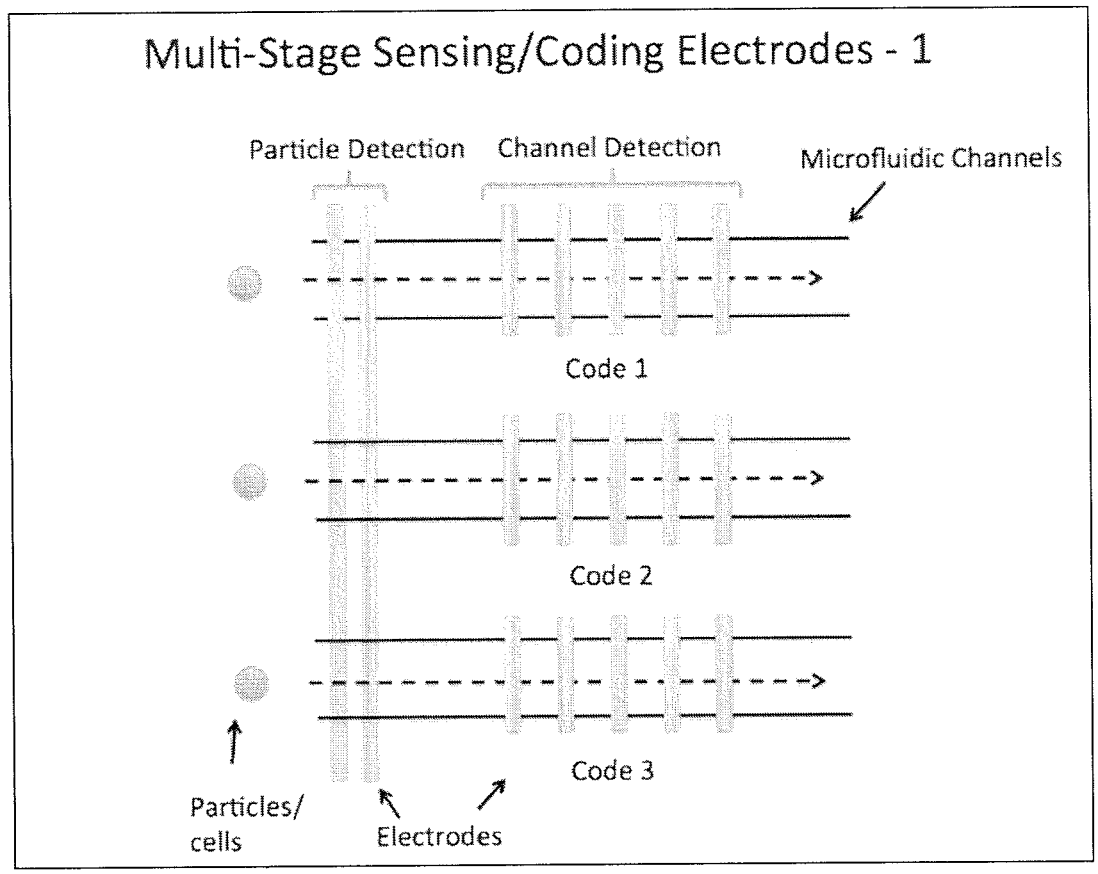
FIG. 22 shows an embodiment of a multi-stage sensing/coding electrodes in microfluidic channel device.
Figures 23, 24:
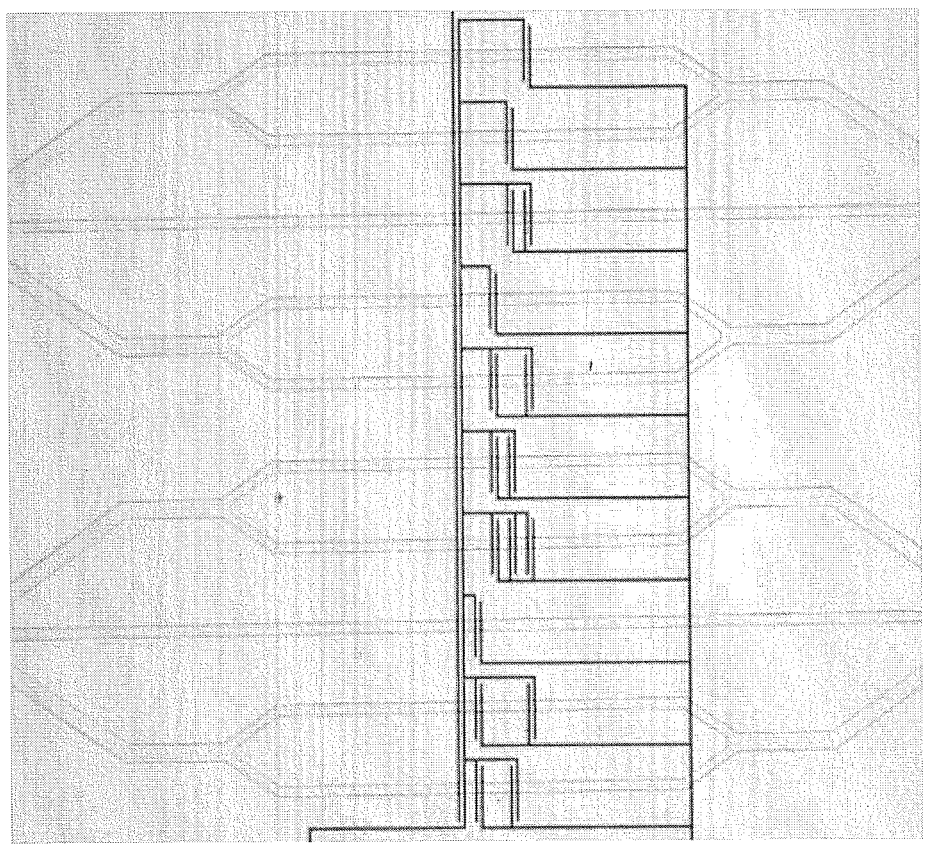
FIG. 23 shows 2 code sets that are composed of unipolar, non-orthogonal digital codes.
FIG. 24 shows an image of a microfluidic device having a 2-electrode pair with a 30 μm gap using code set 1 from FIG. 23.
Figure 25:
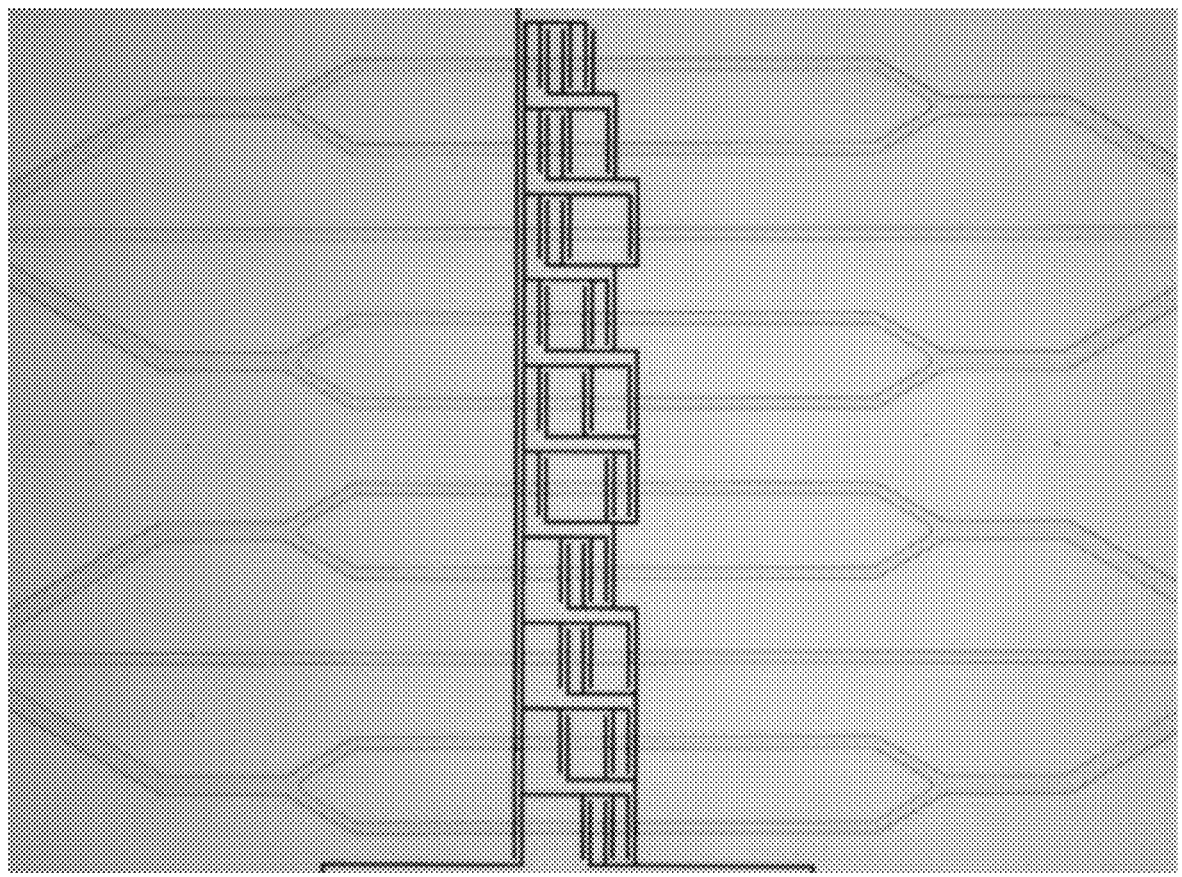
FIG. 25 shows an image of a microfluidic device having a 2-electrode pair with a 30 μm gap using code set 2 from FIG. 23.
Figure 26:
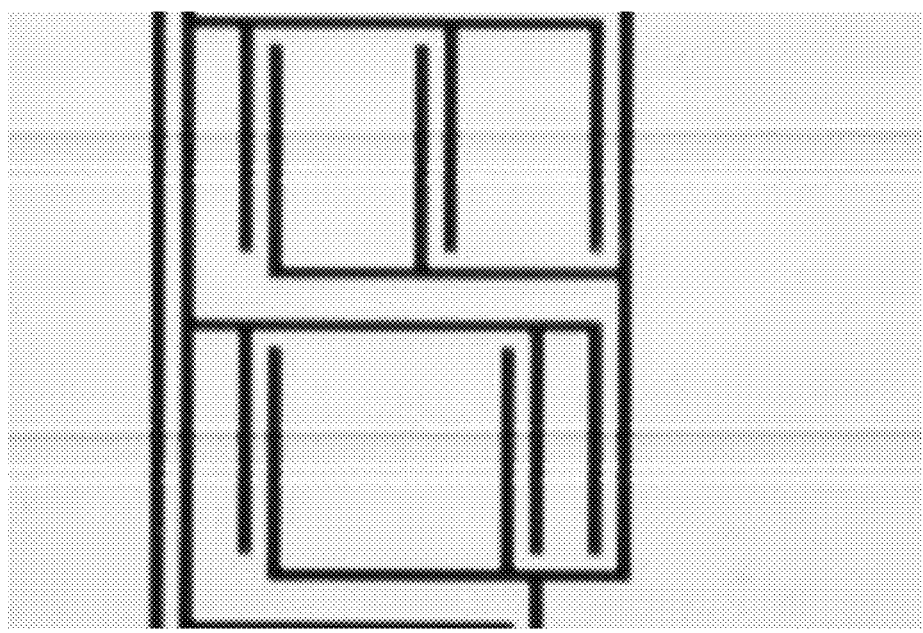
FIG. 26 shows a close-up image of the 2-electrode pair of FIG. 25.
Figure 27:
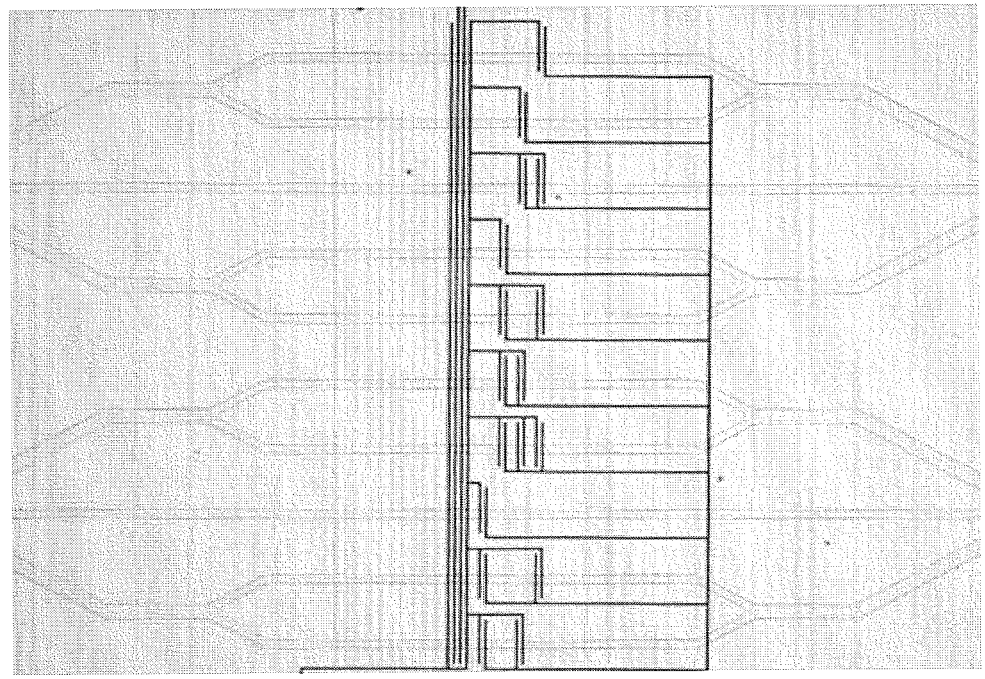
FIG. 27 shows an image of a microfluidic device having a 2-electrode pair with a 30 μm gap using code set 1 from FIG. 23 forming a unipolar pre-coding sensor.
Figure 28:
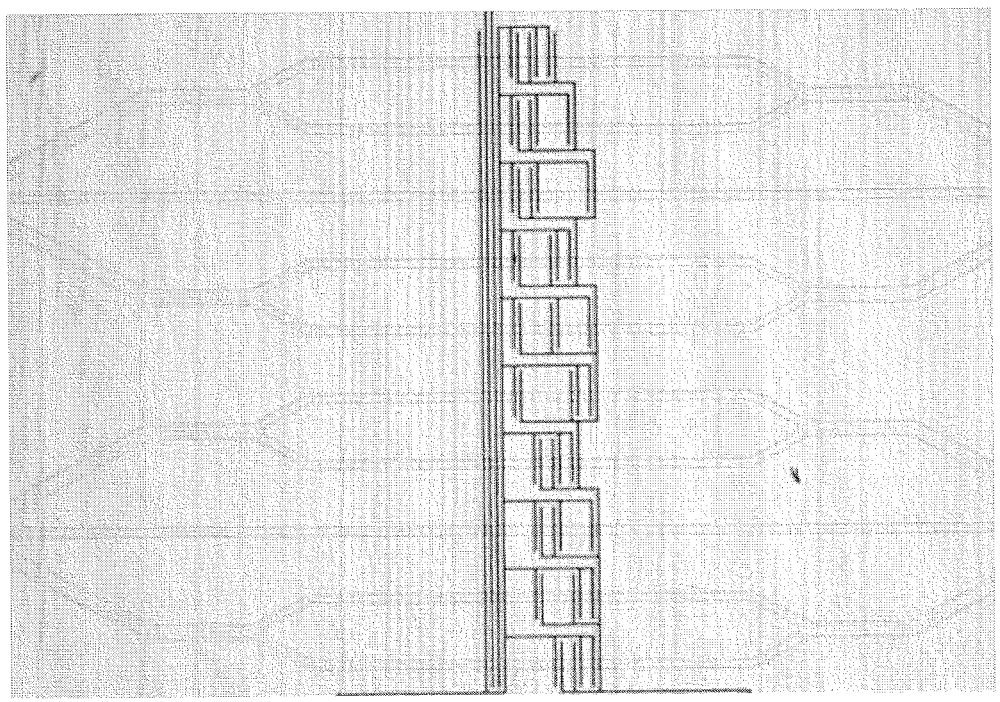
FIG. 28 shows an image of a microfluidic device having a 2-electrode pair with a 30 μm gap using code set 2 from FIG. 23 forming a unipolar pre-coding sensor.
Figure 29:
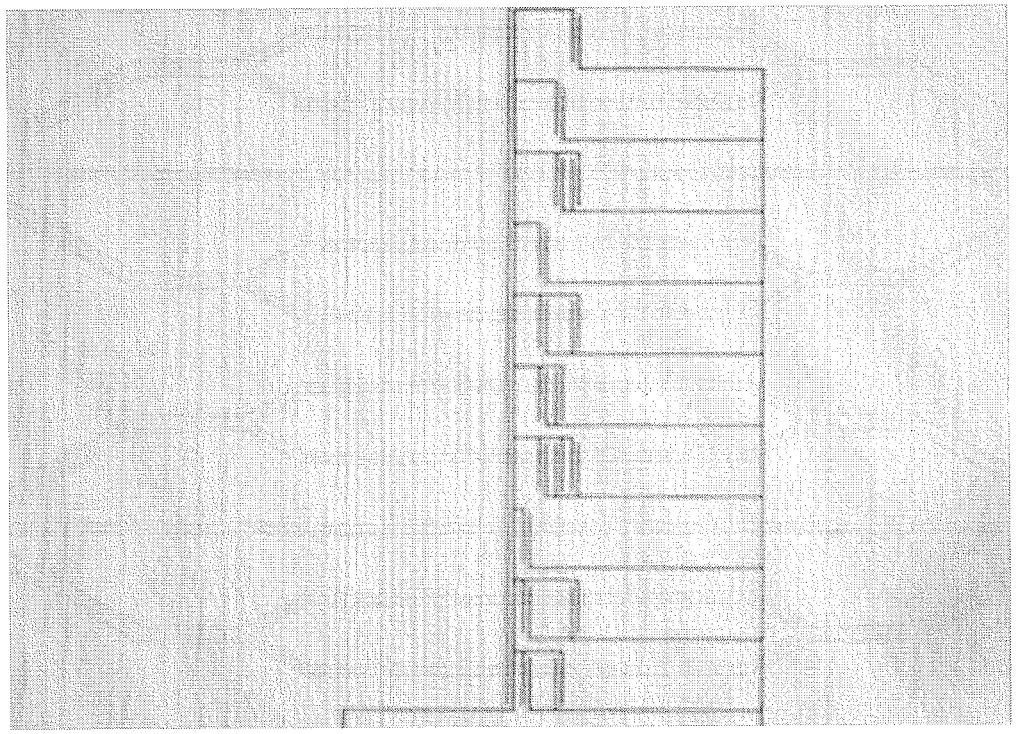
FIG. 29 shows an image of a microfluidic device having a 2-electrode pair with a 20 μm gap using code set 1 from FIG. 23.
Figure 30:
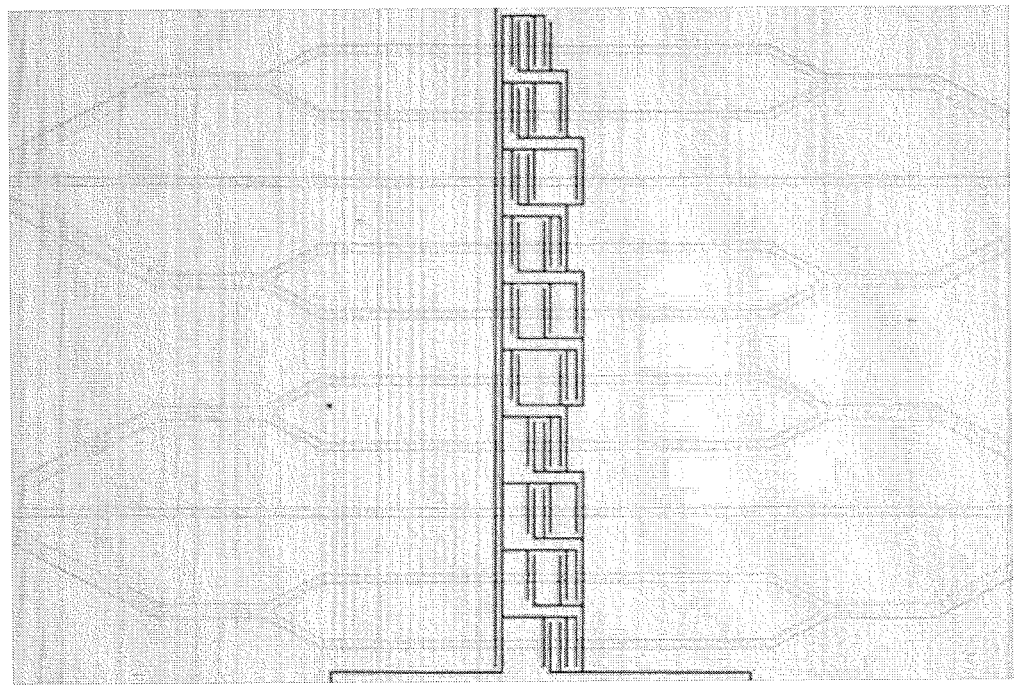
FIG. 30 shows an image of a microfluidic device having a 2-electrode pair with a 20 μm gap using code set 2 from FIG. 23.
Figure 31:
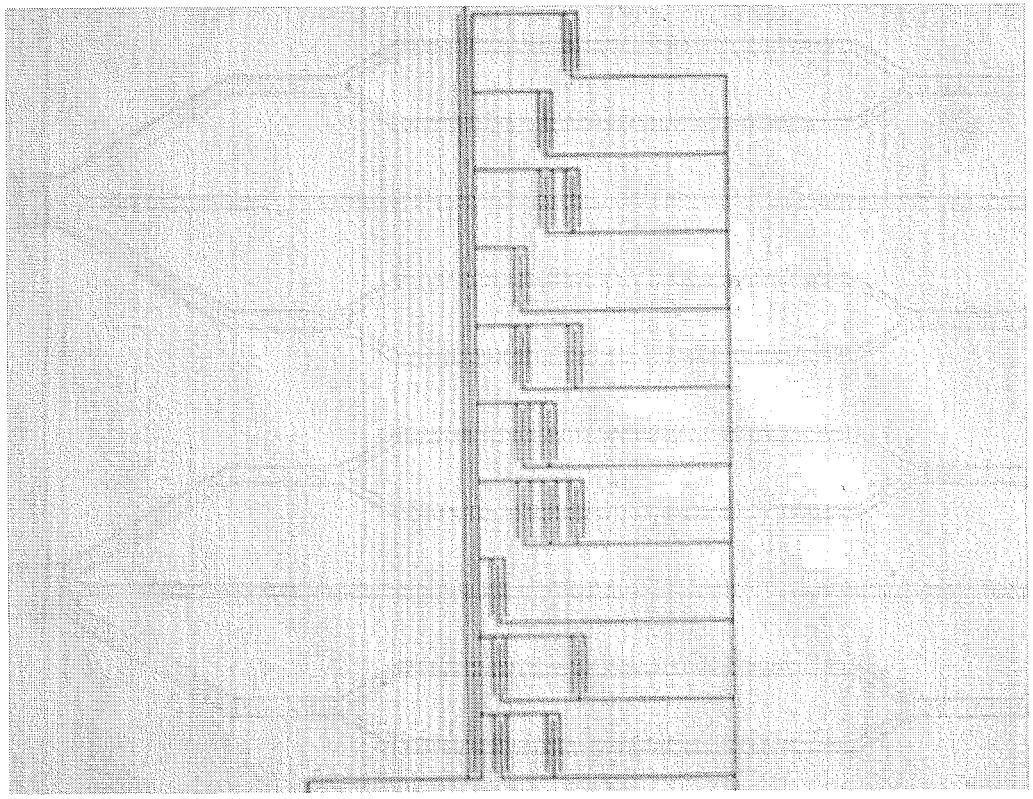
FIG. 31 shows an image of a microfluidic device having a 3-electrode pair with a 30 μm gap using code set 1 from FIG. 23.
Figure 32:
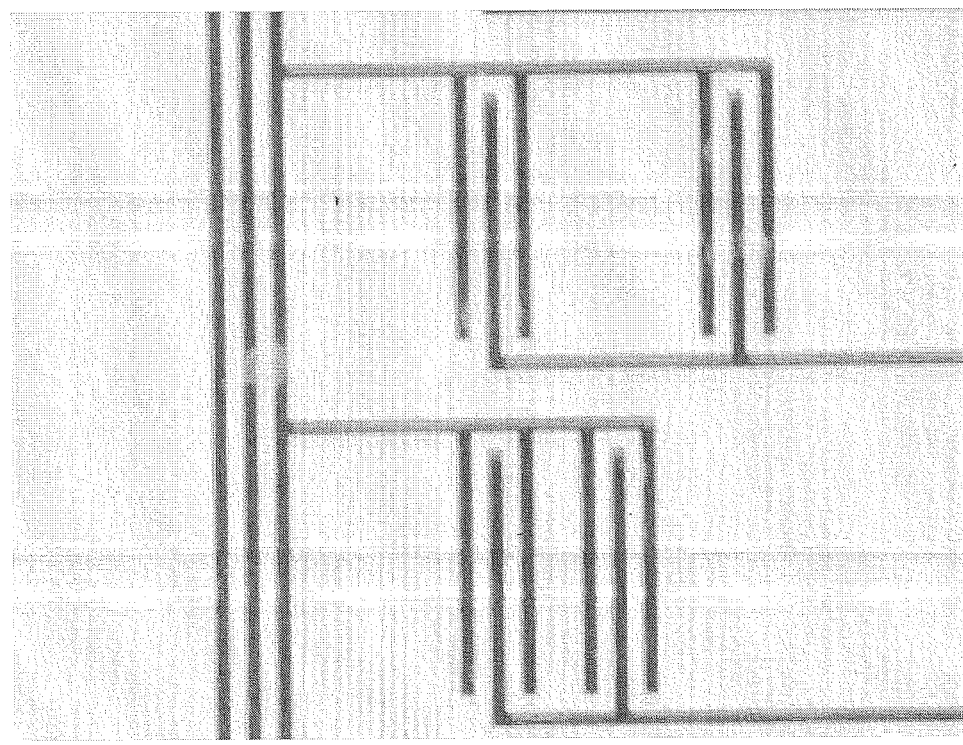
FIG. 32 shows a close-up image of the 3-electrode pair of FIG. 31.
Figure 33:
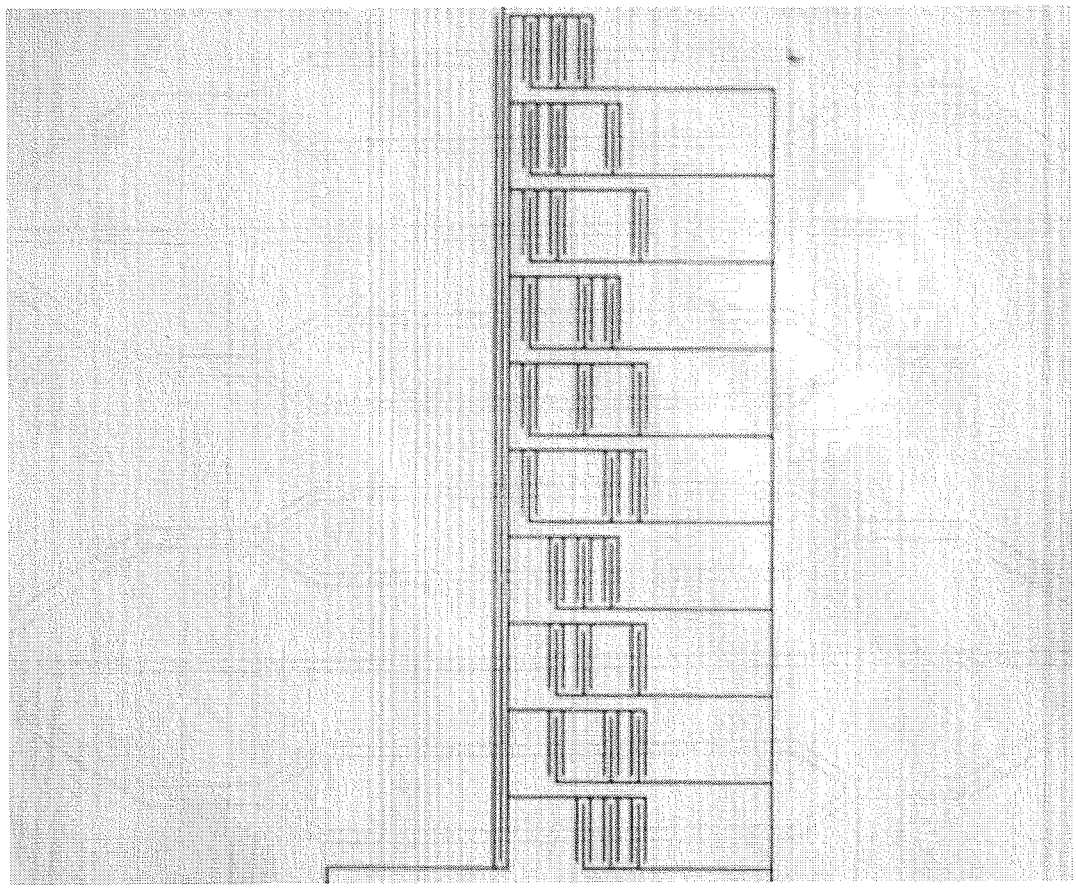
FIG. 33 shows an image of a microfluidic device having a 3-electrode pair with a 30 μm gap using code set 2 from FIG. 23.
Figure 34:
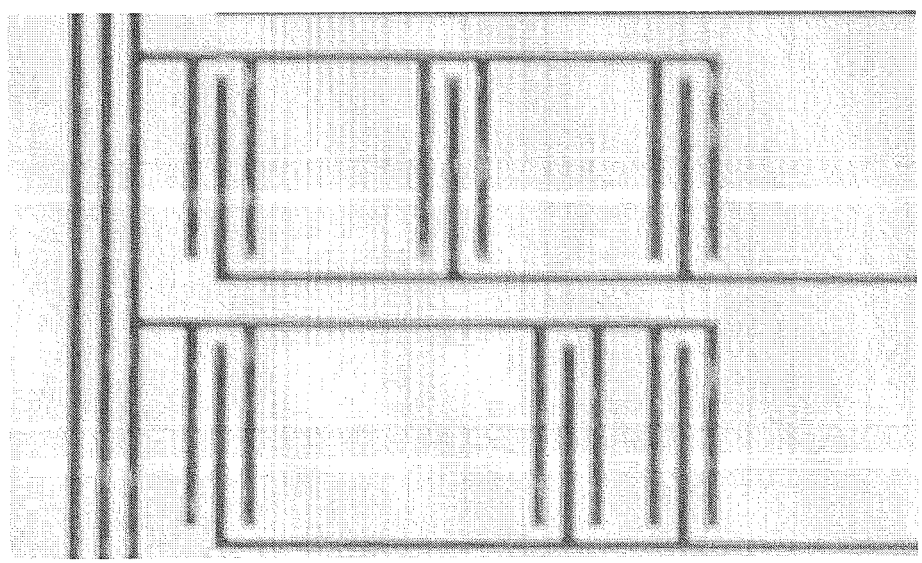
FIG. 34 shows a close-up image of the 3-electrode pair of FIG. 33.
Figure 35:
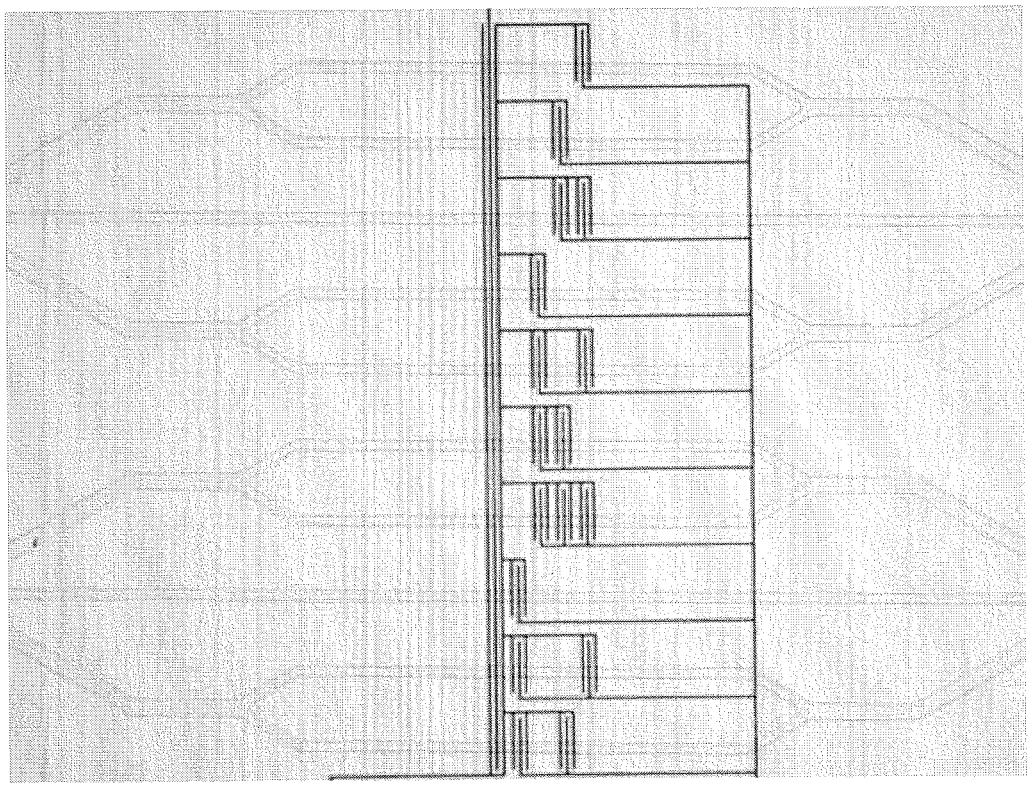
FIG. 35 shows an image of a microfluidic device having a 3-electrode pair with a 20 μm gap using code set 1 from FIG. 23.
Figure 36:
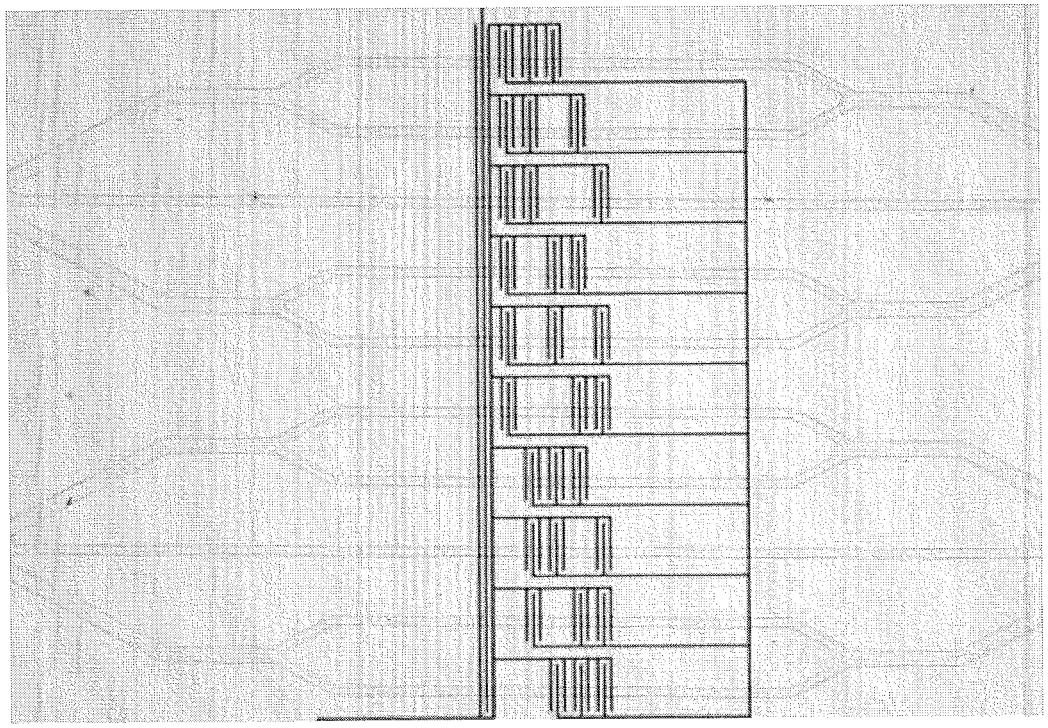
FIG. 36 shows an image of a microfluidic device having a 3-electrode pair with a 20 μm gap using code set 2 from FIG. 23.

In operation the second electronic sensor 1200 can detect the presence or other attribute of a particle in the fluid flowing through the coded fluid path. In some embodiments, the second electronic sensor 1200 can be a resistive pulse sensor, optical, magnetic, thermal, chemical, or a mechanical sensor. Other suitable types of sensors that can be used as the second electronic sensor will be appreciated by those of skill in the art. This second sensor can provide information on particles that will flow or have flowed over a particular coded electronic sensor 1060, such as number, size, and relative timing of the particles, which can be used, among other ways, to distinguish signals produced from overlapping particles in fluid. Additional embodiments of this configuration of the coded fluid paths are shown in FIG. 22. The term "overlapping particles" can refer to two or more particles that are simultaneously interacting with the electrodes in the fluid path. The overlapping particles can be interacting with the same coded sensor (different electrodes within the same sensor) or they can be interacting with two different sensors coded with different codes. This codes produced by the coded electronic sensors 1060 can be orthogonal or non-orthogonal to each other.

Figure 48:
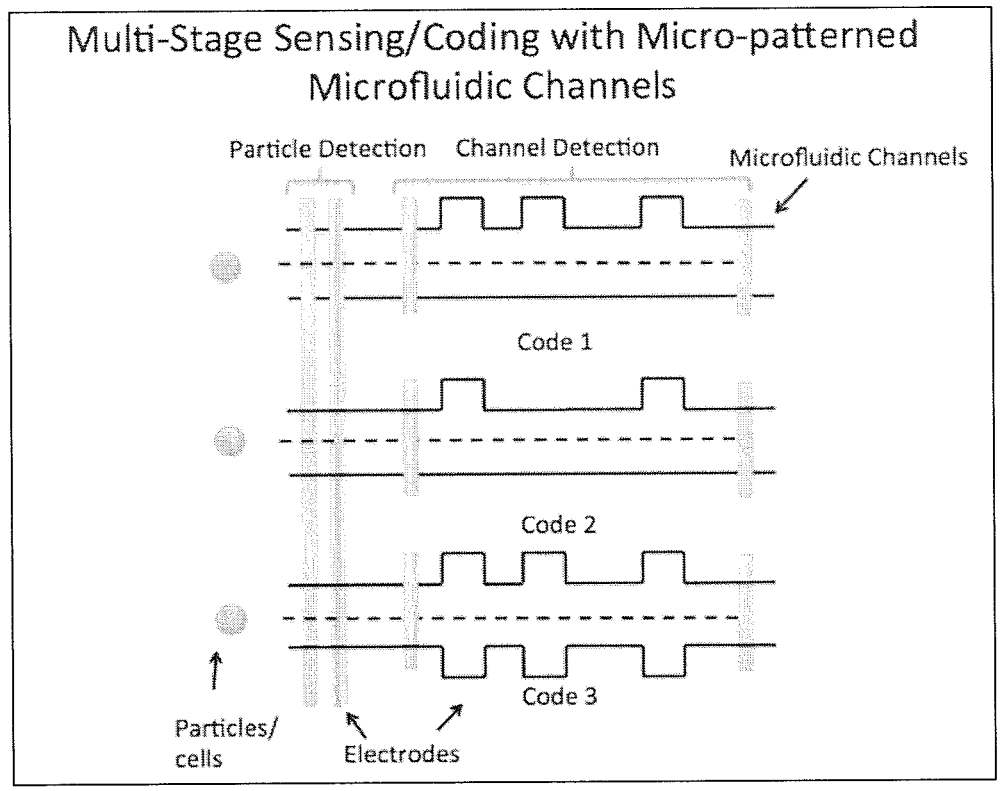
FIG. 48 shows a schematic demonstrating multiplexed detection of particles with a micropatterned microfluidic channel instead of or in addition to electrodes. The microfluidic channels can be arbitrarily shaped (e.g. micropatterended) to generate distinguishable signals.

In some embodiments, the coded fluid path does not necessarily (although it can) contain a coded electronic sensor. As shown in FIG. 48, in some of these embodiments, the coded fluidic path can be micropatterned into an arbitrary specific shape in a region of the coded fluidic path that lies between at least two sensors. The fluid path and thus the impedance and the flow rate is altered between the at least two sensors at each end of the micropatterned region of the coded fluid path. In operation, the differences in the micropttterning can lead to different frequencies at which the at least two sensors at each end of the micropatterned region of the coded fluid path are stimulated by a distortion in the fluid generated by the presence of a particle. These frequencies thus create a signature for each coded fluid path that can be used to distinguish one coded fluid path from another. A second electrode 1200 (described in greater detail elsewhere herein) can be placed at a distance greater than 0 up flow and/or down flow from the micropatterened region of the coded fluid path. A coding electrical sensor 1060 (as described elsewhere herein) can be placed at a distance greater than 0 up flow and/or down flow from the micropatterened region of the coded fluid path and/or be placed at any point along the micropatterned region of the coded fluid path.

Figure 49:
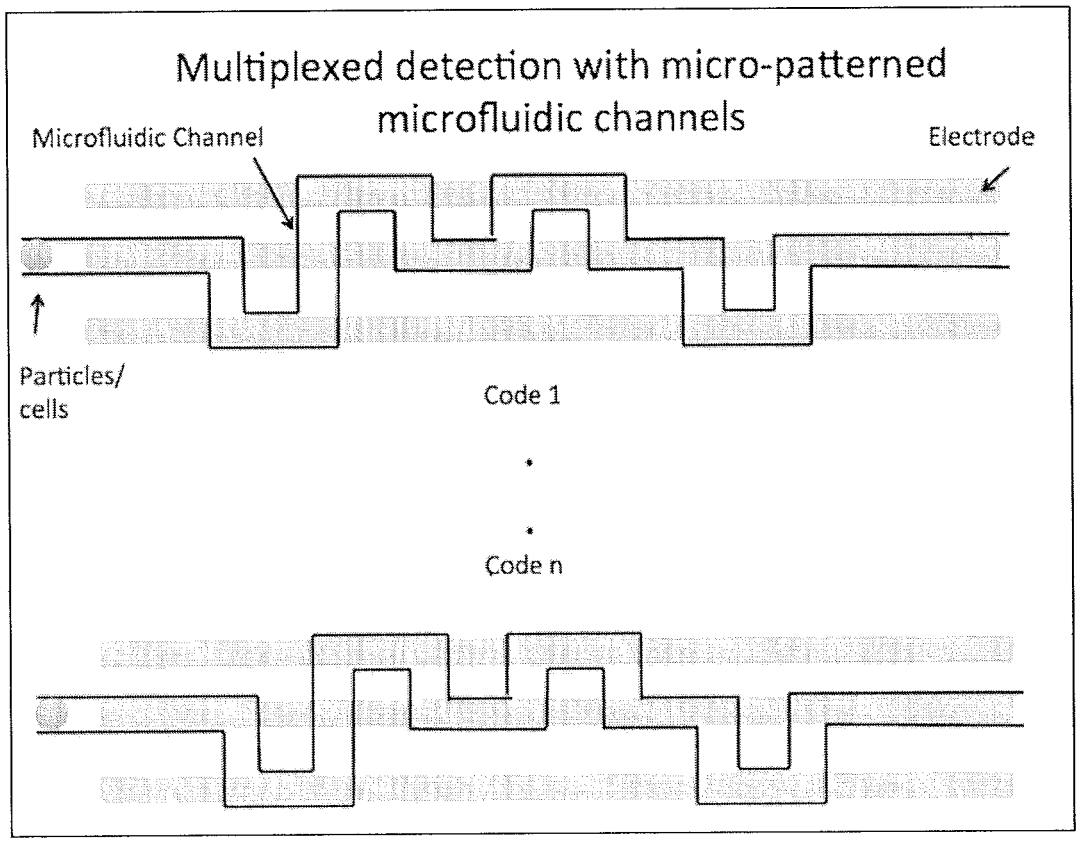
FIG. 49 shows a schematic demonstrating multiplexed detection of particles with micropatterened microfluidic channel instead of or in addition to electrodes. The microfluidic channels can be arbitrarily shaped to generate distinguishable signals.

As shown in FIG. 49, the coded fluidic path can be so constructed to cross over one or more sensors (such as a coded electronic sensor 1060 or non-coded sensor) such that the timing and duration that the sensors are stimulated and create a signal in response to a distortion in the fluid caused by a particle creates a unique output signal such that each microchannel can be identified.

The codes produced by the coded fluid paths and/or the coded sensors contained therein, can be Gold sequences, Kasami sequences, Welch codes, or any random signal pattern that can be varied from each other. The codes can be unipolar or bipolar. The codes can be orthogonal or non-orthogonal to each other in any particular group. These codes can also be non-digital. These codes can be analog. The codes can result in a unique waveform being generated.

As shown in FIGS. 2 and 50-58, the coded fluidic paths and devices that can contain one or more coded fluidic paths can be included in a variety of systems to identify, characterize, sort, and otherwise analyze particles in a fluid. The number of coded fluidic paths that can be contained in any single device are only limited by the number of unique codes that can be generated in the coded electronic sensors. The coded fluidic paths can allow for multiplexing analysis to occur without the need to visually inspect the spatial location of a particle of interest on a device using expensive and/or relatively non-portable equipment, such as a microscope. In a system the coded fluidic paths, and in particular the coded and/or non-coded sensors contained therein can be operatively coupled with one or more other components, including, but not limited to a power source, a signal generator, an amplifier, a transmitter, a receiver, a transceiver, a processor, a computer, a memory, a visual interface, a pump, and a sample reservoir. Specific configurations of the various components will be appreciated by one of ordinary skill in the art.

Operation of the Coded Fluid Paths, Devices and Systems

In operation a fluid sample that can contain a particle of interest can be pumped into one or more coded fluid paths as described elsewhere herein. As the fluid sample moves through the coded fluid paths, a particle (if present), can cause a distortion in the fluid, which can be sensed by one or more sensors (coded or non-coded) within the coded fluidic paths. The signal output generated by the one or more sensors can be optionally filtered and/or optionally decoded such that the spatial and/or temporal location of the particle being analyzed can be identified. In some instances, where the configuration of the coded fluid path allows for it, the particle size, number, and other characteristics can be determined based on the various output signals from the sensors as described elsewhere herein.

Uses of the Coded Fluid Paths, Devices, and Systems

The coded fluid paths and devices and systems described herein have a variety of applications. Generally they can be used in any particle analysis method that relies on analyzing a particle via fluid flow. This can include any flow cytometric, liquid chromatographic, flow visualization techniques, and particle flow separation (including, but not limited to immunoseparation and magnetic separation techniques). The coded fluid paths and devices and systems described herein can be used for point-of-care and in-the-field testing of patients and environment as they can eliminate the need for relatively immobile equipment. Other specific applications of the coded fluid paths and devices and systems described herein will be appreciated by one of ordinary skill in the art in view of the instant disclosure.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1

Introduction. Detection and analysis of small particles in liquids are of particular interest in numerous applications ranging from biomedicine to environmental monitoring[1-3]. By spatially tracking particles/cells as they are manipulated on lab-on-a-chip devices (e.g., determining the microfluidic channel they are sorted into or the location on the microfluidic device where they are captured), many biophysical or biochemical assays can be performed[4-10]. To obtain such spatial information however, lab-on-a-chip assays almost always require subsequent microscopic analysis negating the cost and portability benefits of these microfluidic devices. Therefore, a simple integrated sensor that can track particles on a microfluidic chip can enable a new generation of devices with sample-to-answer capability in performing various cellular and molecular assays and will particularly be attractive for point-of-care testing in resource-limited settings.

Among various types of biosensors, Coulter counters allow rapid detection of particles all electronically utilizing a technique called resistive pulse sensing (RPS)[11-13]. In RPS, particles of interest are suspended in an electrolyte and passed through a pore between two electrodes. As each particle displaces the electrolyte in the pore, electrical conduction is reduced temporarily allowing particles to be detected. Enabled by this simple and robust sensing mechanism, Coulter counters are versatile instruments that have been used in analysis of blood cells[14-16], proteins[17-19], DNA molecules[20], viruses[21] and nanoparticles[22]. With the goal of increasing the device throughput, electrical detection of particles in multi-channel microfluidic chips has previously been demonstrated either by allocating a dedicated Coulter counter to each microfluidic channel[23-25] or through multiplexing by electrically driving each microfluidic channel at a distinct frequency[26]. These devices, however, are more complex as they require interfacing with a larger number of electrodes. In addition, the scalability of these devices is limited since number of electrodes to interface increases linearly with the number of microfluidic channels.

Orthogonal detection in multiple microfluidic channels can be achieved in a simple and scalable way if signals from different microfluidic channels can be multiplexed without increasing the number of external connections to the microfluidic chip. For this purpose, our solution is to construct sensors in microfluidic channels such that they each generate distinct signals. RPS signals[27-30] as well as optical signals[31,32] are well suited for this purpose as they can be modulated by engineering the sensor geometry. For example, by micropatterning counter-facing electrodes[27], co-planar electrodes[30] or the microfluidic channel itself[28,29], several groups have used RPS pulse waveforms to increase the sensitivity in detection of small particles flowing through a microfluidic channel. On the other hand, generating truly distinguishable signals to orthogonally detect particles in multiple microfluidic channels without increasing the device complexity requires special consideration in coding, sensor design and device layout.

In this Example a scalable electronic sensor that utilizes code division multiple access (CDMA)[33], a spread spectrum telecommunications technique, for orthogonal detection of particles in multiple microfluidic channels from a single electrical output is demonstrated. This technology is also referred to herein as microfluidic Coded Orthogonal Detection by Electrical Sensing or microfluidic CODES in short. Microfabrication techniques were used to create coplanar electrodes such that particles passing over these electrodes produce bipolar digital codes, similar to the digital codes used in CDMA communication networks to differentiate between cell phone users. These codes are designed to be orthogonal to each other so that they can easily be distinguished through computation even when they overlap. Microfluidic CODES is simple and also scalable; it uses only 3 electrodes and can in theory be adapted to orthogonally detect particles in an arbitrary number of microfluidic channels. A microfluidic device was created with four microfluidic channels (FIG. 1A). Using human ovarian cancer cells in phosphate-buffered saline (PBS) as a model biological system, it was demonstrated that individual cells in each microfluidic channel could be uniquely detected.

Design of Digital Spreading Codes. CDMA is a spread spectrum communication technique in which multiple users can simultaneously communicate with a base station while sharing the same transmission channel. In CDMA, users' signals are transmitted at the same time and within the same frequency band, while multiplexing is achieved by modulating the information in each user with a unique digital spreading code called a digital spreading code. Digital spreading codes are specifically designed to retrieve information in the presence of interference from other users by using a decoding scheme matched to the encoding digital code.

Designing truly distinguishable spreading codes is important to the success of a CDMA system. Mathematically, the similarity between two discrete digital codes (x and y) is defined by a correlation function given by Equation 1 (Eq. 1), where n is the number of bits. For optimal performance, the set of CDMA digital spreading codes should be designed to be orthogonal. That is, the correlation between different digital spreading codes (i.e., cross-correlation) is zero, while the correlation of the spreading code with itself (i.e., autocorrelation) is maximized.

$$R_{xy} = \sum_{i=0}^{n} x_i \cdot y_i \quad \text{Eq. 1}$$

Figures 5A, 5B:
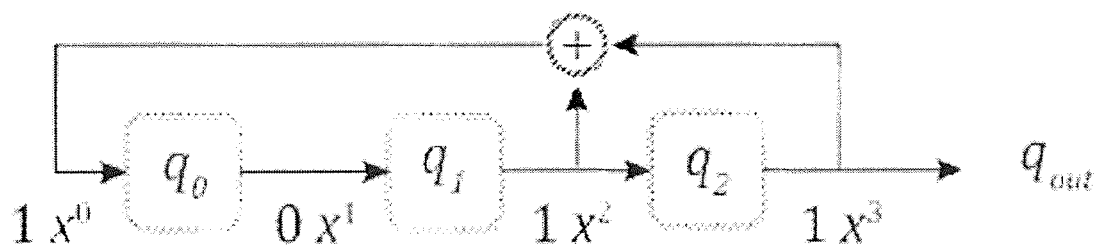
FIGS. 5A-5B depict the design and generation of m-sequences using linear feedback shift registers in the design of the digital spreading codes.
Figure 6A:
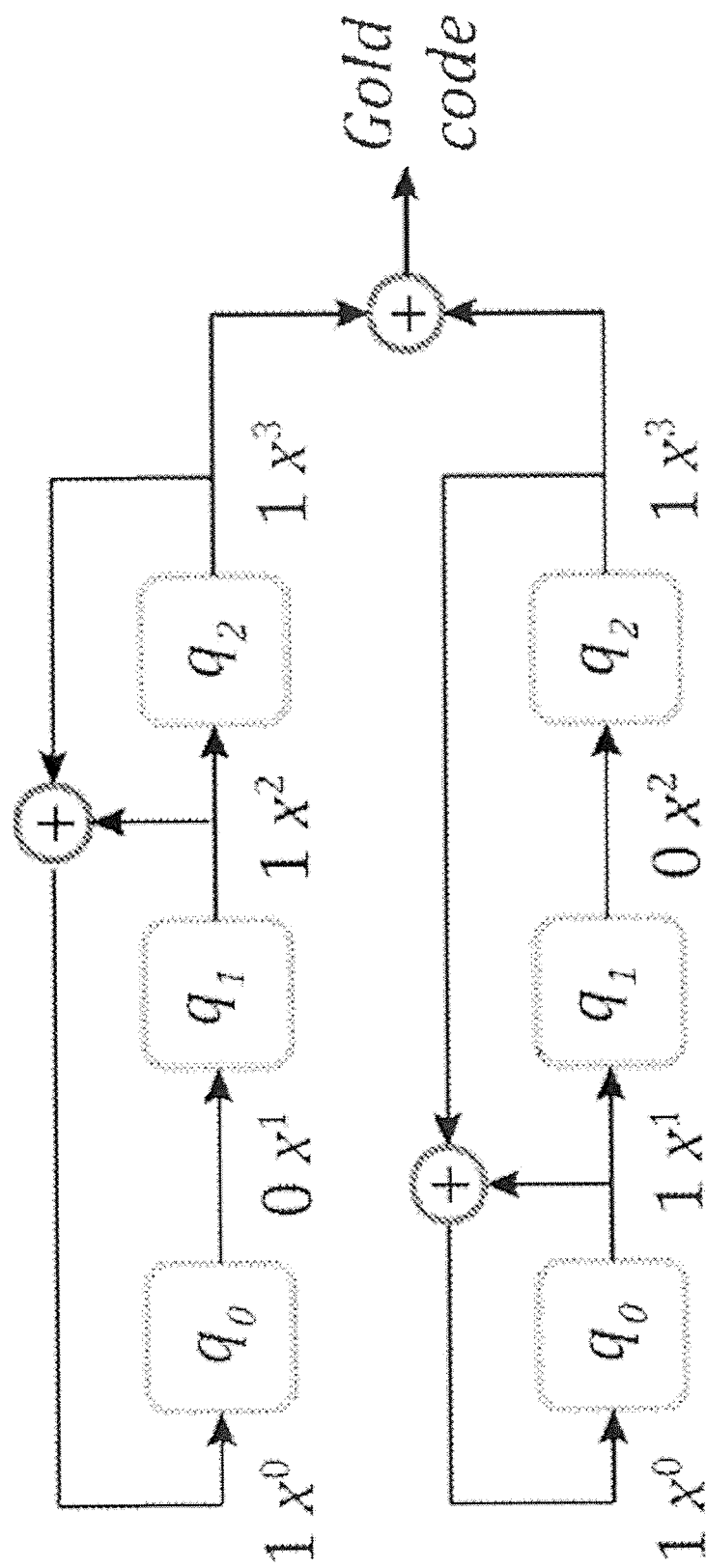
FIGS. 6A-6B depict a schematic of linear feedback shift registers (FIG. 6A) for the generation of the Gold codes and graphs (FIG. 6B) demonstrating the results from the correlation analysis of the 7-bit Gold codes for each of 4 sensors.
Figure 6B:
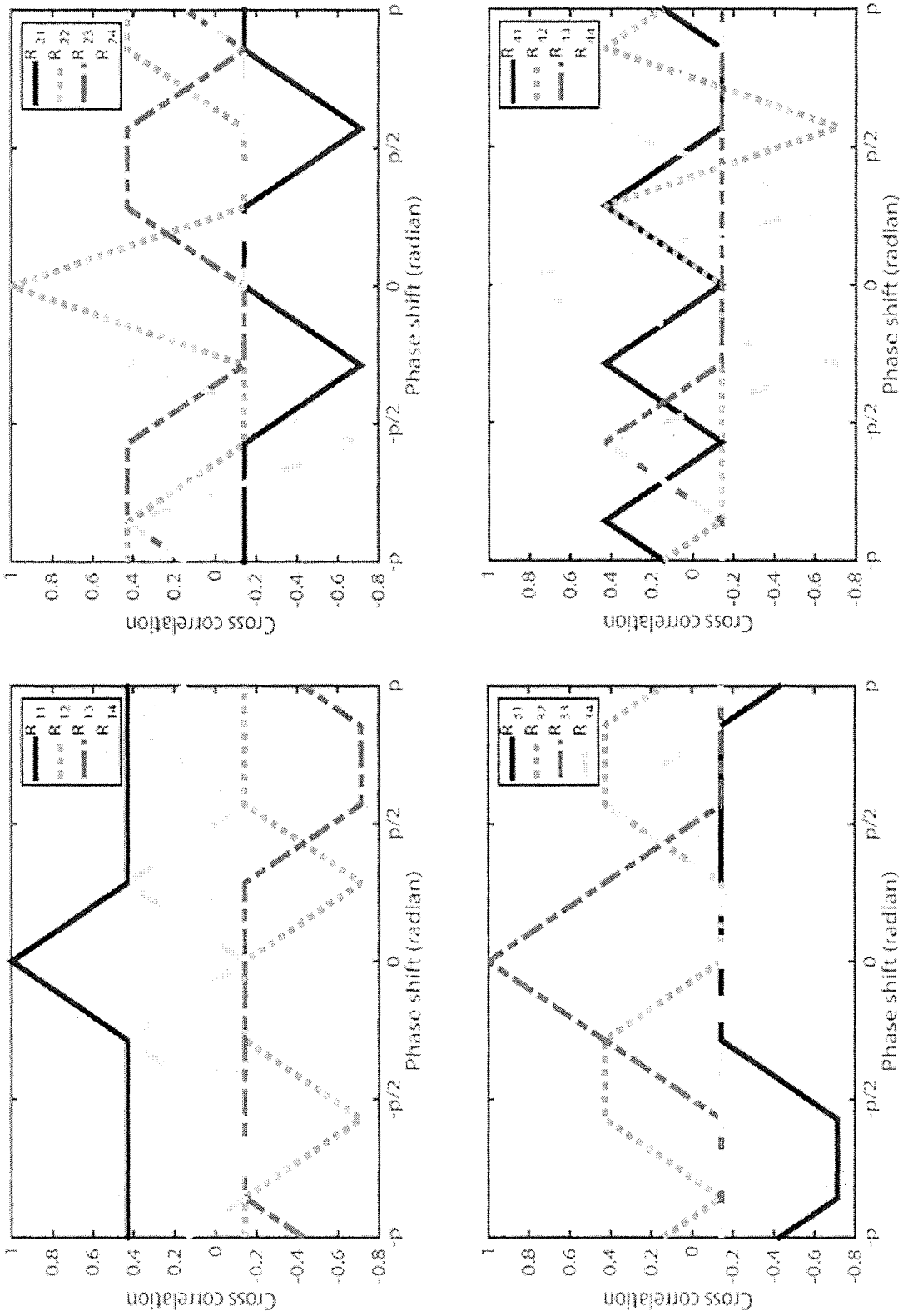

One aspect of the CDMA system that affects the design of spreading codes is its timing properties, i.e., whether the system is synchronous or asynchronous. The microfluidic CODES device with coded (e.g. digitally) channels (e.g. microfluidic channels) can be considered as an asynchronous CDMA system because cells arrive at microfluidic channels at random times. Therefore, the digital spreading codes demonstrated herein should work even when they are misaligned with random phase shifts. While it is not possible to design perfectly orthogonal signals for an asynchronous CDMA system, various quasi-orthogonal spreading codes for asynchronous systems exist[34]. Among these, Gold sequences[35,36] are commonly used to minimize multi-user interference in CDMA communication as they have both desirable autocorrelation and cross correlation properties. Here, Gold sequences were used to encode microfluidic channels in the device Demonstrated in this Example is a microfluidic chip generated with four 7-bit long Gold sequences to encode four microfluidic channels in the device. Briefly, the design process was as follows: first, two linear feedback shift-registers (LFSR) were used representing two primitive polynomials ($x^3+x^2+1$ and $x^3+x+1$) to generate a preferred pair of 7-bit maximal length pseudorandom noise sequences (m-sequences). Second, cyclic shifts of preferred pair of m-sequences ($m_1$=1001011 and $m_2$=1110100) were added in mod 2 to generate four distinct Gold codes, specifically $g_1$=1010110, $g_2$=0111111, $g_3$=0100010, $g_4$=0011000. Finally, Gold codes were validated by analyzing their autocorrelation and cross-correlation properties. FIGS. 5A-6B show the mathematical design and generation of the digital spreading codes. FIGS. 5A-5B depict the generation of m-sequences and FIGS. 6A-6B depict generation (FIG. 6A) and analysis (FIG. 6B) of the Gold codes for the 4 microfluidic channel device provided herein. FIG. 6B shows the periodical correlation of four Gold codes. An auto-correlation peak can be robustly identified from cross-correlations.

Figure 7:
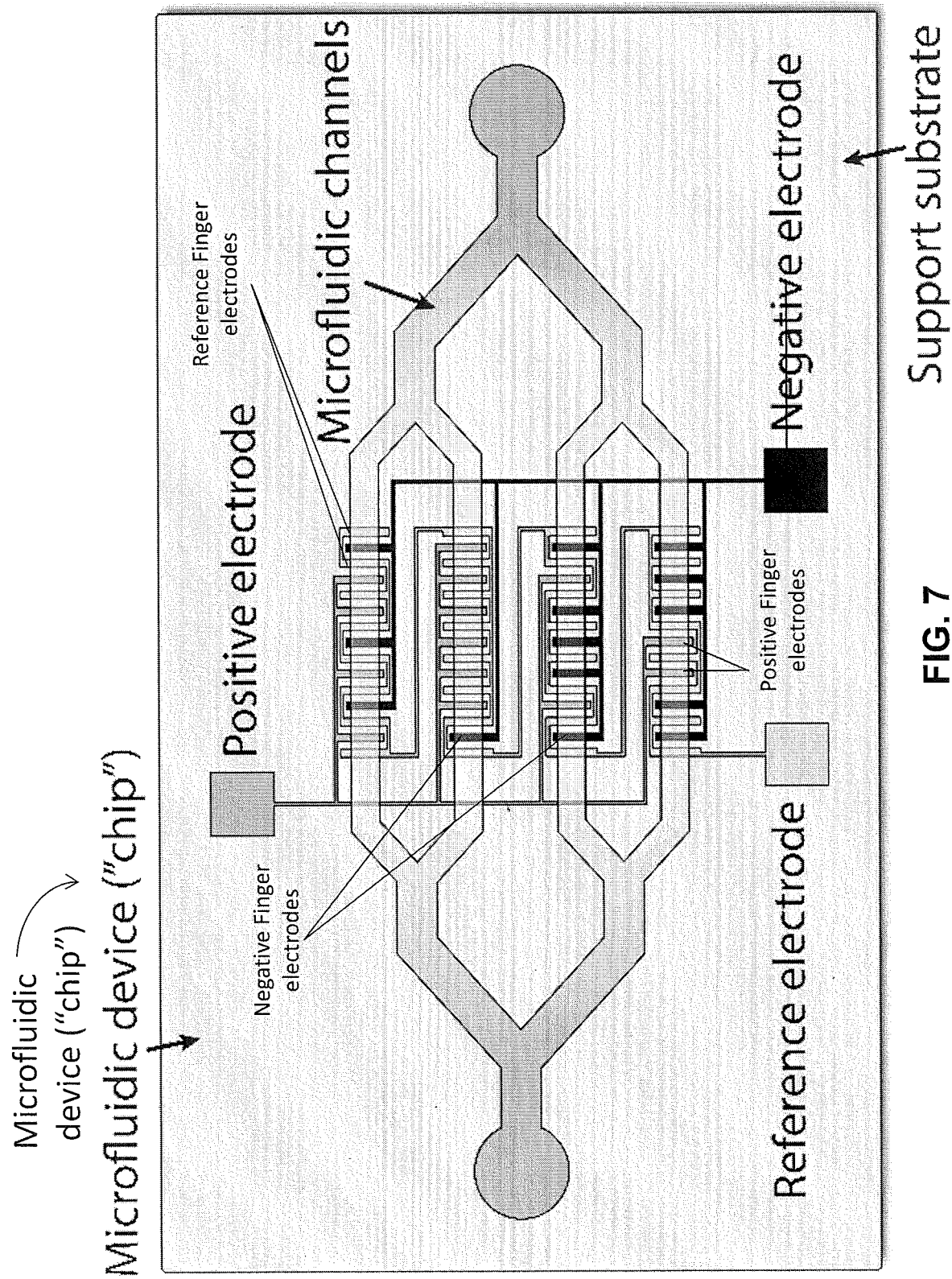
FIG. 7 shows one embodiment of a microfluidic device (e.g. a microfluidic chip) that includes the microfluidic CODES technology. Three electrodes were micromachined. The reference electrode was connected with the AC power source, and provides the power for the device. Then current change was measured between the reference electrode and the sensing electrodes (positive and negative) when a particle is passing through. The positive and negative sensing electrodes generates a bi-polar signal, which can be desirable due to its correlation property.
Figure 9:
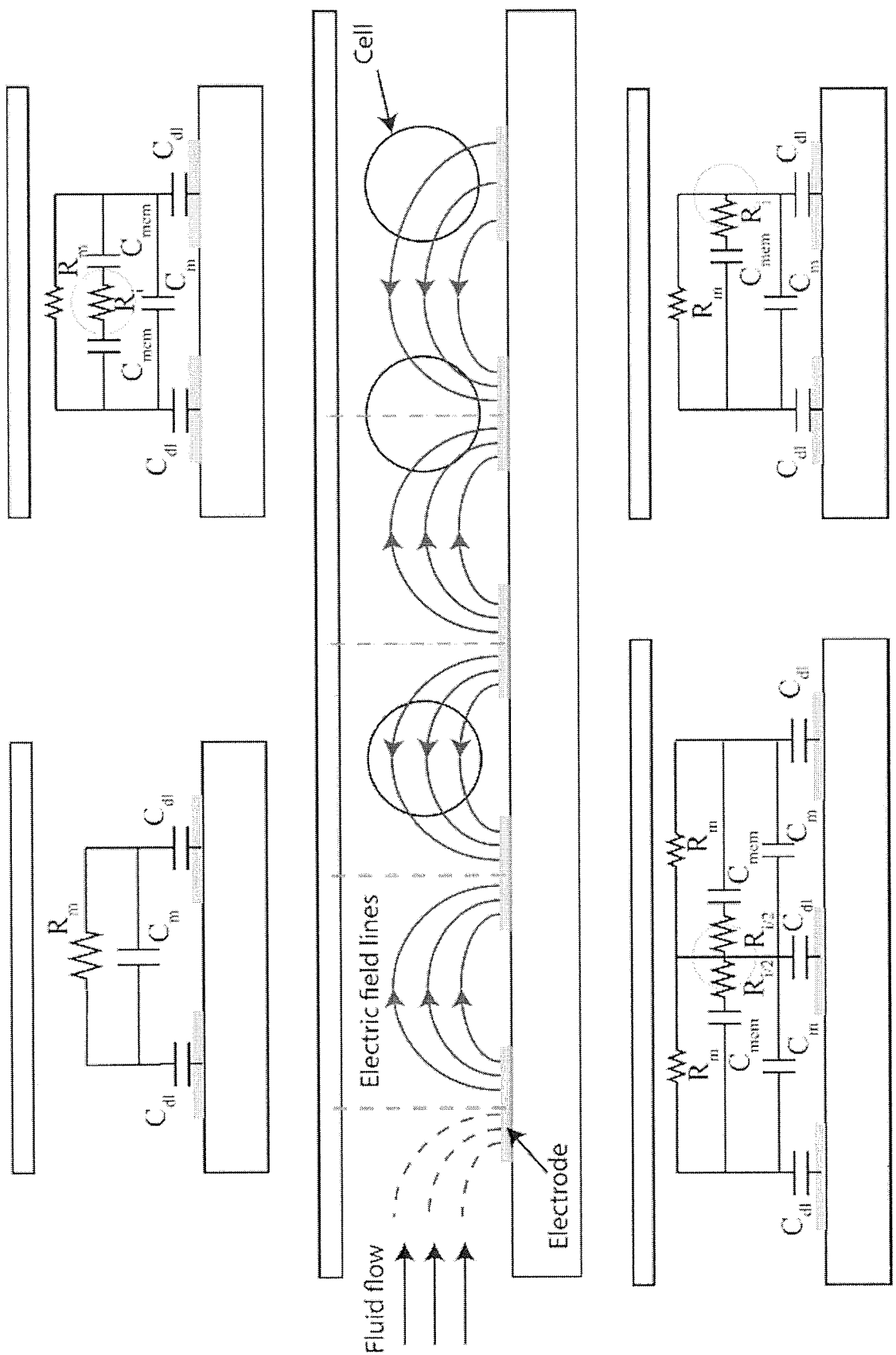
FIG. 9 shows an equivalent electrical circuit model of the interaction between the cell and the electrode array in the microfluidic channel.
Figure 10:
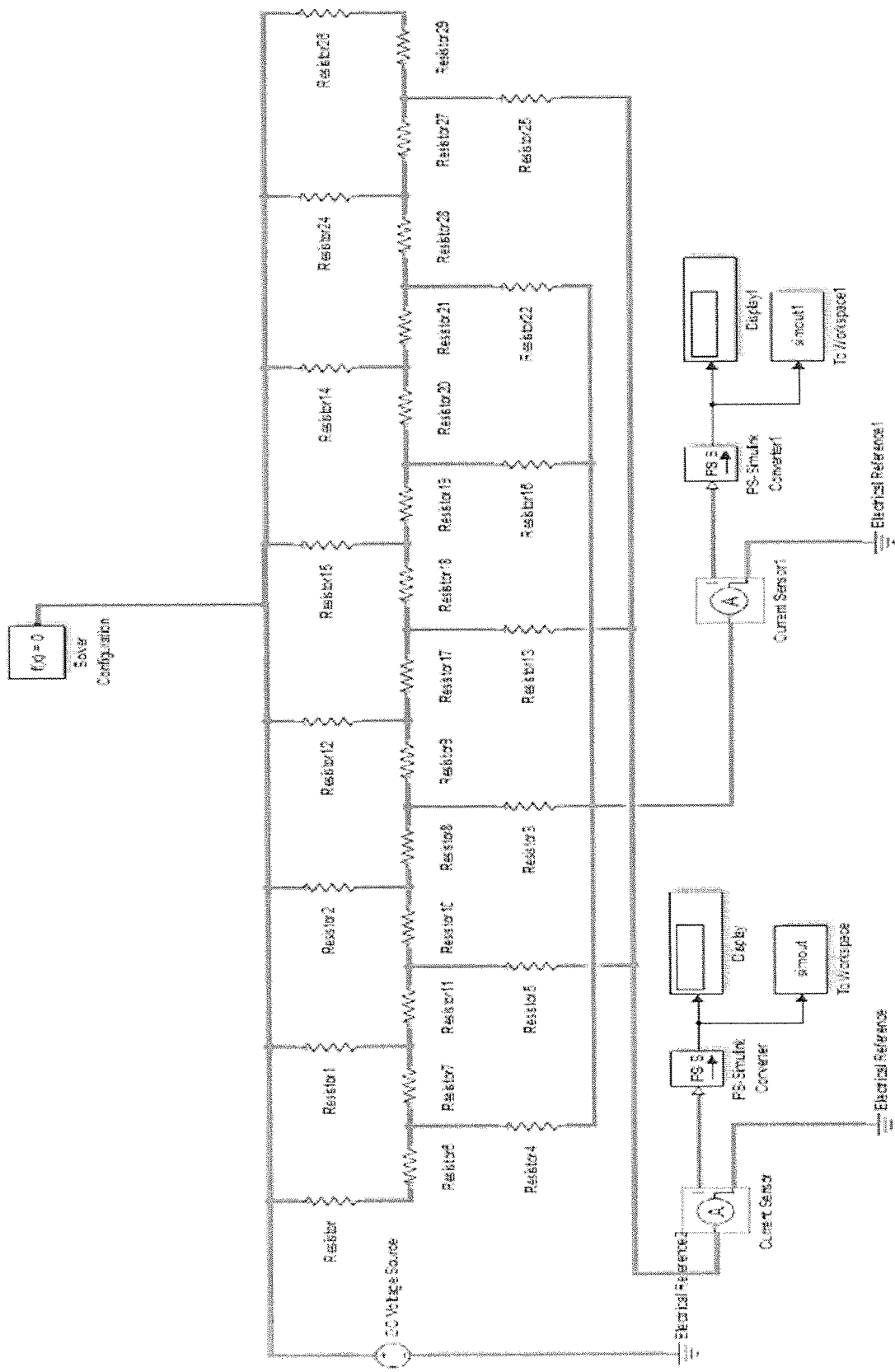
FIG. 10 shows an equivalent circuit model (built with MATLAB SIMULINK) of the electronic sensor in a microfluidic device.
Figure 11:
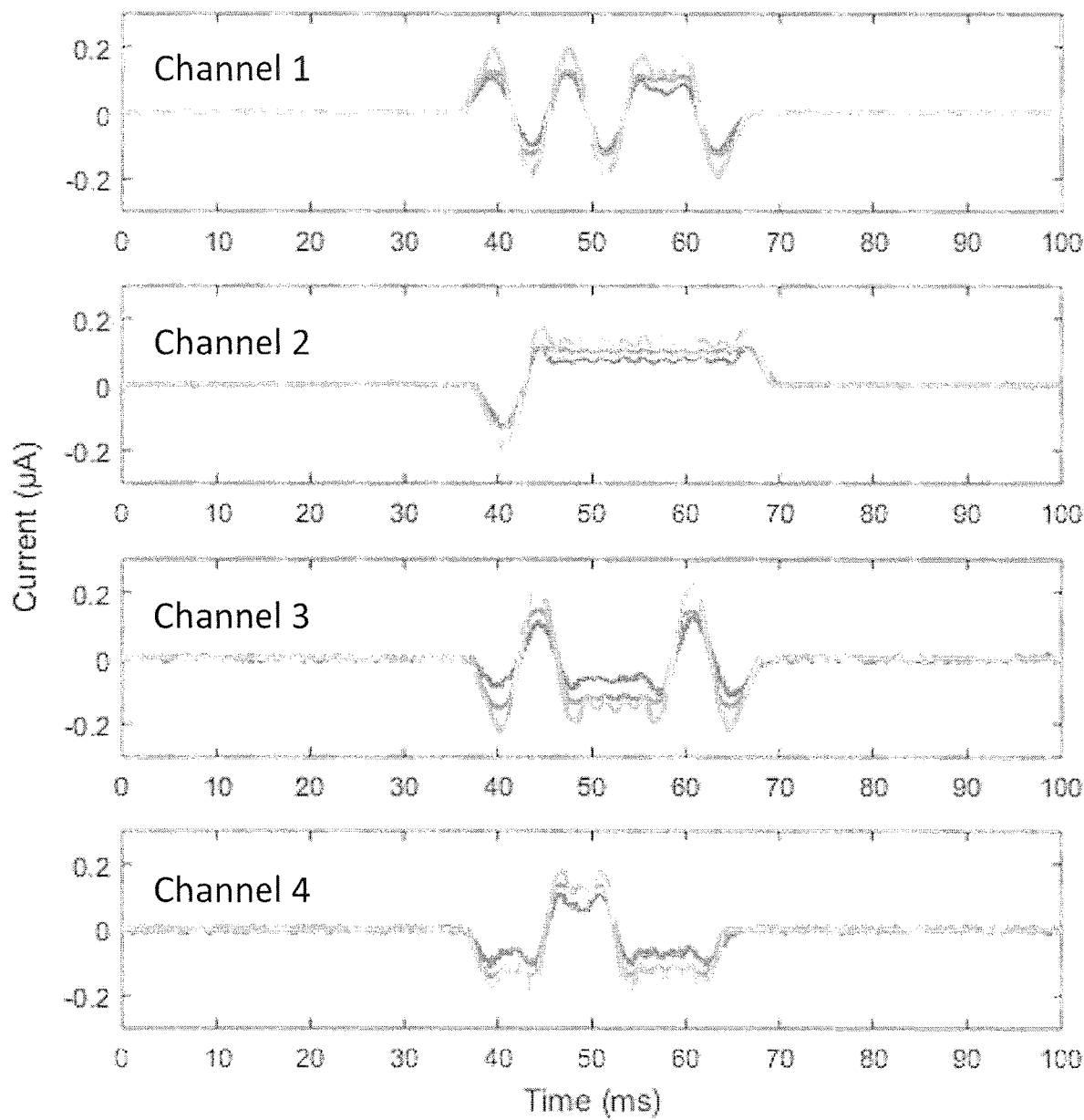
FIG. 11 shows graphs demonstrating the results of the circuit modeling for the electronic sensor array for four sensors encoded with four different digital codes, comparing to experimental signals and COMSOL finite element analysis results.

Design of the Microfluidic Chip. FIG. 7 shows one embodiment of a microfluidic device (e.g. a microfluidic chip) that includes the microfluidic CODES technology. To demonstrate the microfluidic CODES technology, a device with four microfluidic channels was designed and built (FIG. 1B). In this device, three coplanar electrodes are micropatterned to create arrays of uniformly spaced about 10 μm-wide fingers at the bases of each microfluidic channel. Finger-to-finger distance is approximately equal to the size of a cell so that the conduction between each pair is locally modulated as the cells flow over them. It will be appreciated that the cell size can vary depending on the type of cell(s) being analyzed and therefore the finger-to-finger distance can be varied accordingly. Therefore, sequential interaction of each cell with finger electrode pairs in the array generates a series of electrical pulses, which are then used to generate digital spreading codes. FIGS. 9-11 shows a schematic demonstrating modeling of the sensor based on the Foster-Schwan model a model circuit for the electronic sensor (FIG. 10), and a comparison between real signals and equivalent circuit model simulation results for each channel in a four channel microfluidic device (FIG. 11).

An advantage of the electrode design described here is that it can generate bipolar signals. In CDMA, bipolar signals are preferred over unipolar signals because the absence of negative values leads to non-ideal cross-correlation properties[37-38]. Because impedance modulation between two electrodes is inherently unipolar, an extra reference electrode was placed in between and the differential impedance modulation was used to generate a bipolar signal[14].

With the microfluidic CODES technology, a systematic approach was used that can be adapted to generate any digital spreading code for encoding an arbitrary number of microfluidic channels (FIG. 1B). First, positive and negative electrodes were placed on the opposite sides of each microfluidic channel. These electrodes each extend into the microfluidic channel through finger electrodes. For each microfluidic channel, positive and negative fingers were ordered to follow the unique digital spreading code. Second, the reference electrode fingers were placed in between coding fingers. In this configuration, each bit spatially corresponds to center-to-center distance between reference electrode fingers, while the coding electrode in between determines the bit polarity (FIG. 1C). Finally, to minimize undesired conduction in microfluidic channels outside the coding region, the coding electrode traces were placed far from the outer reference finger electrodes (FIG. 1B).

The system was further designed to detect differential impedance changes caused by flowing cells with maximum sensitivity. Since the electrodes monitor all microfluidic channels, cells flowing in a single microfluidic channel lead to only small changes in the overall impedance. Such small changes can easily be dominated by static differential impedance unless static impedances between the reference and coding electrodes are balanced. To balance the system, an equal total number of positive and negative electrode fingers was used. Therefore, a digital spreading code set with an equal total number of 1s and 0s was designed. When balanced this way, the microfluidic chip demonstrated here is not only more sensitive but also more robust to changes in fluid or material properties than current microfluidic chips.

In addition to the electrode layout, the design of the microfluidic layer is also important for proper operation. Unlike a CDMA telecommunication network in which signals are digitally generated based on stable clock signals, temporal properties of our digital codes are determined by flow speeds of individual cells. As such, variations in cell flow speed lead to differences in digital code durations perturbing favorable cross-correlation properties of the designed digital code set. To minimize such variations, the microfluidic CODES device provided herein was designed such that fluid flows at the same rate in all microfluidic channels and remains constant across the coding region. In our device, we achieve this by designing each microfluidic channel with uniform cross sections and with equal hydraulic resistance. In addition, we designed the microfluidic channel cross section to be close to the cell size so that (1) cell speed is less affected by the parabolic flow profile across the microfluidic channel, (2) total sensing volume is minimized to reduce cell overlapping, and (3) cells remain close to the surface electrodes increasing the device sensitivity.

Figure 13:
FIG. 13 depicts one embodiment of a process to fabricate and manufacture the microfluidic device having a multiplexed electronic sensor array.
Figure 13:
Figure 13:
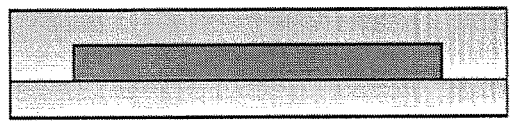
Figure 13:
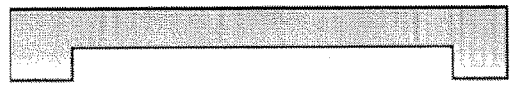
Figure 13:
Figure 13:
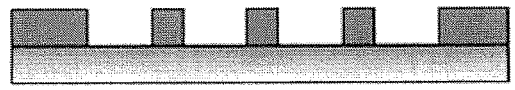
Figure 13:
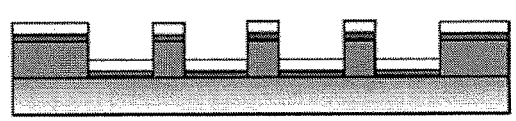
Figure 13:
Figure 13:
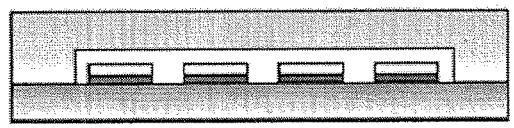
Figure 14A:
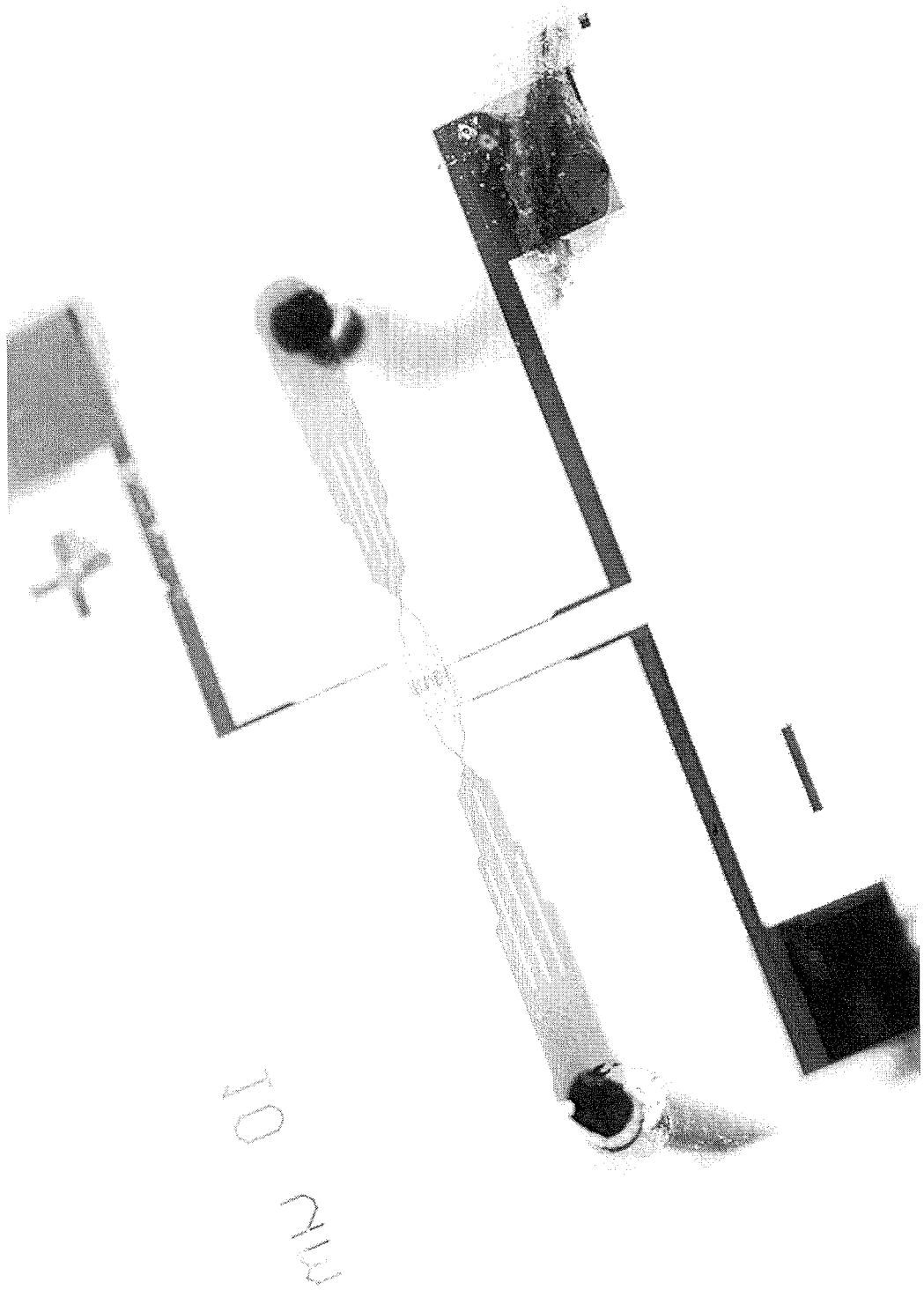
FIGS. 14A-14B shows images of a fabricated microfluidic devices having a multiplexed electronic sensor array capable of detecting particles, such as cells.
Figure 14B:
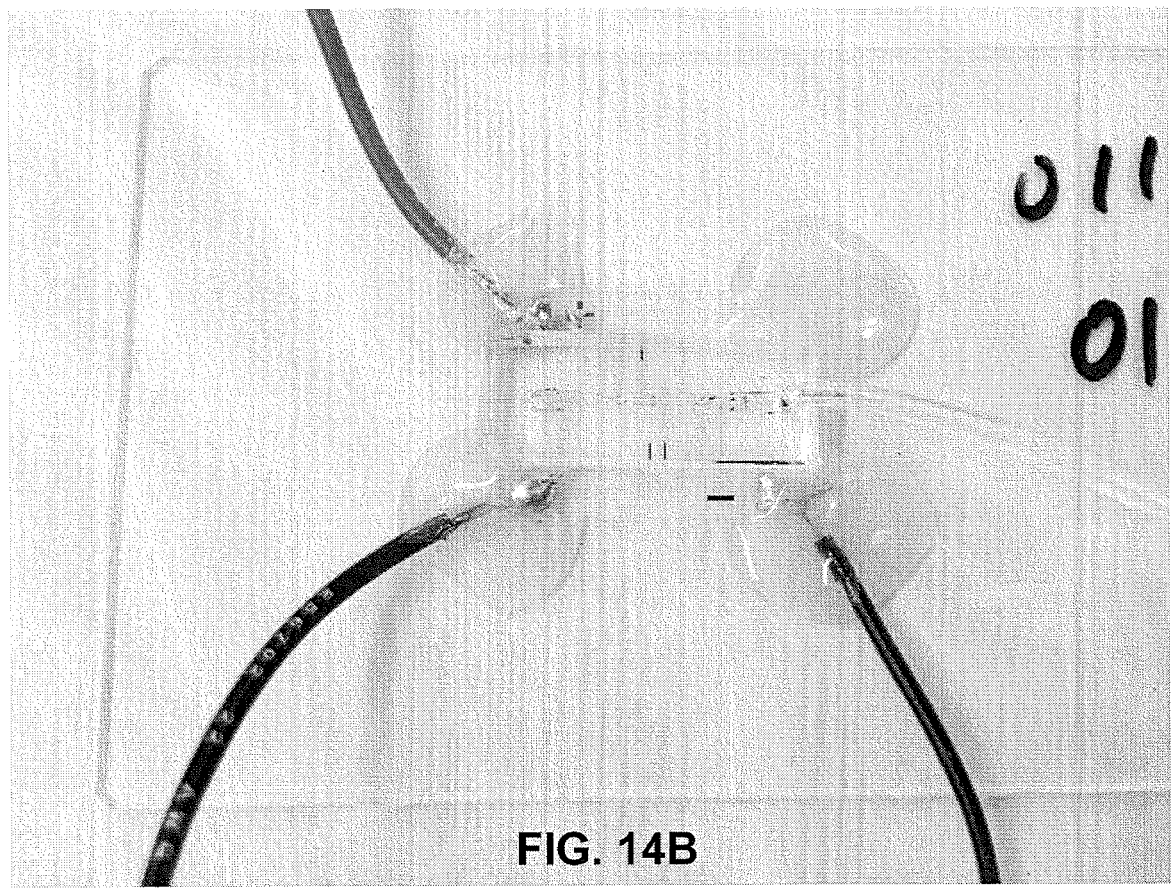

Experimental Methods. The device was composed of a glass substrate with surface electrodes that generate digital spreading codes and a polydimethylsiloxane (PDMS) microfluidic layer. The device was fabricated using conventional microfabrication techniques and soft lithography. An example fabrication process is shown in FIG. 13. FIG. 14 shows an image of a fabricated microfluidic device having a multiplexed electronic sensor array capable of detecting particles, such as cells. Surface electrodes on a glass wafer were created using lift-off process. 1.5 μm-thick negative photoresist was patterned using optical lithography followed by e-beam deposition of 20 nm-thick Cr and 80 nm-thick Au film stack. The lift-off process was completed in acetone under mild sonication and the patterned wafer was diced to create individual chips. The microfluidic layer was fabricated using soft lithography. 15 μm-thick SU-8 photoresist was patterned on a silicon wafer using optical lithography to fabricate the mold. PDMS prepolymer and crosslinker (Sylgard 184, Dow Corning) were mixed at 10:1 ratio and poured on the mold, degassed, and then cured at 65° C. for 4 hours. Cured PDMS peeled off from the mold and glass substrate with surface electrodes were activated in oxygen plasma, aligned and bonded to create the final device (FIG. 1B).

As a model biological sample, cells suspended in PBS were used. HeyA8 ovarian cancer cell line were cultured (obtained from Dr. John F. McDonald, Georgia Institute of Technology) in RPMI 1640 (Mediatech; Cellgro, Herndon, Va.) supplemented with 10% FBS (Fetal Bovine Serum; Seradigm, Radnor, Pa.) and 1% penicillin-streptomycin (aMResco, Solon, Ohio) in 5% CO2 atmosphere at 37° C. until they reached about 80% confluence. Following trypsinization for about 2 minutes, cells were pelleted, suspended in PBS and mixed with gentle pipetting to mechanically dissociate any cell clusters.

Figure 8A:
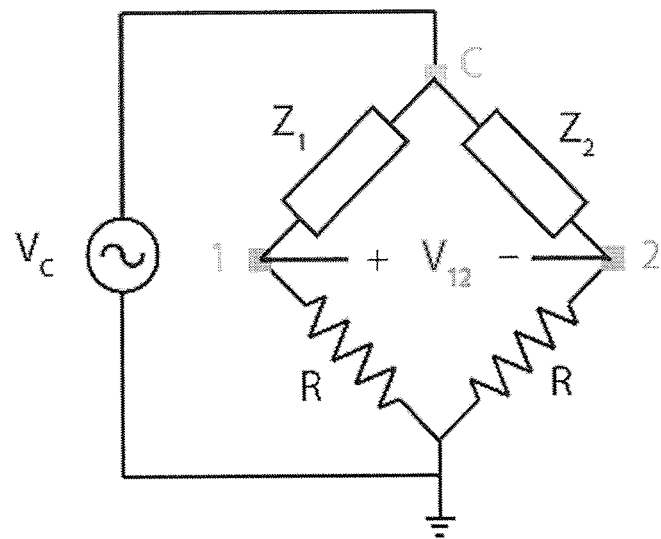
FIGS. 8A and 8B show one embodiment of operation of the microfluidic device of FIG. 7. Black finger electrodes are negative finger electrodes. Dark gray finger electrodes are positive finger electrodes. Light gray finger electrodes are reference finger electrodes.
Figure 8B:
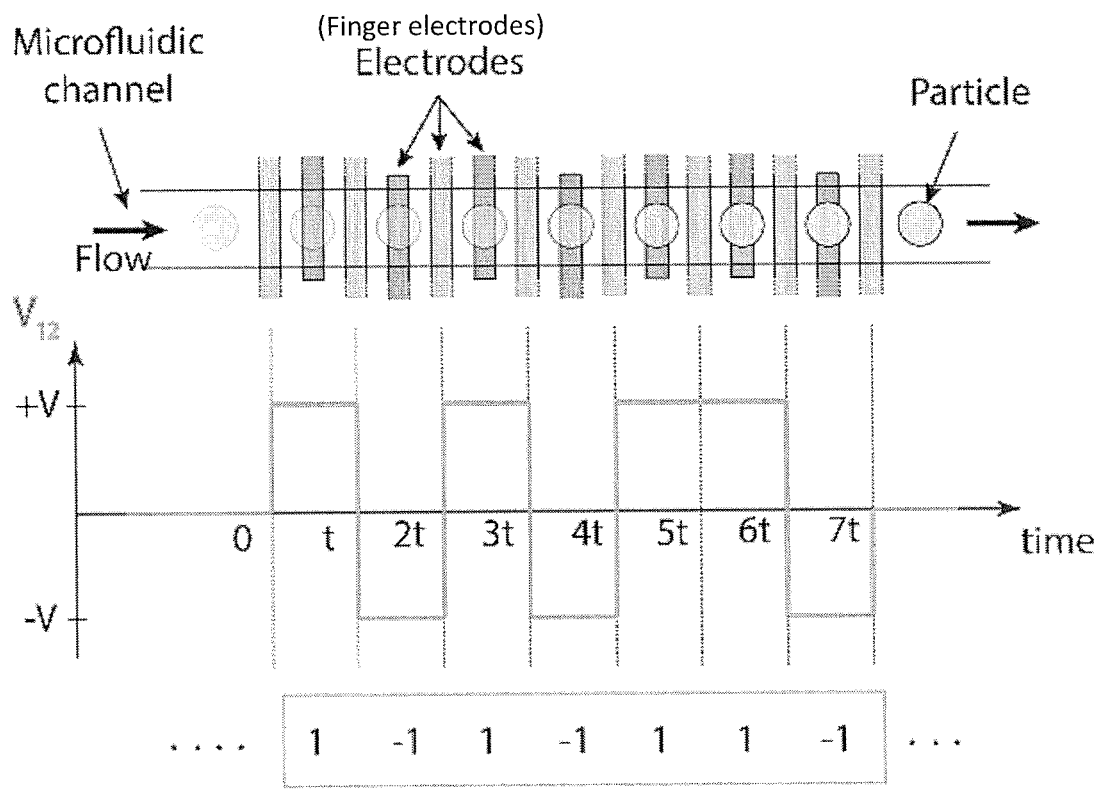
Figure 12:
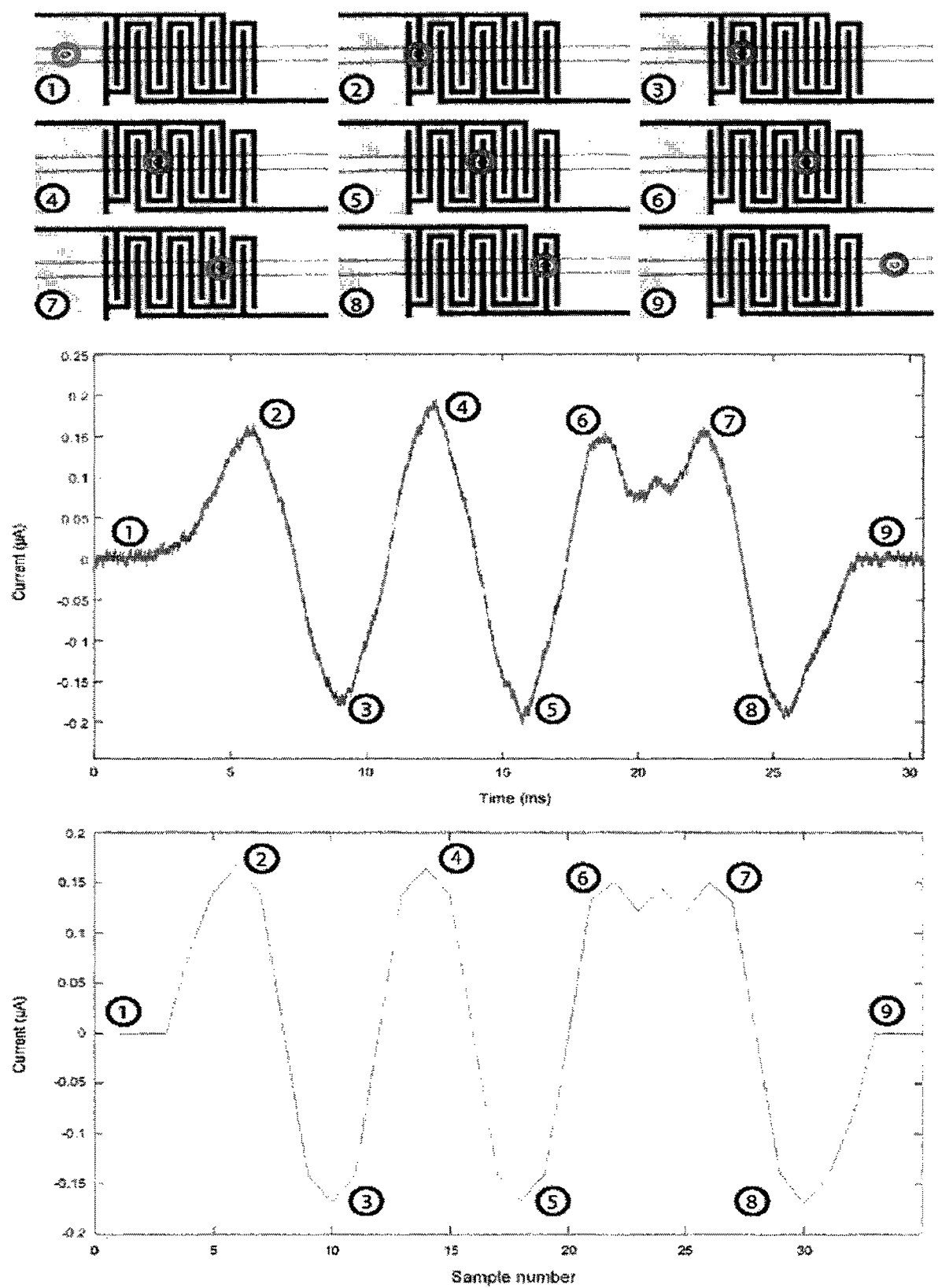
FIG. 12 shows the experimentally obtained output signal from the sensor as particles (e.g. cells) move through a microchannel and by the finger electrodes, comparing to equivalent circuit model simulation.

The measurement setup included a syringe pump for driving the cells through the microfluidic chip at 100 μl/hr, electronic hardware for data acquisition and processing of sensor signals, and an optical microscope equipped with a high-speed camera for the visual analysis of cell flow in microfluidic channels (FIG. 2). From a circuit point of view, the overall sensor network can be represented as a lumped model with two variable impedances between the reference electrode and the two coding-electrodes independent of the number of code-multiplexed sensors in our device (FIG. 8A). When the system is at rest (i.e., no particles), the two impedances are balanced, which we achieve by designing the sensor network to have the same total number of positive and negative coding electrodes. In operation, particles flowing in any microfluidic channel sequentially interact with electrodes and dynamically modulate the channel impedance intermittently unbalancing the circuit (FIG. 8B). We detect these changes by applying an AC signal to the reference electrode measuring the differential current flow from the two branches of the circuit. As a result, a particle flowing over an encoded sensor produces a time waveform that is determined by the order of underlying electrodes. FIG. 12 shows a recorded sensor waveform and a simulated waveform from our equivalent circuit model for the sensor encoding the signal 1010110. In addition, a series of images indicate the position of the cell in the microfluidic channel corresponding to different time-points in the code waveform (FIG. 6a). The model results match closely with the recorded sensor signals and successfully capture the deviations from an ideal pulse waveform.

Digital spreading codes were generated by detecting the changes in the magnitude of electrical current as cells flow through microfluidic channels. For this purpose, the system was driven from the reference electrode with a sine wave at about 400 kHz, specifically to bypass the double layer capacitances at the electrode-liquid interface. Current flow from negative and positive coding electrodes was independently measured using two transimpedance amplifiers. These signals were then subtracted from each other using a differential amplifier to obtain a bipolar signal. Specifically, the positive electrode signal was subtracted from the negative electrode signal so that reduced electrical current leads to positive peaks in the output. The magnitude of this differential signal was measured using a lock-in amplifier. Lock-in amplifier output was then sampled at 1 MHz into a computer using a data acquisition board to decode digital spreading codes.

Through the transparent glass substrate, cell flow through coding electrodes was optically analyzed to validate acquired electrical signals. The microfluidic chip was imaged using an inverted optical microscope (Nikon Eclipse Ti-E) equipped with a high-speed camera (Vision Research Phantom v7.3). Movies of the cells were recorded at 8000 frames per second so that they could be resolved as they passed through the microfluidic channels within milliseconds. The recorded videos were then downloaded onto a computer to be analyzed frame by frame.

Results and Discussion. Digital spreading codes corresponding to each microfluidic channel were easily identified in the recorded electrical waveform. The measured code signals closely matched the designed digital spreading codes (FIGS. 3A-3D, top graphs). Deviations from ideal square pulses can be attributed to several factors including non-uniform electric field between coplanar electrodes, spherical cell shape, and continuous (i.e., not pulsatile) flow of cells in microfluidic channels.

To decode electrical signals, a template library was first created using experimentally obtained digital codes signals corresponding to each microfluidic channel. The template library included four measured, normalized code signals and their computer generated versions with varying durations to accommodate differences in flow speed between different cells. By correlating the recorded electrical signal with all of the templates in the library, the specific template that maximized the amplitude of the autocorrelation peak was determined. From this template, the following was obtained: (1) the specific microfluidic channel the cell passed through and (2) the digital code signal duration and hence the cell transit time (FIGS. 3A-3D, bottom graphs). Note that an autocorrelation peak can robustly be identified in this process because the digital codes for each microfluidic channel are designed to be orthogonal to each other. Specifically, the peak amplitude of periodic cross-correlation between 7-bit Gold sequences corresponding two different microfluidic channels is bounded and can only be as high as about 40% of the autocorrelation peak theoretically.

An important feature of the microfluidic CODES technology is that it can also resolve cells in microfluidic channels even when multiple cells simultaneously occupy the coding electrodes. When cells overlapped, signals due to different cells interfere and the recorded electrical signal cannot be readily associated with a single template corresponding to a specific microfluidic channel. Resolving such overlapping cells, however, is particularly important for processing samples with high cell density, where cells are more likely to overlap.

Figure 4A:
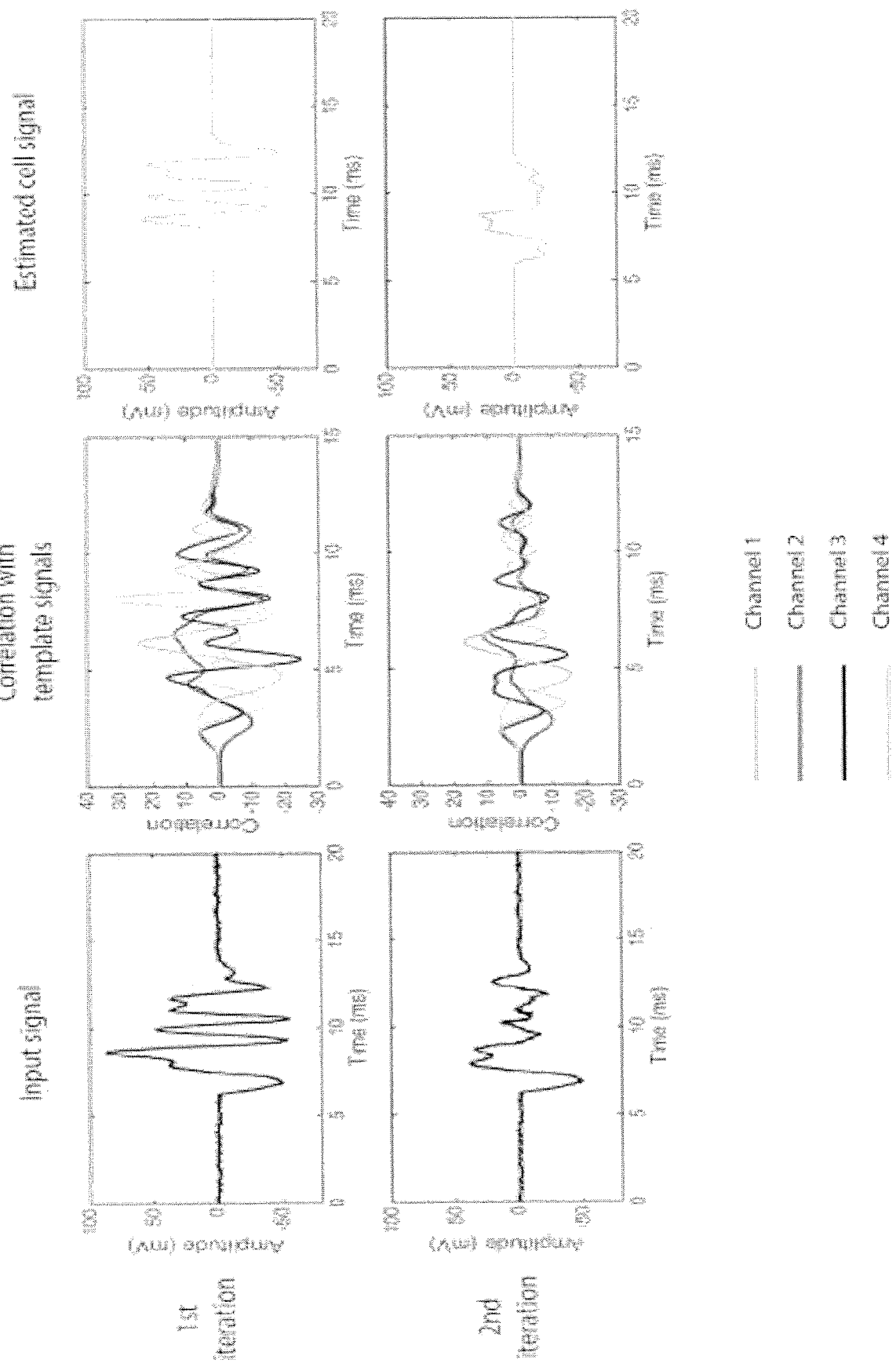
FIGS. 4A-4D demonstrate decoding the overlapping signals with successive interference cancellation.
Figure 4B:
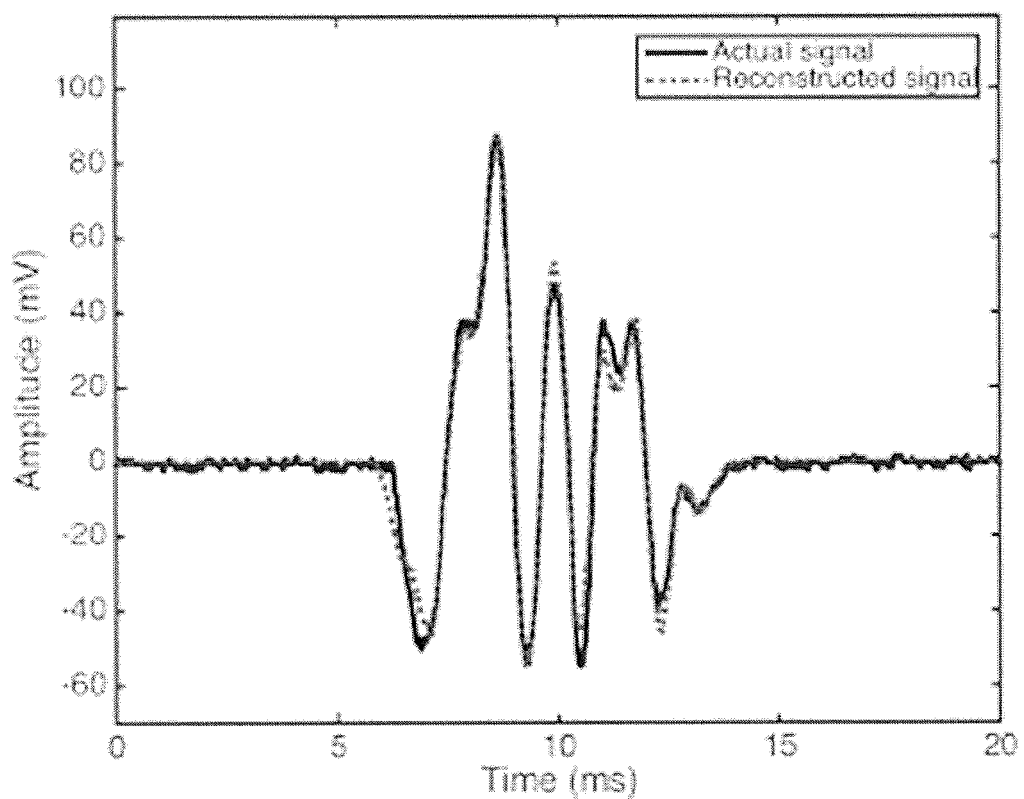
Figure 4C:
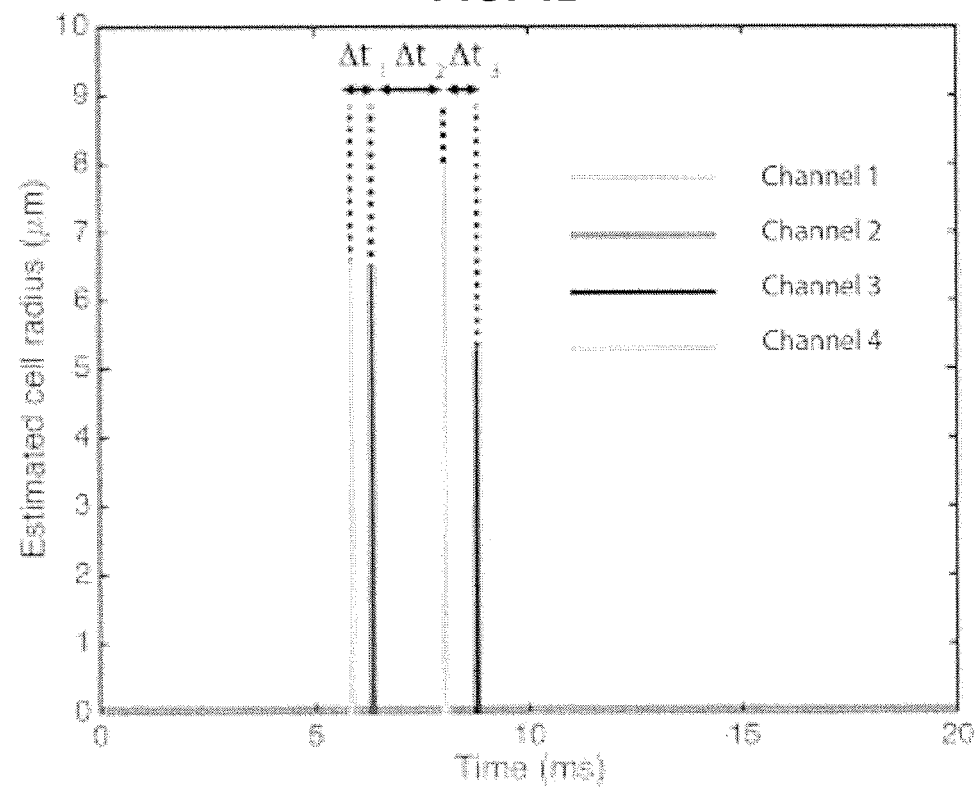
Figure 4D:
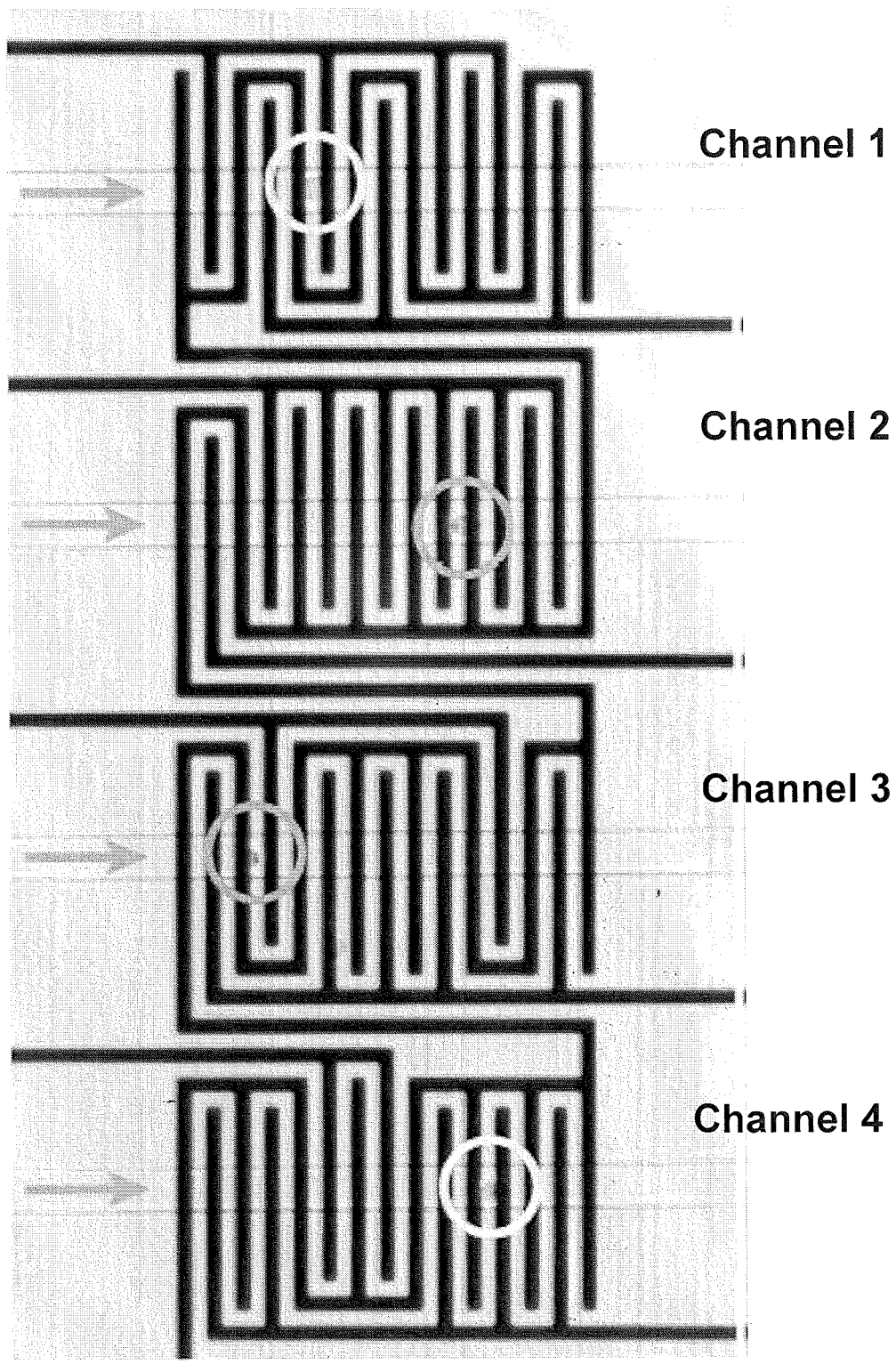

To demonstrate how microfluidic CODES can resolve overlapping cells, a device that involved four overlapping cells in four different microfluidic channels (FIGS. 4A-4D) is demonstrated herein. To resolve signals corresponding to individual cells, an iterative approach based on the successive interference cancellation scheme[39] used for multi-user detection in CDMA was developed. First, the dominant autocorrelation peak corresponding to the strongest interfering signal was determined by correlating the recorded waveform with the template library (FIG. 4A, $1^{st}$ row, $2^{nd}$ plot). Using the amplitude and time of the autocorrelation peak as well as the template used, the signal due to this specific cell was estimated (FIG. 4A, $1^{st}$ row, $3^{rd}$ plot). This estimated signal was then subtracted from the original signal, effectively removing the interference due to the largest cell (FIG. 4A, 2nd row, 1st plot). This process was iterated until the correlation of the template library with the residual signal did not produce a clear autocorrelation peak for any channel (FIG. 4A, $5^{th}$ row, $2^{nd}$ plot). Specifically, the process was terminated when none of templates correlated with the normalized residual signal led to a correlation coefficient greater than 0.5. Following termination of the interference cancellation process, an optimization process was run, where the amplitude and duration of estimated cell signals were refined to produce the best fit with the recorded electrical signal based on least-squares approximation (FIG. 4B). At the end of this optimization process, the spatial information (the specific microfluidic channel the cell is in), amplitude of the signal, and the timing of each overlapping cell (FIG. 4C) was determined. Simultaneously recorded high-speed microscopy confirmed the results demonstrating the microfluidic channels that the cells were in and also their timing were correctly determined (FIG. 4D).

The iterative decoding is important for processing samples containing varying sized particles such as biological samples. Successively canceling interference due to overlapping cells allows us to accurately resolve smaller cells with weaker signals, which are otherwise buried in strong interfering signals from larger cells.

While FIGS. 4A-4D demonstrates a case of overlapping cells in different microfluidic channels, it should be noted that cells overlapping within the same microfluidic channel could also be resolved. This is because the overlapping of cells in the same microfluidic channel simply corresponds to interference of the same digital code with its time-shifted form and can successfully be decoded using our approach outlined above.

Figure 15:
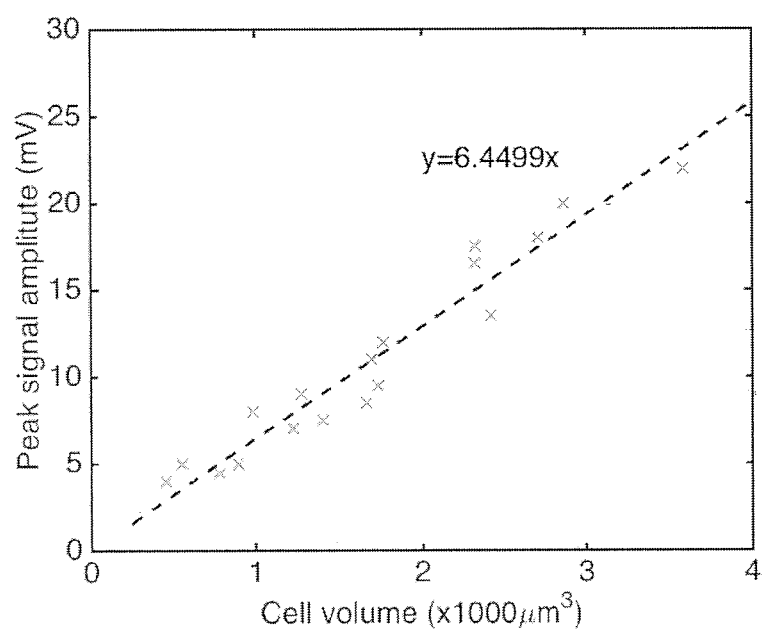
FIG. 15 shows a graph demonstrating the calibration of electrical signals' peak amplitude and cell volume. Cell radius was optically measured using high-speed optical microscopy and peak amplitude of the corresponding cell signal was recorded (x marks on the plot). Linear regression was used to model the relation between cell volume and electrical signal peak amplitude.

In addition to discriminating between different microfluidic channels (i.e., spatial information=the amplitude of code waveforms from each microfluidic channel was also used to orthogonally measure cell sizes. To achieve this, the measured electrical signals were first calibrated with optically measured cell volume using linear regression (FIG. 15). Based on this calibration, the calculated cell signal amplitudes in FIGS. 4A-4D were calculated to estimate corresponding cell size (FIG. 4C). A comparison of measurements using microfluidic CODES with optically measured cell sizes in FIGS. 4A-4D shows that cell size even for overlapping cells can be accurately determined (Table 1). Table 1 shows a comparison of electrically and optically measured parameters of FIG. 4C.

The timing of cell passage through each microfluidic channel can also be orthogonally determined using microfluidic CODES. This is because Gold sequences (or pseudorandom noise sequences in general) are sensitive to time-shifts and produce sharp autocorrelation peaks at zero time delay. A comparison of the estimates using microfluidic CODES with results obtained from simultaneously recorded high-speed video with a known frame rate shows that time differences between overlapping cells in FIGS. 4A-4D can accurately be determined (Table 1).

TABLE 1

| Measurement Type | $r_{ch1}$ (μm) | $r_{ch2}$ (μm) | $r_{ch3}$ (μm) | $r_{ch4}$ (μm) | $\Delta t_1$ (ms) | $\Delta t_2$ (ms) | $\Delta t_3$ (ms) |
|---|---|---|---|---|---|---|---|
| Electrical | 8.01 | 6.49 | 5.3 | 6.55 | 0.465 | 1.705 | 0.744 |
| Optical | 8.32 | 6.77 | 5.68 | 7.04 | 0.375 | 1.625 | 0.750 |

Figure 16A:
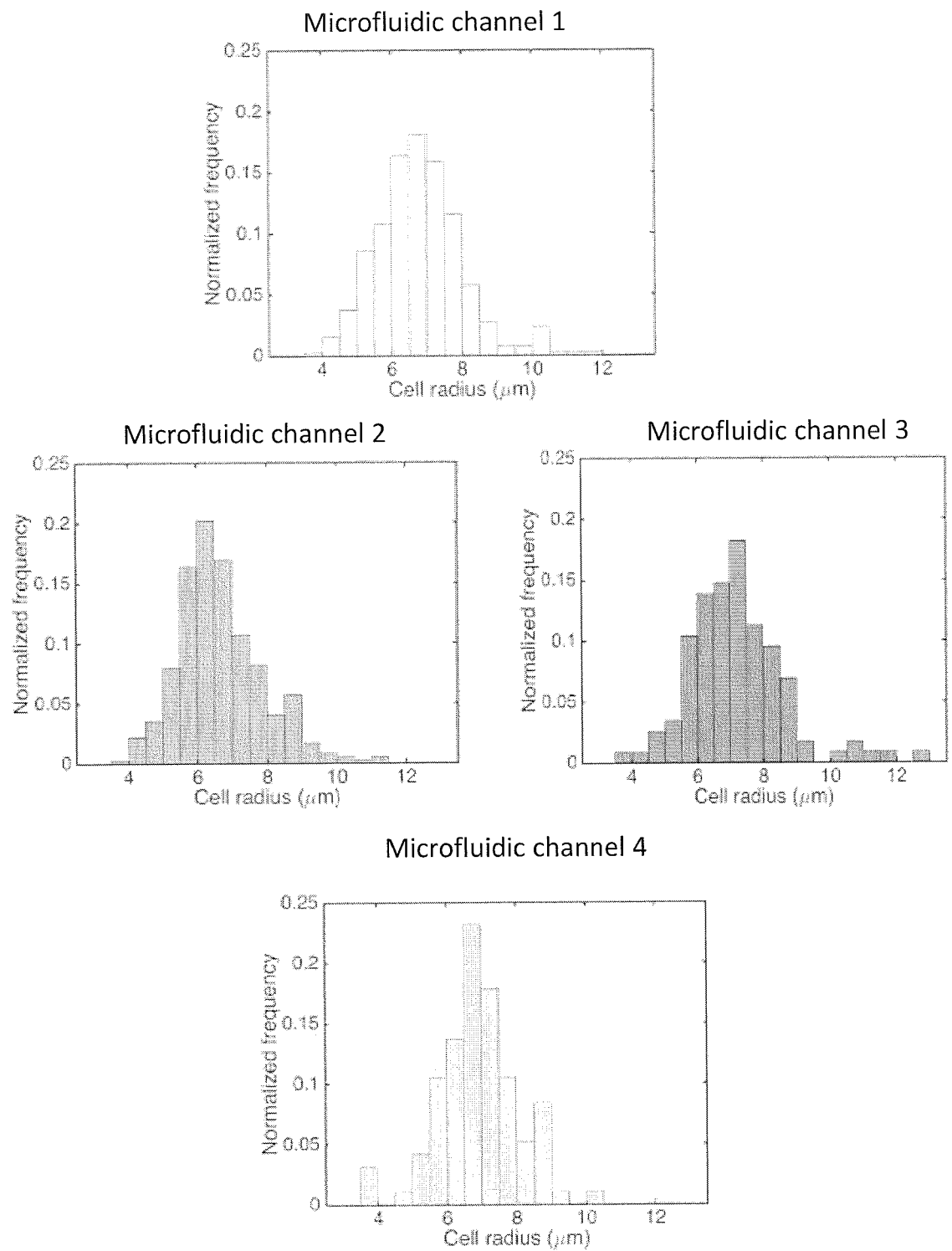
FIGS. 16A-16B show graphs demonstrating the orthogonal measurement of cell size and speed in four microfluidic channels. Histograms of calculated cell radius (FIG. 16A) and cell flow speed (FIG. 16B) as the cells are driven at 1000 μL/hr through the microfluidic channels. Recorded electrical waveform is processed using the algorithm outlined in the text. Calculated cell parameters corresponding to microfluidic channel shown in separate histogram plots.
Figure 16B:
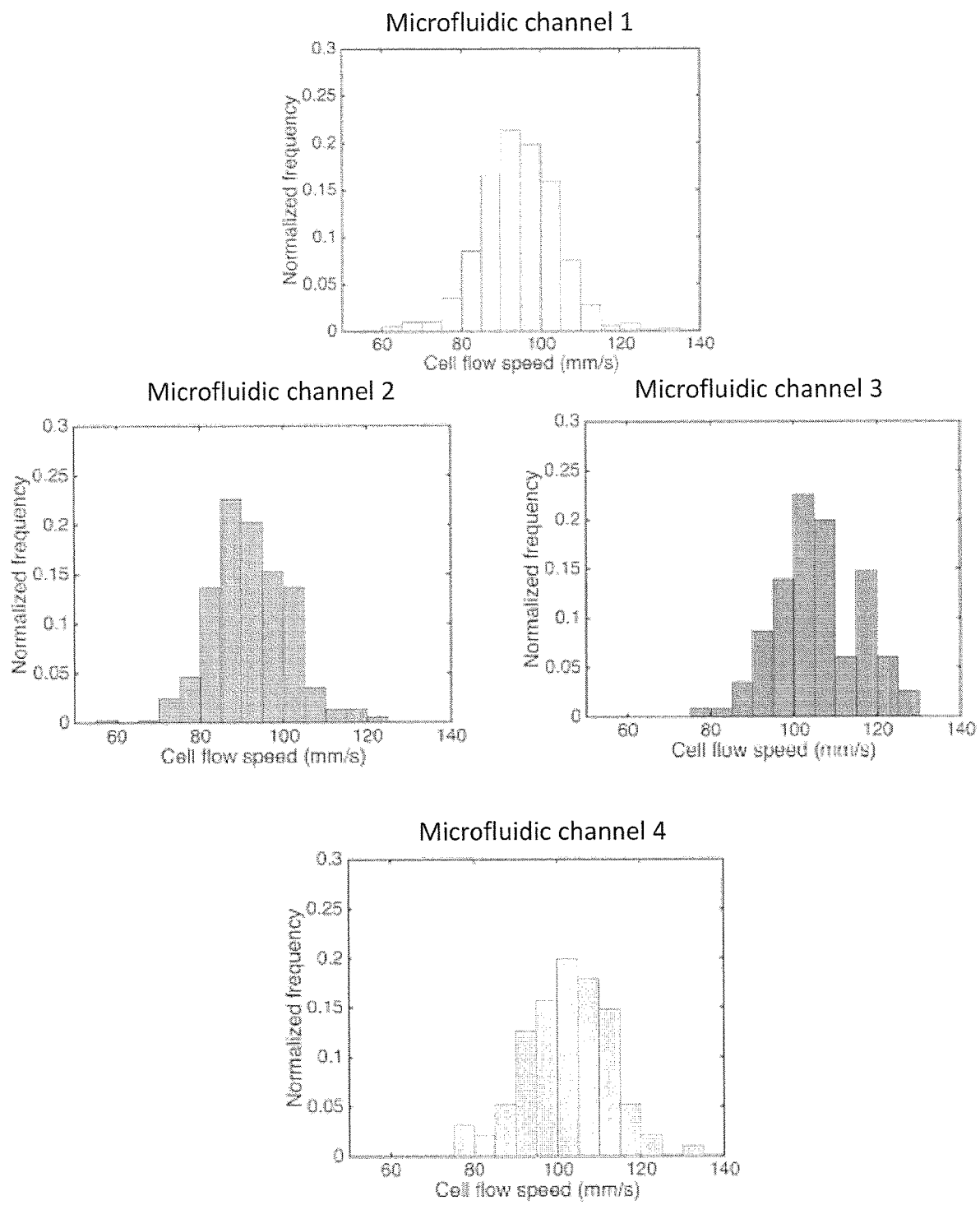

To demonstrate the performance of the microfluidic CODES device over a large number of cells, a model biological sample with a density of $4 \times 10^5$ cells/mL was processed. The recorded electrical signal corresponding to more than 1000 cells was analyzed using Matlab and decoded individual digital codes as follows: Using a low-pass filter, the high frequency noise (>2.5 kHz) was first removed in the recorded electrical signal. In the filtered signal, time windows where power of the signal is above a certain threshold (SNR>12 dB) were identified as sensor activity. Each event was then individually analyzed using the iterative algorithm described above. By comparing the results with the simultaneously recorded high-speed microscopy video, it was determined that each cell can be identified and the microfluidic channel it passed through with a 96.15% (973/1012) accuracy. In this analysis, success rates for detecting non-overlapping and overlapping cells were 98.71% (688/697) and 90.48% (285/315), respectively. Using calibration parameters (FIG. 15), size and flow speed of cells was also measured in our analysis (FIGS. 16A-16B).

Figure 17A:
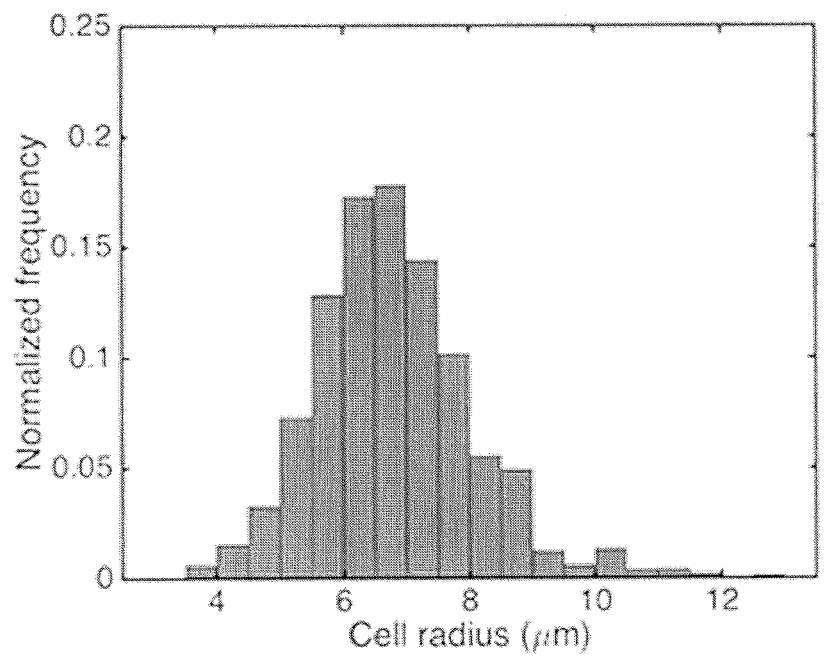
FIGS. 17A-17B show graphs demonstrating a comparison of electrically (FIG. 17A) and optically (FIG. 17B) measured cell size distribution of HeyA8 human ovarian cancer cell line. Electrical measurements in this plot are obtained by combining cell size histograms from all microfluidic channels in FIGS. 16A-16B. Close match between histograms demonstrate accuracy of the measurements.
Figure 17B:
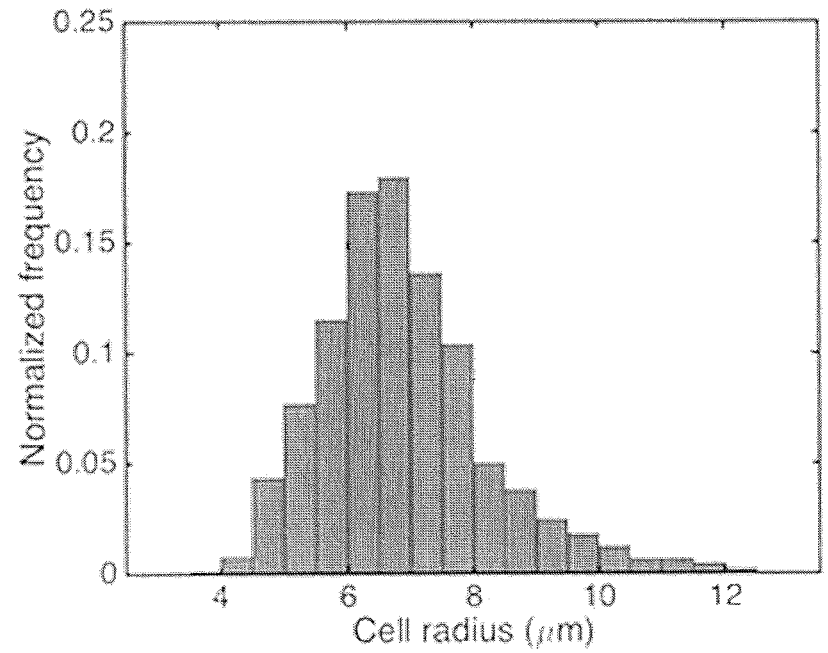

Our cell size measurement results match with the optically measured cell size distribution (FIGS. 17A-17B).

Finally, microfluidic CODES can be scaled to incorporate more microfluidic channels. This is achieved by assigning each microfluidic channel a code distinguishable from others. For this purpose, larger digital code sets with favorable correlation properties can be designed by using longer (i.e., more bits) codes. Longer codes are less prone to interference from other codes and can therefore be distinguished from each other with higher accuracy. Furthermore, a parameter that influences the performance and also the scalability of our sensor is the sample cell density. More microfluidic channels covering a larger sensor area will increase the likelihood of overlapping events and hence the interference. The maximum number of overlapping cells that can be resolved using microfluidic devices provided here depends on several factors including the digital code set, the detection algorithm, the design of the microfluidic chip as well as the electronic noise can influence the sample cell density that can be processed reliably.

Summary. Combining various techniques from the unrelated fields of telecommunications and microfluidics, we have introduced the microfluidic CODES technology, a scalable electronic sensor to orthogonally detect particles in multiple microfluidic channels from a single electrical output. The microfluidic CODES relies on multiplexing an array of micromachined Coulter counters each designed to produce a distinct digital code when a particle is detected. These digital codes were developed based in part on principles of CDMA telecommunication networks and can be uniquely recovered through simple mathematical calculations. It was demonstrated that the microfluidic CODES devices provided herein can readily be applied to detect human ovarian cancer cells on a multi-channel microfluidic chip. Importantly, the microfluidic CODES devices can also resolve particles with greater than 90% accuracy if they overlap in time, a feature that is required to process samples with high particle density. Microfluidic CODES is a simple, all-electronic interface for tracking particles on microfluidic devices and is particularly well suited to create integrated, low-cost lab-on-a-chip devices for cell or particle based assays that are needed for point-of-care tests in resource-limited settings.

REFERENCES FOR EXAMPLE 1

1 H. Zhang, C. H. Chon, X. Pan and D. Li, *Microfluidics and Nanofluidics,* 2009, 7, 739-749.
2 A. Yurt, G. G. Daaboul, J. H. Connor, B. B. Goldberg and M. S. Ünlü, *Nanoscale,* 2012, 4, 715-726.
3 T. P. Burg, M. Godin, S. M. Knudsen, W. Shen, G. Carlson, J. S. Foster, K. Babcock and S. R. Manalis, *Nature,* 2007, 446, 1066-1069.
4 L. R. Huang, E. C. Cox, R. H. Austin and J. C. Sturm, *Science,* 2004, 304, 987-990.
5 G. Wang, W. Mao, R. Byler, K. Patel, C. Henegar, A. Alexeev and T. Sulchek, *PLoS ONE,* 2013, 8, e75901.
6 E. Ozkumur, A. M. Shah, J. C. Ciciliano, B. L. Emmink, D. T. Miyamoto, E. Brachtel, M. Yu, P. I. Chen, B. Morgan, J. Trautwein, A. Kimura, S. Sengupta, S. L. Stott, N. M. Karabacak, T. A. Barber, J. R. Walsh, K. Smith, P. S. Spuhler, J. P. Sullivan, R. J. Lee, D. T. Ting, X. Luo, A. T. Shaw, A. Bardia, L. V. Sequist, D. N. Louis, S. Maheswaran, R. Kapur, D. A. Haber and M. Toner, *Science Translational Medicine,* 2013, 5, 179ra47-179ra47.
7 S. Nagrath, L. V. Sequist, S. Maheswaran, D. W. Bell, D. Irimia, L. Ulkus, M. R. Smith, E. L. Kwak, S. Digumarthy, A. Muzikansky, P. Ryan, U. J. Balis, R. G. Tompkins, D. A. Haber and M. Toner, *Nature,* 2007, 450, 1235-1239.
8 A. F. Sarioglu, N. Aceto, N. Kojic, M. C. Donaldson, M. Zeinali, B. Hamza, A. Engstrom, H. Zhu, T. K. Sundaresan, D. T. Miyamoto, X. Luo, A. Bardia, B. S. Wittner, S. Ramaswamy, T. Shioda, D. T. Ting, S. L. Stott, R. Kapur, S. Maheswaran, D. A. Haber and M. Toner, *Nat. Methods,* 2015, 12, 685-691.
9 M. E. Warkiani, L. Wu, A. K. P. Tay and J. Han, *Annu Rev Biomed Eng,* 2015, 17, 1-34.
10 C. W. Shields, C. D. Reyes and G. P. López, *Lab Chip,* 2015, 15, 1230-1249.
11 R. W. DeBlois and C. P. Bean, *Rev. Sci. Instrum.,* 1970, 41, 909-916.
12 H. Bayley and C. R. Martin, *Chemical Reviews,* 2000, 100, 2575-2594.
13 D. Kozak, W. Anderson, R. Vogel and M. Trau, *Nano Today,* 2011, 6, 531-545.
14 S. Gawad, L. Schild and P. Renaud, *Lab Chip,* 2001, 1, 76-8
15 D. Holmes, D. Pettigrew, C. H. Reccius, J. D. Gwyer, C. van Berkel, J. Holloway, D. E. Davies and H. Morgan, *Lab Chip,* 2009, 9, 2881-2889.
16 N. N. Watkins, S. Sridhar, X. Cheng, G. D. Chen, M. Toner, W. Rodriguez and R. Bashir, *Lab Chip,* 2011, 11, 1437-1447.
17 O. A. Saleh and L. L. Sohn, *Proc. Natl. Acad. Sci. U.S.A.,* 2003, 100, 820-824.
18 R. Rodriguez—Trujillo, M. A. Ajine, A. Orzan, M. D. Mar, F. Larsen, C. H. Clausen and W. E. Svendsen, *Sens. Actuators A,* 2014, 190, 922-927.
19 J. Mok, M. N. Mindrinos, R. W. Davis and M. Javanmard, *Proc. Natl. Acad. Sci. U.S.A.,* 2014, 111, 2110-2115.
20 O. A. Saleh and L. L. Sohn, *Nano Letters,* 2003, 3, 37-38.
21 R. W. DeBlois and R. K. A. Wesley, *Journal of Virology,* 1977, 23, 227-233.
22 O. A. Saleh and L. L. Sohn, *Rev. Sci. Instrum.,* 2001, 72, 4449-4451.
23 J. Zhe, A. Jagtiani, P. Dutta, J. Hu and J. Carletta, *J. Micromech. Microeng.,* 2007, 17, 304-313.
24 Y. Song, J. Yangi, X. Pan and D. Li, *Electrophoresis,* 2015, 36, 495-501.
25 Y. Chen, S. J. Kim, J. Guo, Y. Kang and J. P. Kausalya, *Sensors Actuators B,* 2015, 213, 375-381.
26 A. V. Jagtiani, J. Carletta and J. Zhe, *J. Micromech. Microeng.,* 2011, 21, 065004.
27 D. Polling, S. C. Deane, M. R. Burcher, C. Glasse and C. H. Reccius, Proceedings of uTAS (The 14th International Conference on Miniaturized Systems for Chemistry and Life Sciences), Oct. 3-7, 2010, Groningen, The Netherlands.
28 M. Javanmard and R. W. Davis, *IEEE Sensors J.,* 2013, 13, 1399-1400.
29 K. R. Balakrishnan, G. Anwar, M. R. Chapman, T. Nguyen, A. Kesavaraju and L. L. Sohn, *Lab Chip,* 2013, 13, 1302-1307.
30 S. Emaminejad, S. Talebi, R. W. Davis and M. Javanmard, *IEEE Sensors J.,* 2015, 15, 2715-2716.
31 P. Kiesel, M. Bassler, M. Beck and N. Johnson, *Appl. Phys. Lett.,* 2009, 94, 041107
32 J. Martini, M. I. Recht, M. Huck, M. W. Bern, N. M. Johnson and P. Kiesel, *Lab Chip,* 2012, 12, 5057-5062.
33 D. Torrieri, *Principles of Spread-Spectrum Communication Systems*; Springer: New York, N.Y., 2015.

Example 2

In Example 1, bipolar Gold sequences that are commonly used in CDMA telecommunication networks were specifically utilized. However, different signal patterns can be employed in the microfluidic CODES as long as the electrical signals generated in different microfluidic channels are distinguishable from each other. The codes assigned to microfluidic channels can be generated with any electrode pattern that leads to distinguishable signals from other electrode patterns designed for other microfluidic channels through computation using mathematical operations such as correlation, filtering or fitting. For example, one can use bipolar or unipolar signals, Kasami sequences, Welch codes or random signal patterns that varies from each other in different microfluidic channels. The important point is to be able to distinguish signals from different microfluidic channels from each other.

Figure 18:
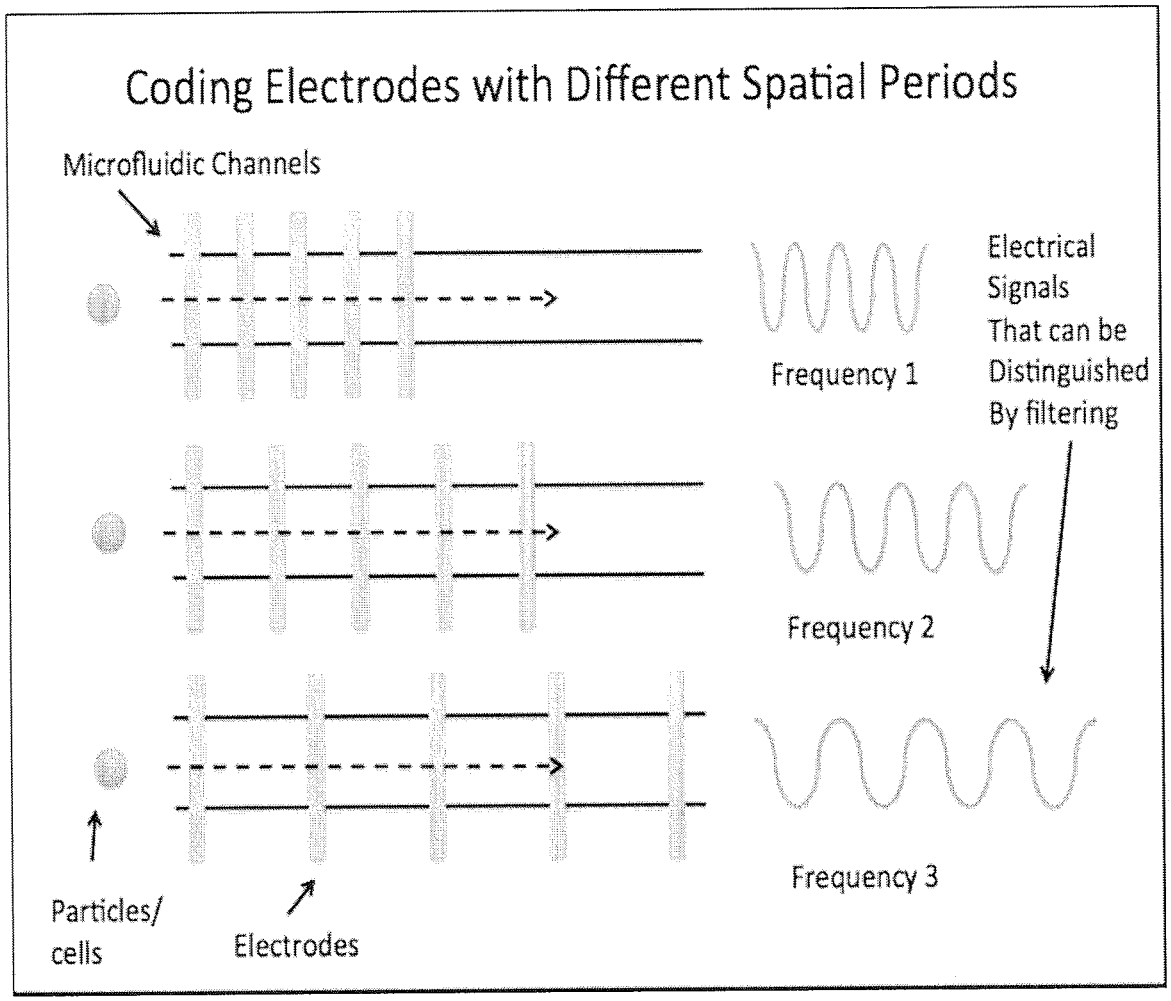
FIG. 18 shows an embodiment of coding electrodes with different spatial periods.

As shown in FIG. 18, one design of codes that is possible is to change the periodicity of electrode fingers, to generate signals with different frequencies. This is similar to orthogonal frequency division multiple access used in telecommunication networks. The signals from different microfluidic channels can then be differentiated based on their spectrum using a filter. In this scheme, the particle flow speeds in different channels can be controlled to keep the signals distinguishable.

Figure 19:
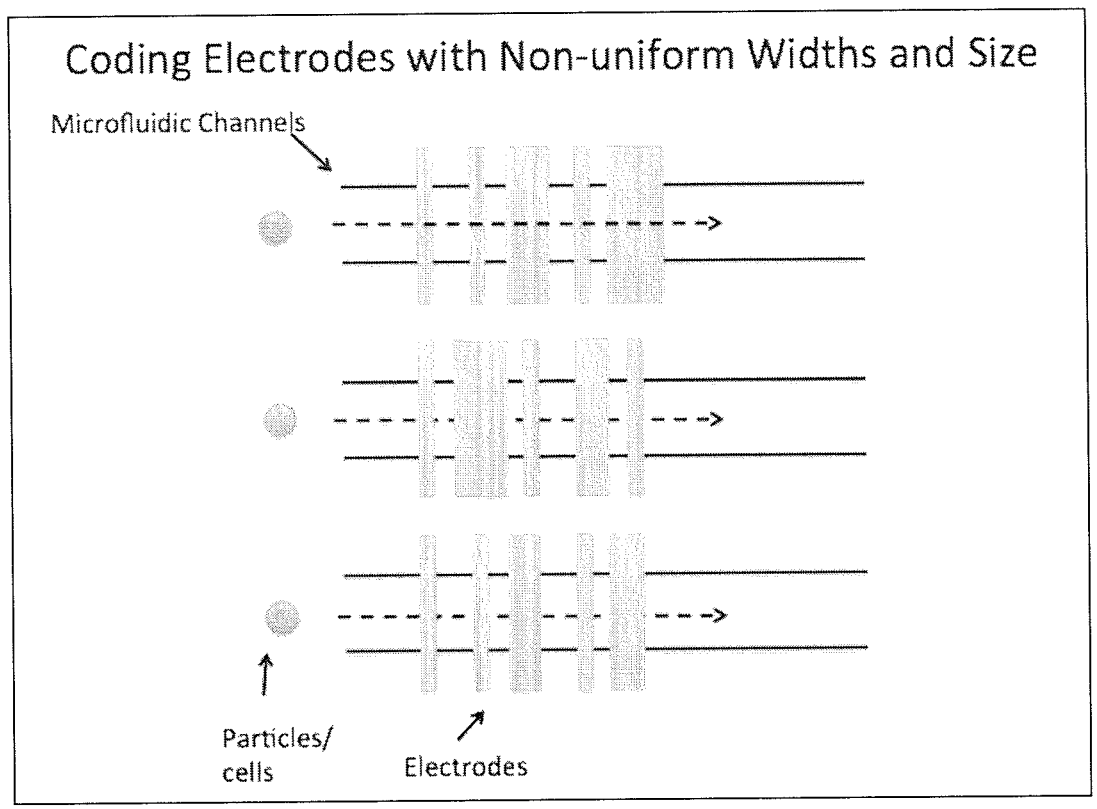
FIG. 19 shows an embodiment of coding electrodes with non-uniform widths and sizes.

As shown in FIG. 19, another possibility is to use non-uniformly shaped electrodes, which gives another degree of freedom to generate distinguishable signals to obtain desired electrical waveforms. For example, this can be used to generate signals that are more close to ideal digital codes to make the signals orthogonal. Non-uniform shape can also be used to generate code waveforms that are similar to ideal sine waves (e.g., in the case of OFDMA) so that they can be separated from their spectrum.

Figure 20:
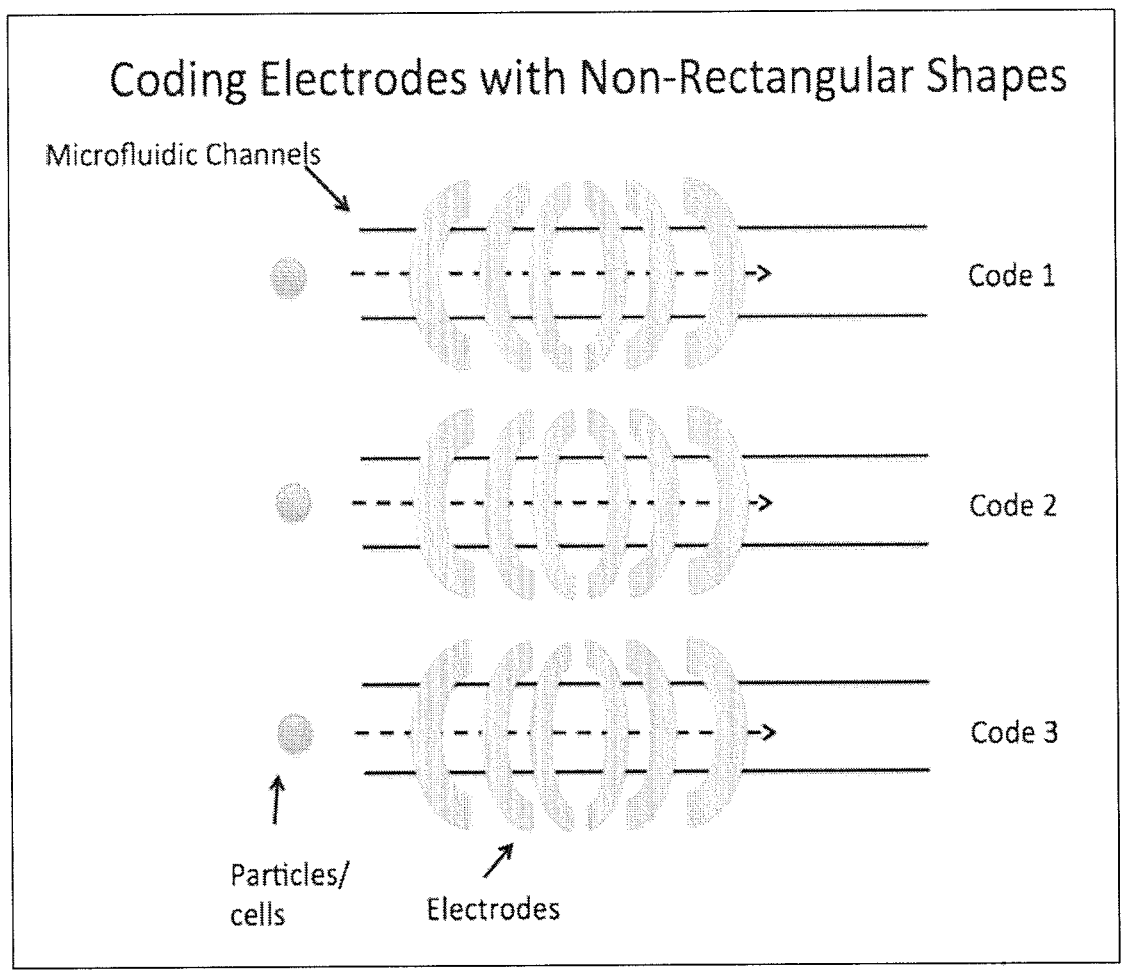
FIG. 20 shows an embodiment of coding electrodes with non-rectangular shapes.

As shown in FIG. 20, non-rectangular shaped electrodes can also be used to generate code waveforms. For example, non-rectangular electrodes can be used to compensate non-uniform flow profile across the microfluidic channel. This can allow particles flowing with different speeds along the microfluidic channel to parabolic flow profile to generate code waveforms with similar duration.

In Example 1, 10 µm wide electrodes with 10 µm gap in between were used. But the size of the electrodes can be changed. For example, the size of the electrodes can be set to 5 µm with 5 µm gap. This will lead to a spatial distance of 20 µm for each bit. This is still larger than the cell size and therefore should not cause interference between different bits. Depending on the size of the particles used, the electrode sizes, gaps between them and the microfluidic channel geometry can be adjusted accordingly. In some embodiments, the electrode width can range from 0.1 nm to 10 m or more. In some embodiments, the gap width can range from 0.1 nm to 10 m or more.

The sample cell density is a parameter that can affect the performance of the device. If the sample is very dilute or can be diluted purposely, the probability of overlapping cells on electrodes is low. This reduces the interference between different channels and also the error rate. Less interference also reduces the need to select best code set for our technology to work. For example, if the probability of cells overlapping is low, even non-ideal signal patterns can be used to distinguish between different microfluidic channels.

Diluting sample cell density is a not a significant problem for throughput in most cases. The flow rate can be increased to compensate for reduced throughput due to sample dilution and the total processing time can be reduced. Because electronic signal acquisition is very fast, we will most likely be limited in flow speed due physical limits of the measurement (for example to keep the shear stress below a certain level not to damage the cells or not to disrupt the assay).

For a sample with low cell density, the particles will be well separated in the electrical waveform. Therefore, each event can be analyzed separately in computation. This makes it possible to use perfectly orthogonal codes such as Welch codes to distinguish between channels. The Asynchronous nature of the microfluidic CODES system described herein becomes important to distinguish the cells when they overlap in the sensing volume.

By optimizing the device, the likelihood of cells overlapping can be minimized. A parameter to consider for optimization of the device is the sensing volume, which can be defined as the volume near the electrodes where the electrical conduction and sensing occur. Minimizing the sensing volume will decrease the frequency of overlapping events for a given cell density. The sensing volume can be minimized in two ways: 1) making the area covered by electrodes smaller (e.g., by making electrode pitch smaller or choosing code or signal sets that require less number of electrode fingers). 2) making the microfluidic channels volume over the electrodes smaller. If the sensing volume is small, for a given cell density, then the likelihood of overlap is smaller.

For example, electrode pitch can be adjusted so that longer codes (which can increase the number of microfluidic channels that can be coded in scaling the devices and systems described herein) can be created without increasing the sensor area. The particle or cell size should be taken into account when doing this because if the electrodes are very close to each other, local modulation of electrical conduction is affected and bits will start to interfere.

Figure 21A:
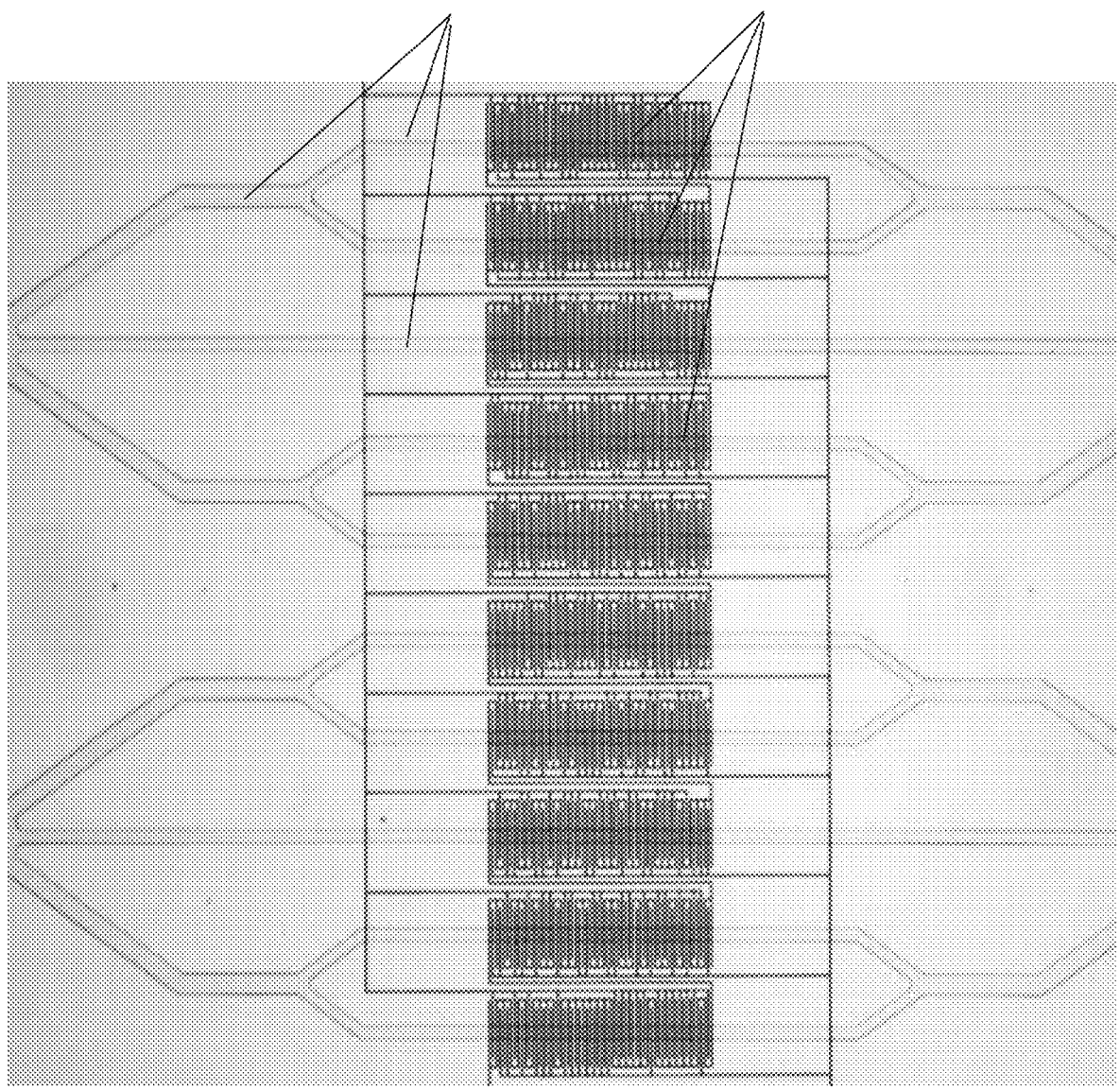
FIGS. 21A-21B show a microfluidic CODES device with 10 microfluidic channels with 31-bit Gold codes (FIG. 21A) and a close up image of one individual microfluidic channel of the device shown in FIG. 21A demonstrating the finger electrodes that generate the digital codes.
Figure 21B:
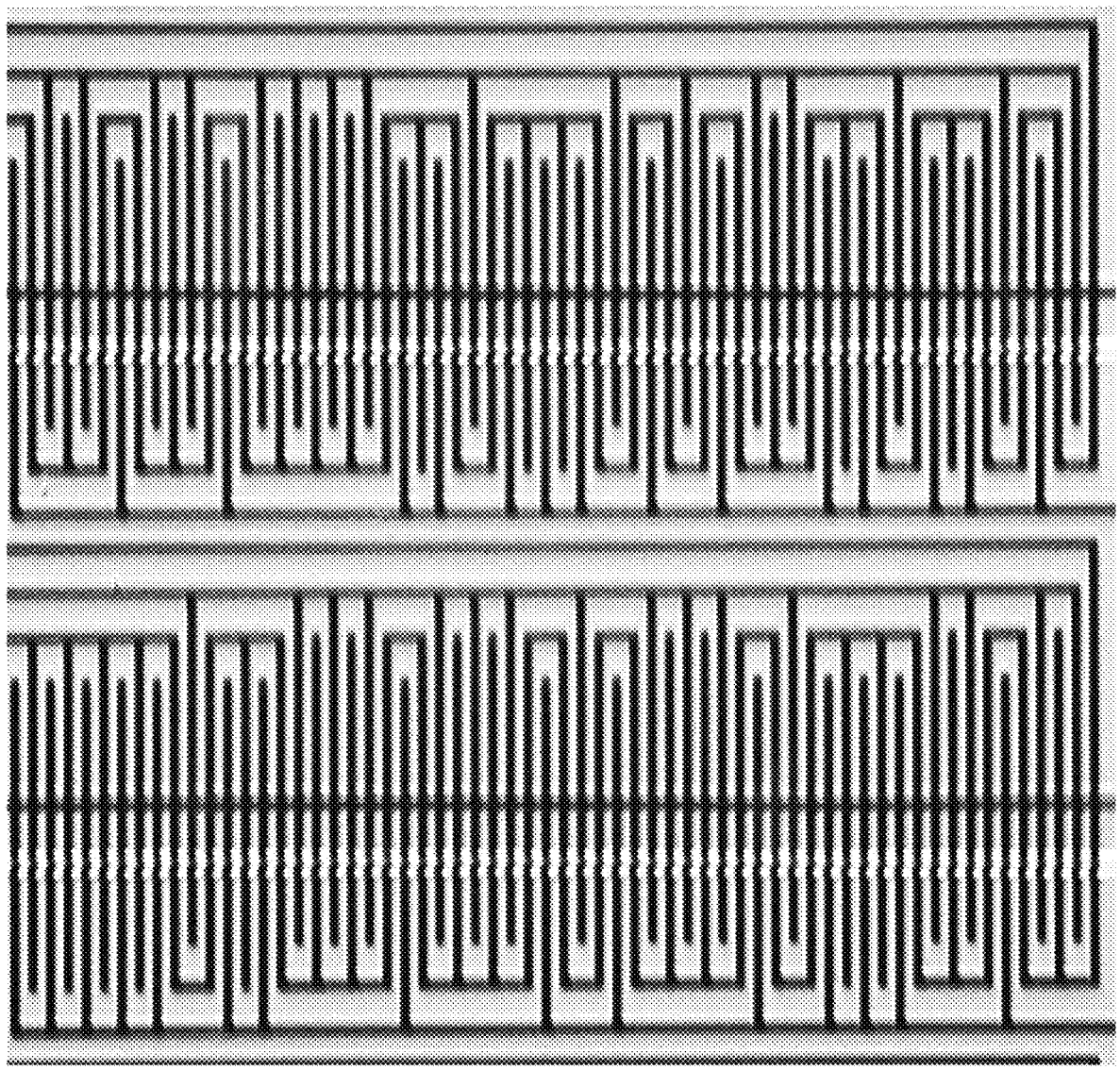

The systems and devices provides can be scaled to include an arbitrary number of microfluidic channels. As demonstrated in these examples, devices with multiplexed sensor that can detect particles in 10 different microfluidic channels (FIGS. 21A-21B).

Resolving overlapping cells is challenging due to several factors. With more electrodes and higher number of microfluidic channels, the overall sensing volume increases and frequency of overlapping cells increase. Advanced computational algorithms (e.g., successive interference cancellation) as well as various sensor architectures can be used to accurately distinguish overlapping cells.

Example 3

Another approach other than the one that uses orthogonal codes to solve this problem is to create an additional electrical sensor (a two-electrode resistive pulse sensor) before or after coding regions (FIG. 22). This pre- or post-coding sensor can provide (1) the number of particles that will occupy the coding region, (2) relative timing of particles, (3) the size of the particles, because the peak amplitude of the resistive pulse sensor will be proportional to the volume of the particle. This additional sensor will not indicate which microfluidic channel that the particle passed through. The coding part will indicate which microfluidic channel that the particle passed through. However, with the knowledge of the number of particles, their relative timing and size, the parameter space that needs to be explored in obtaining the specific combination of microfluidic channels for overlapping particles decrease significantly. In addition, because this additional sensor covers a very small sensing volume, the cells overlapping on it (unlike the coding region) is very low.

Several designs and devices based on those designs were explored. Two code sets were first designed that were composed of unipolar digital codes that were not orthogonal to each other. Code set #1 is composed of 4-bit codes, which are binary expressions of numbers 1-10, code set #2 is composed of 5-bit codes, each specifically having 3 "1" bits and 2 "0" bits (See e.g. FIG. 23).

Based on these codes, several variations were designed and fabricated: (a) with varying number of electrodes to code bit "1" (2-electrode vs. 3-electrode), (b) with varying gap size between bits to test intersymbol interference (20 um vs. 30 um), (c) unipolar vs. bipolar design for the pre-coding sensor. See e.g. FIGS. 24-36.

Figure 37:
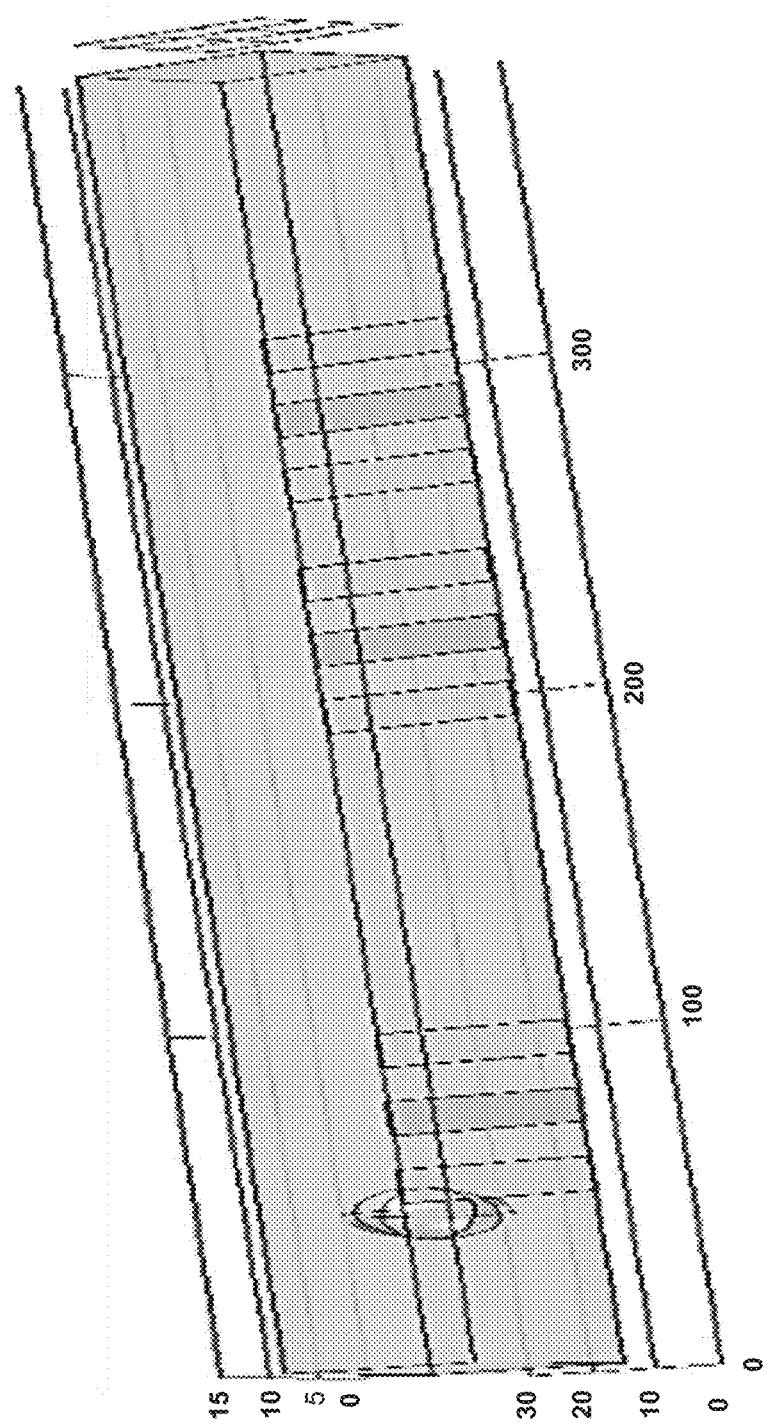
FIG. 37 shows a COMSOL simulation setting for microchannel having a 3 electrode pair with a 20 μm gap.
Figure 38:
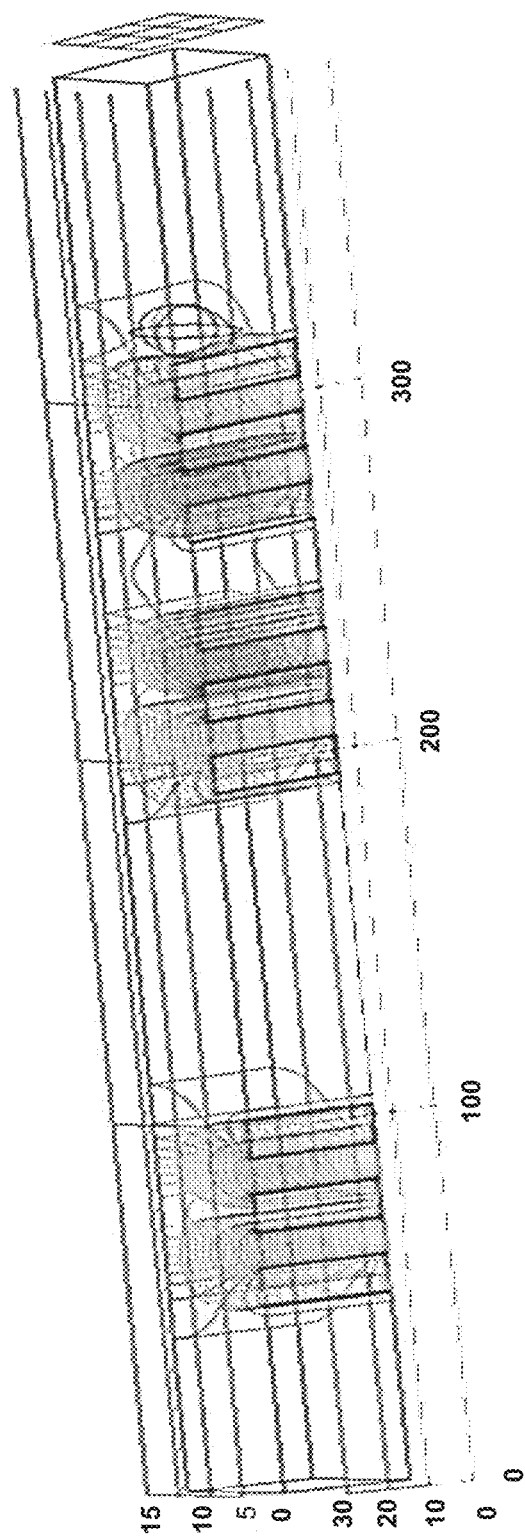
FIG. 38 shows a COMSOL electric-field simulation for a microchannel having a 3 electrode pair with a 20 μm gap.
Figure 39:
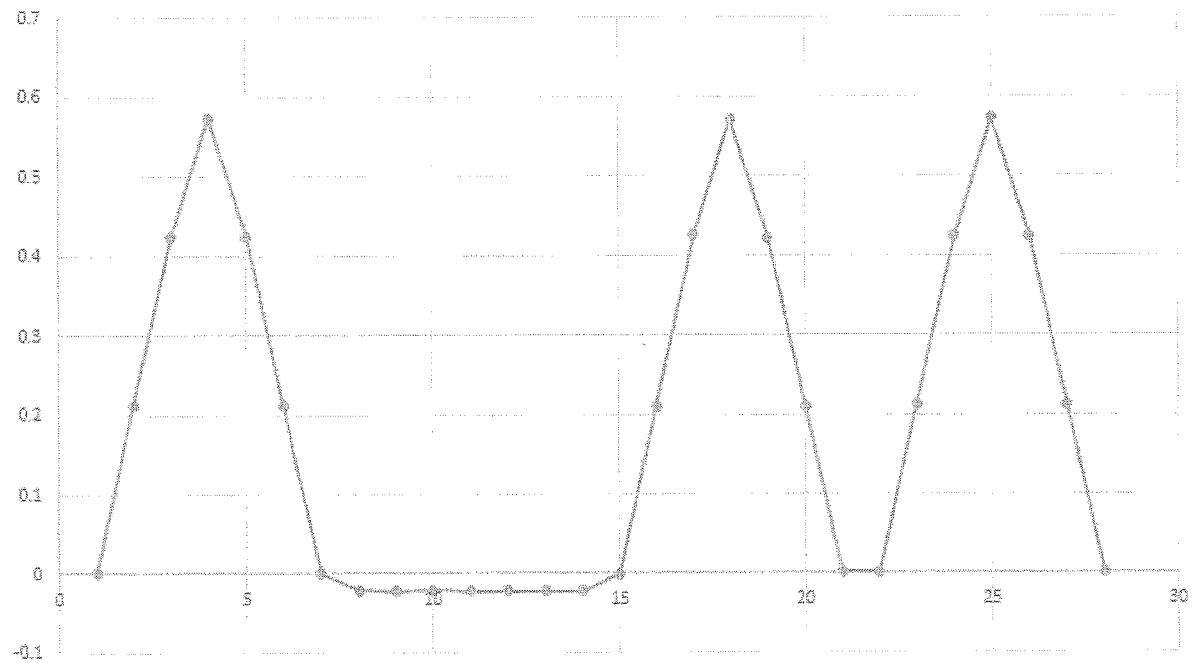
FIG. 39 shows a graph demonstrating the simulated (via COMSOL) electrical signal that corresponds to code 1011.
Figure 40:
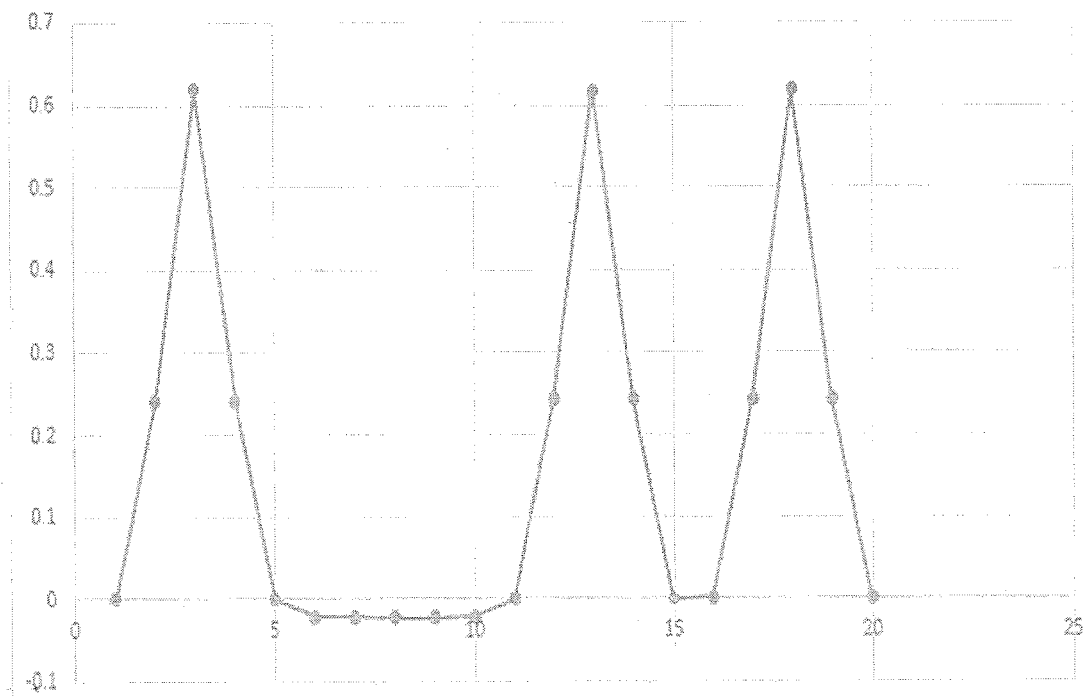
FIG. 40 shows a graph demonstrating the COMSOL results for a microchannel having a 2-electrode pair with a 20 μm gap for code 1011.
Figure 41:
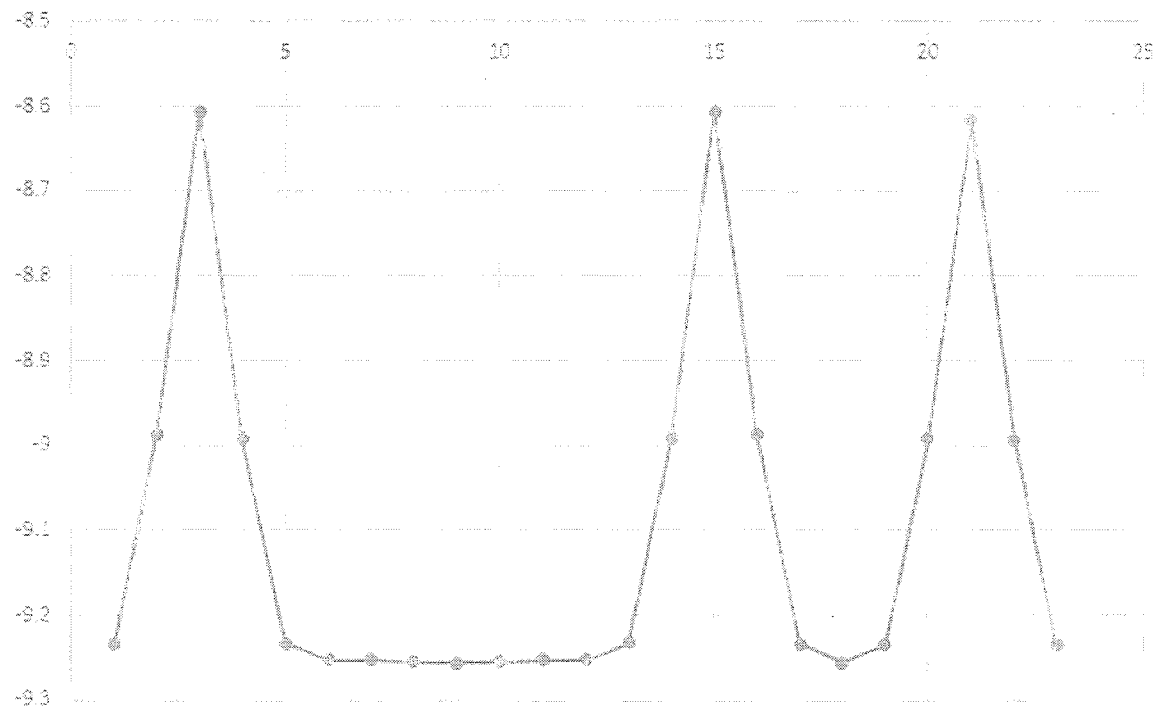
FIG. 41 shows a graph demonstrating the COMSOL results for a microchannel having a 2-electrode pair with a 30 μm gap for code 1011.
Figure 42A:
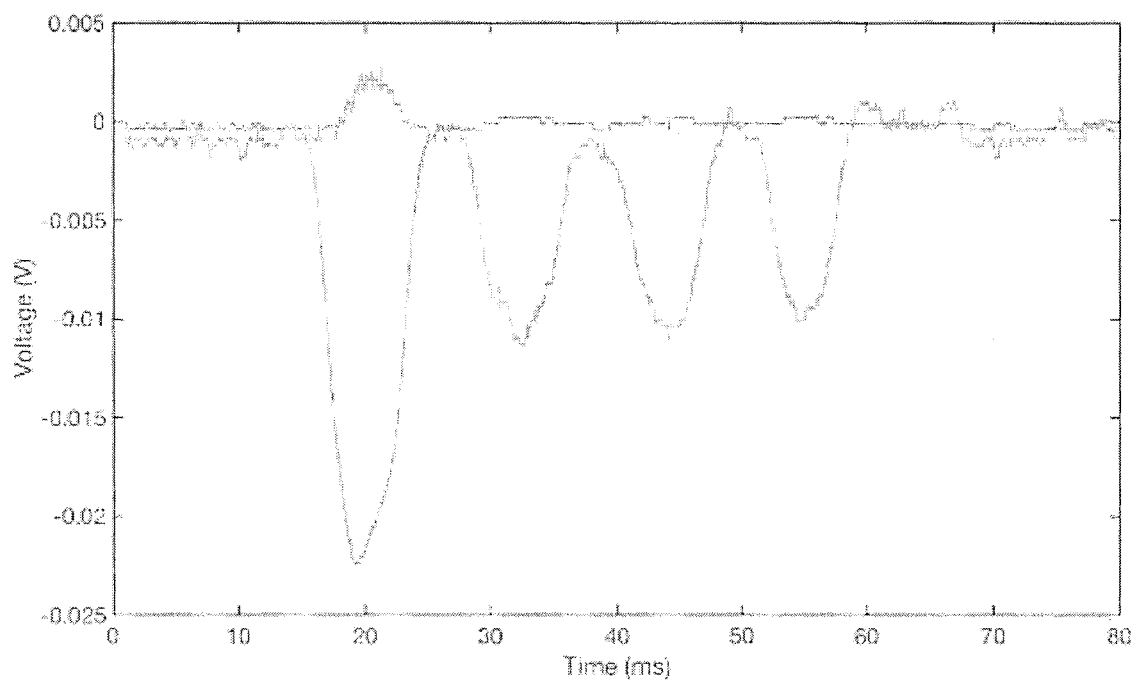
FIGS. 42A and 42B show a graph (FIG. 42A) demonstrating the pre-coding sensor signal (top signal in graph) and code waveform (bottom signal on graph) for the first microfluidic channel (code 11100) from the right of in the corresponding optical image (FIG. 42B).
Figure 42B:
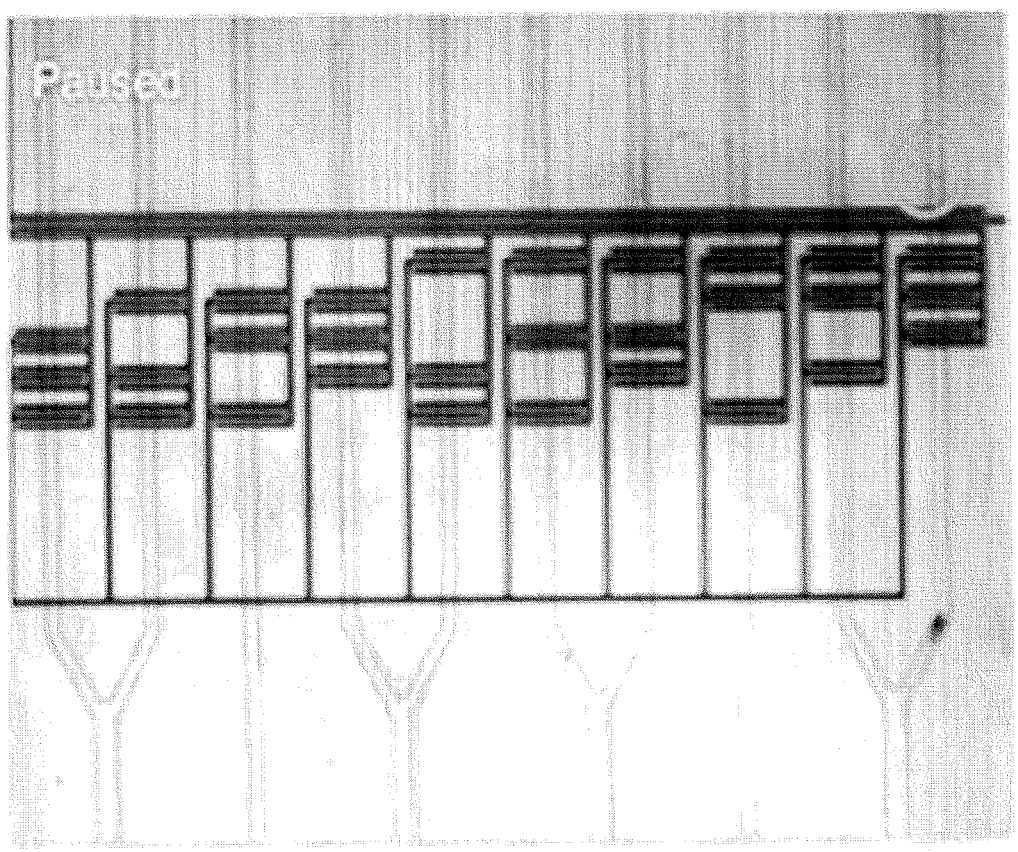
Figure 43A:
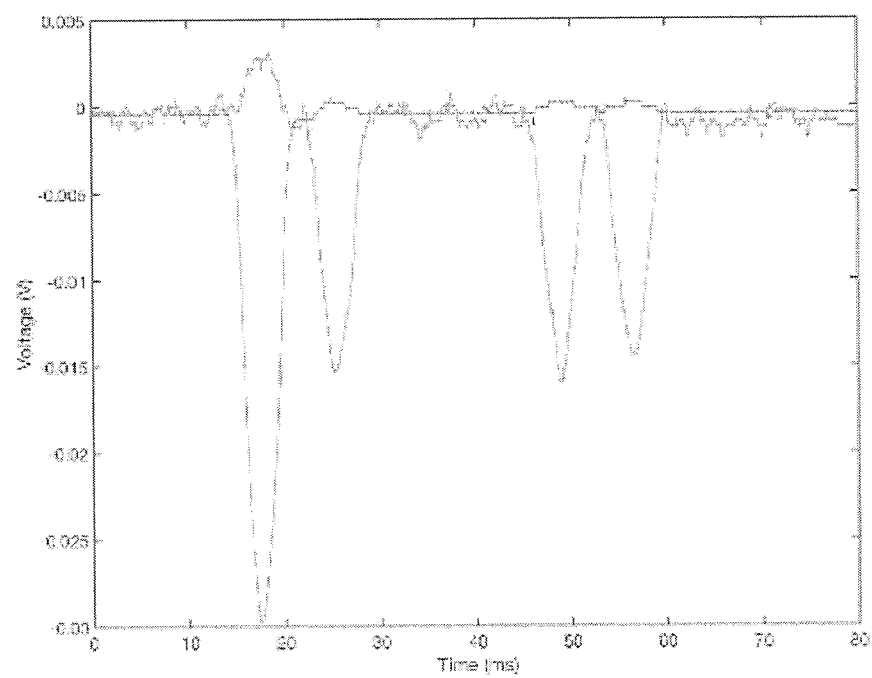
FIGS. 43A and 43B show a graph (FIG. 43A) demonstrating the pre-coding sensor signal (top signal in graph) and code waveform (bottom signal on graph) for the sixth microfluidic channel (code 10011) from the right of in the corresponding optical image (FIG. 43B).
Figure 43B:
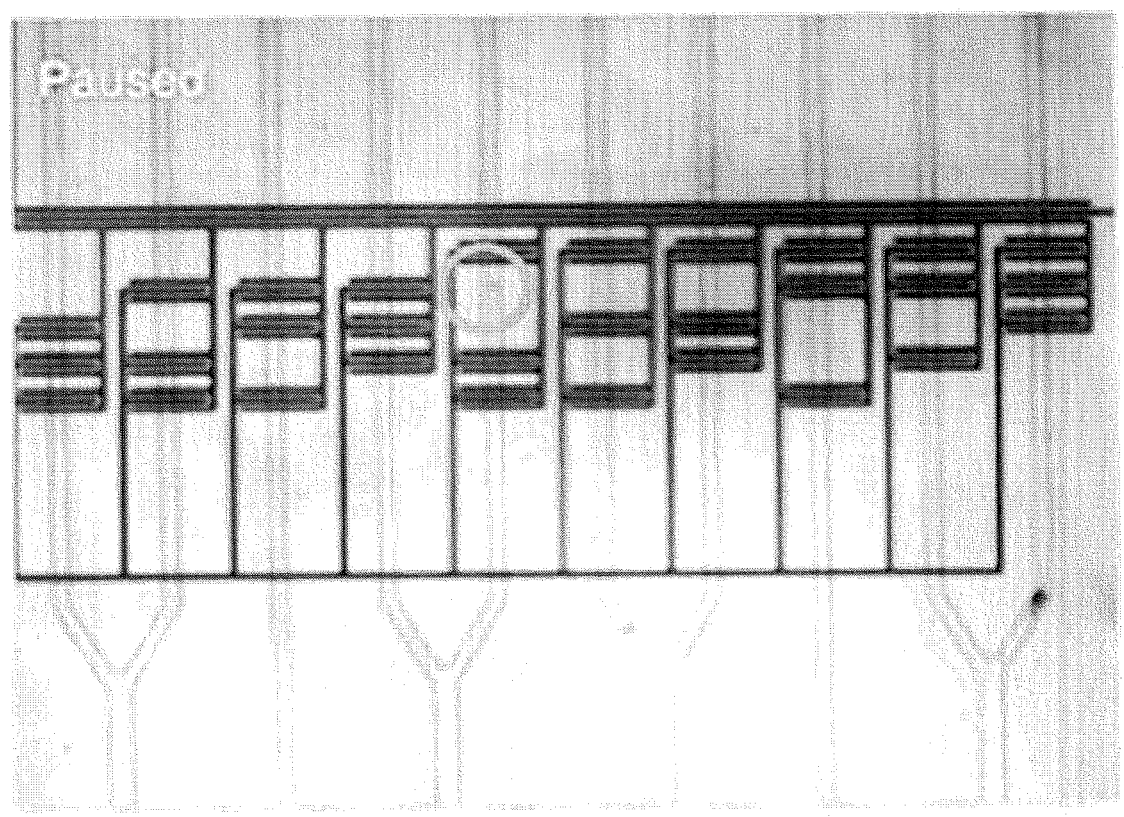
Figure 44A:
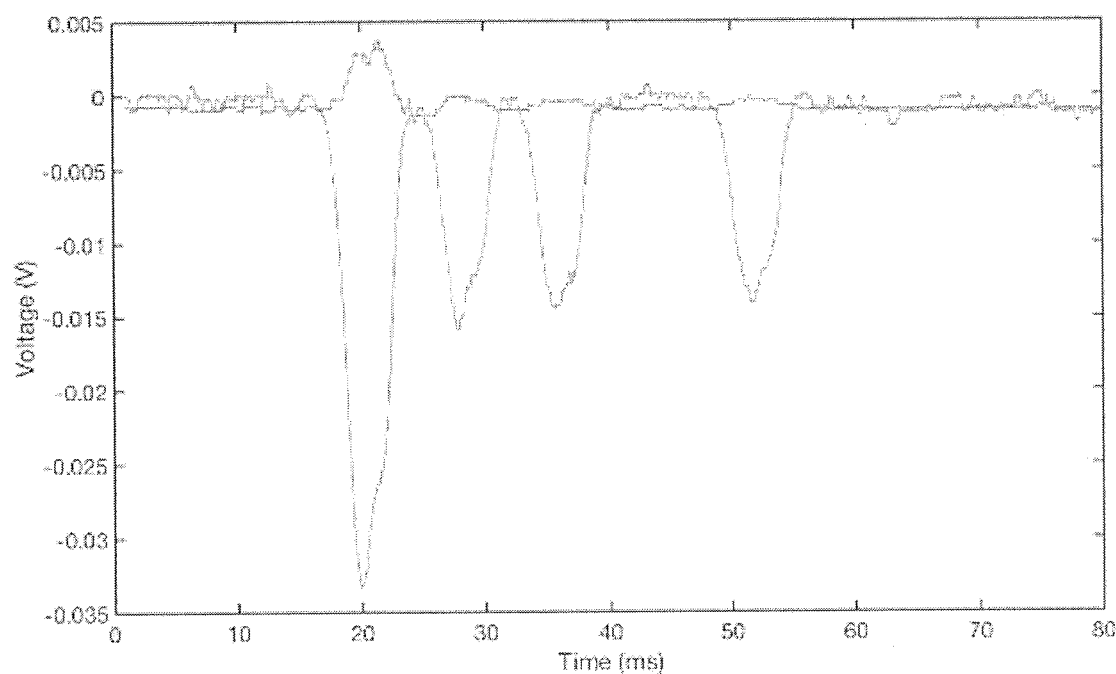
FIGS. 44A and 44B show a graph (FIG. 44A) demonstrating the pre-coding sensor signal and code waveform for the second microfluidic channel (code 11010) from the right of in the corresponding optical image (FIG. 44B).
Figure 44B:
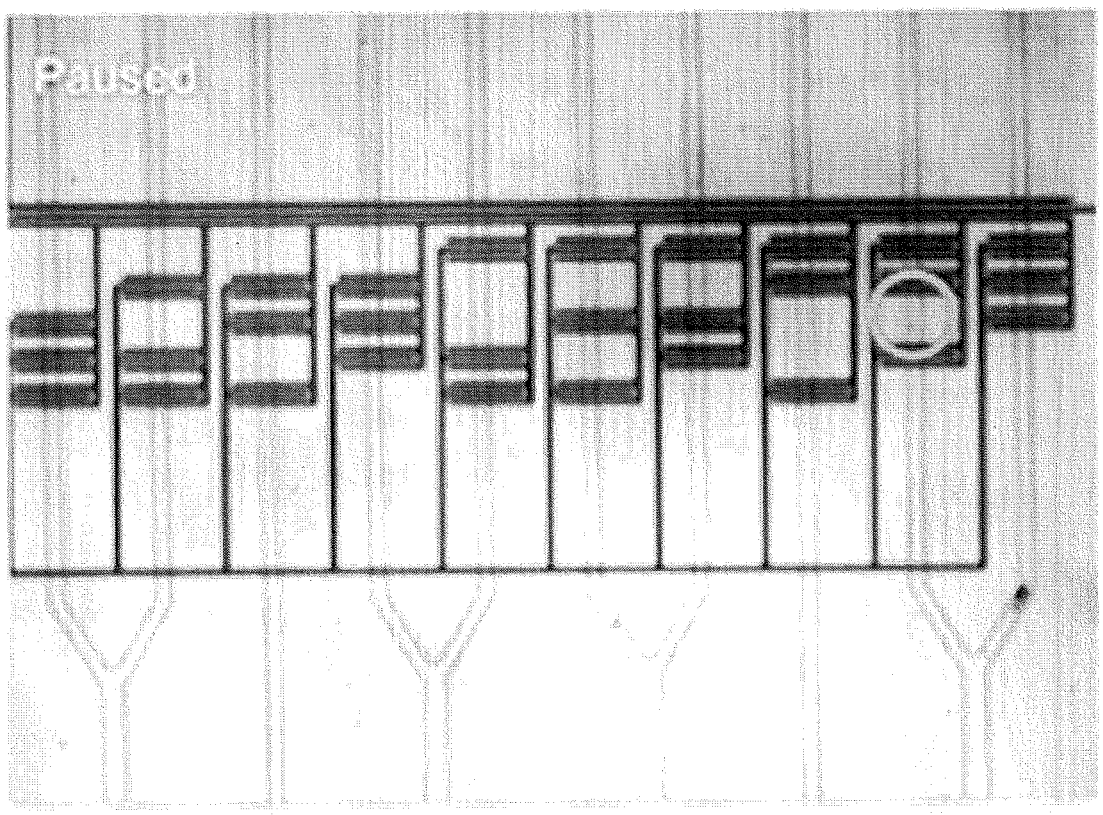
Figure 45:
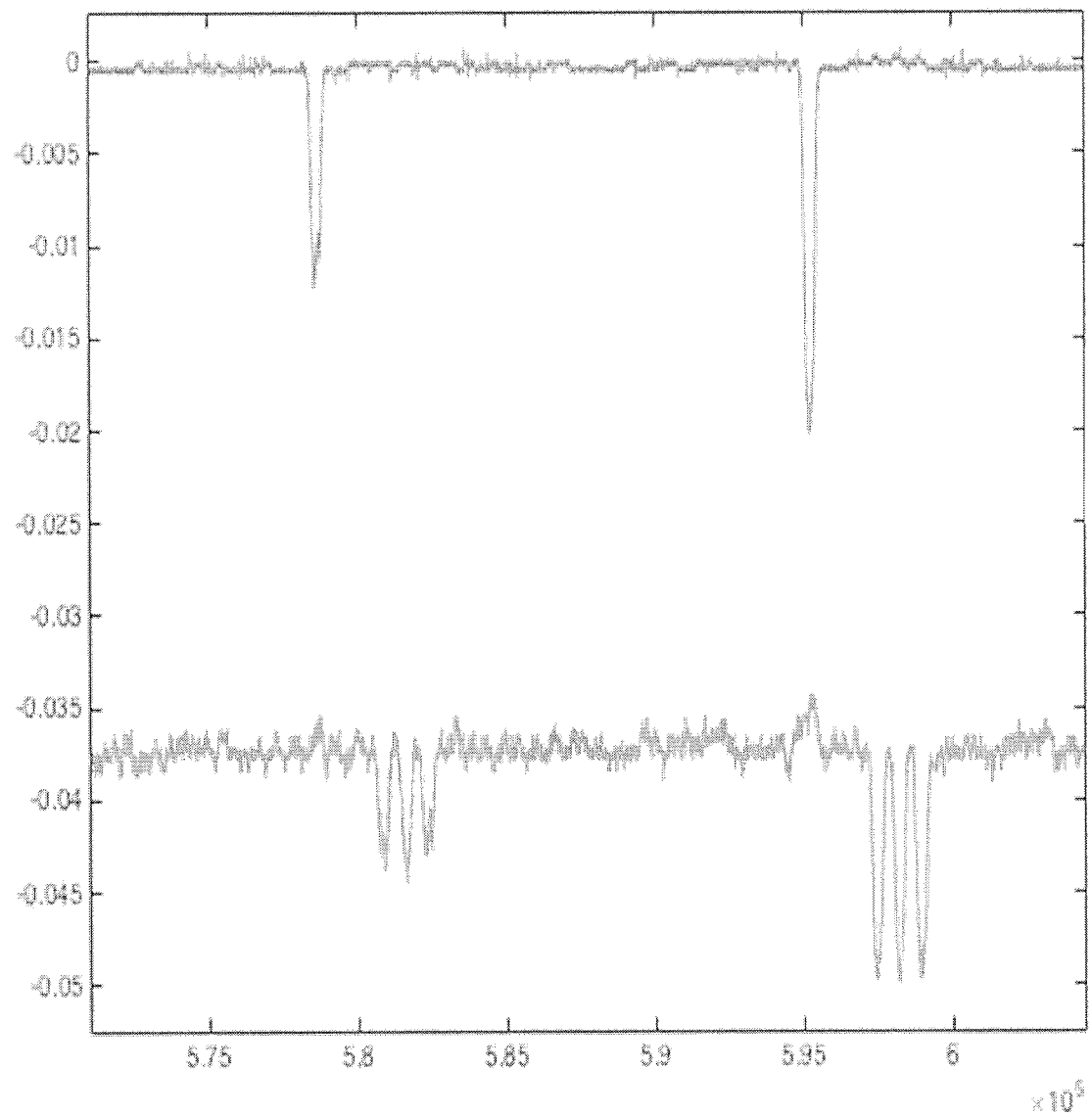
FIG. 45 shows a graph demonstrating the pre-coding sensor signal (top signal in graph) and code waveform (bottom signal in graph) for the seventh channel from the right (code 01110), corresponding optical image not shown.

Using finite element analysis (COMSOL software package), different device architectures were simulated. As a proof of principle, the code 1011 was simulated. The results are demonstrated in FIGS. 37-39. FIGS. 40-41 show the simulation results for the same code 1011 in different device architectures.

Figure 46:
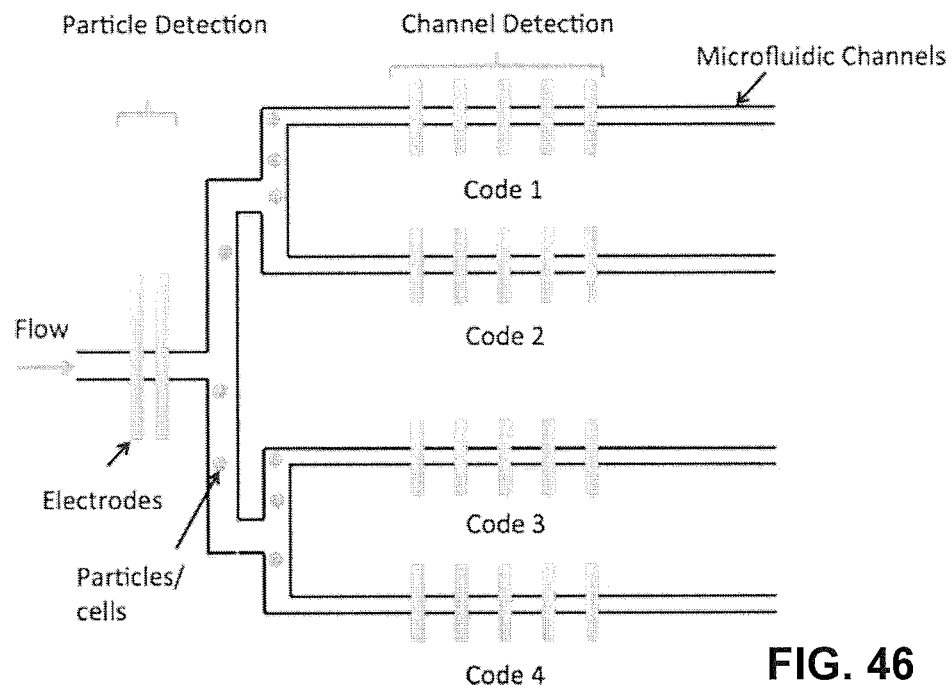
FIG. 46 shows a schematic demonstrating particle pre-detection by multi-stage sensing/coding electrodes.
Figure 47:
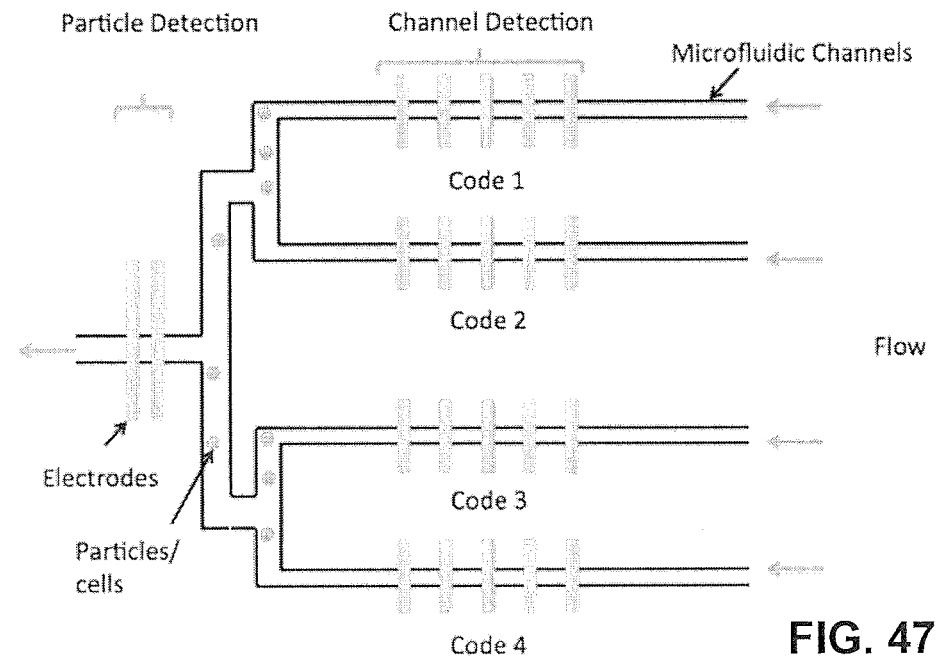
FIG. 47 shows a schematic demonstrating particle post-detection by multi-stage sensing/coding electrodes.

The devices were then tested using a cultured cancer cell line suspended in phosphate buffered saline solution. FIGS. 42A-45 show the results for the microfluidic device having a 3-electrode pair with 20 µm gap between bits. FIGS. 46-47 show additional embodiments of the configuration and operation of a microfluidic device having multi-stage/coding electrodes. FIG. 46 shows a schematic demonstrating particle pre-detection by multi-stage sensing/coding electrodes. FIG. 47 shows a schematic demonstrating particle post-detection by multi-stage sensing/coding electrodes. In further embodiments, the coding of individual channels/locations on the microfluidic chip can be achieved through a micropatterned microfluidic channel. Two examples are demonstrated in FIGS. 48 and 49. FIG. 48 shows a schematic demonstrating multiplexed detection of particles with a micropatterned microfluidic channel instead of or in addition to electrodes. The microfluidic channels can be arbitrarily shaped (i.e. micropatterended) to generate distinguishable signals.

FIG. 49 shows a schematic demonstrating multiplexed detection of particles with micropatterened microfluidic channel instead of or in addition to electrodes. The microfluidic channels can be arbitrarily shaped to generate distinguishable signals.

In addition to electrical sensing, the technology described and demonstrated herein can also be applied to other types of sensing modalities such as optical, magnetic, thermal etc. For example, by patterning a surface to be opaque or transparent to light, or by micropatterning a magnetic field sensor to create a distinguishable signal in different locations, it is possible to multiplex spatial information.

Example 4

There are many applications of this technology described and demonstrated herein in interfacing microfluidic devices to perform biomedical assays as wells as particle measurements. It can be used to obtain spatial information without the redundancy and large data requirements of optical imaging. As demonstrated in our paper, the orthogonal detection capability of the device described herein can be used to obtain spatial information from cells on microfluidic channels. When coupled with a lab-on-a-chip device where presence or absence of a particle or a cell at a specific location can be tied with it properties, our sensor can be used to obtain cell/particle properties through detection of the particles in certain locations. For example, the particles or cells can be manipulated under a field or under combination of different fields. The field can be of mechanical, optical, electrical, magnetic, thermal, chemical origin among many others. The particles can be spatially manipulated (e.g., change in direction, change in speed, capture, release) under these fields. These manipulations can be detected using the technology described and demonstrated herein and can be used to perform quantitative measurements on the particles manipulated.

Figure 50:
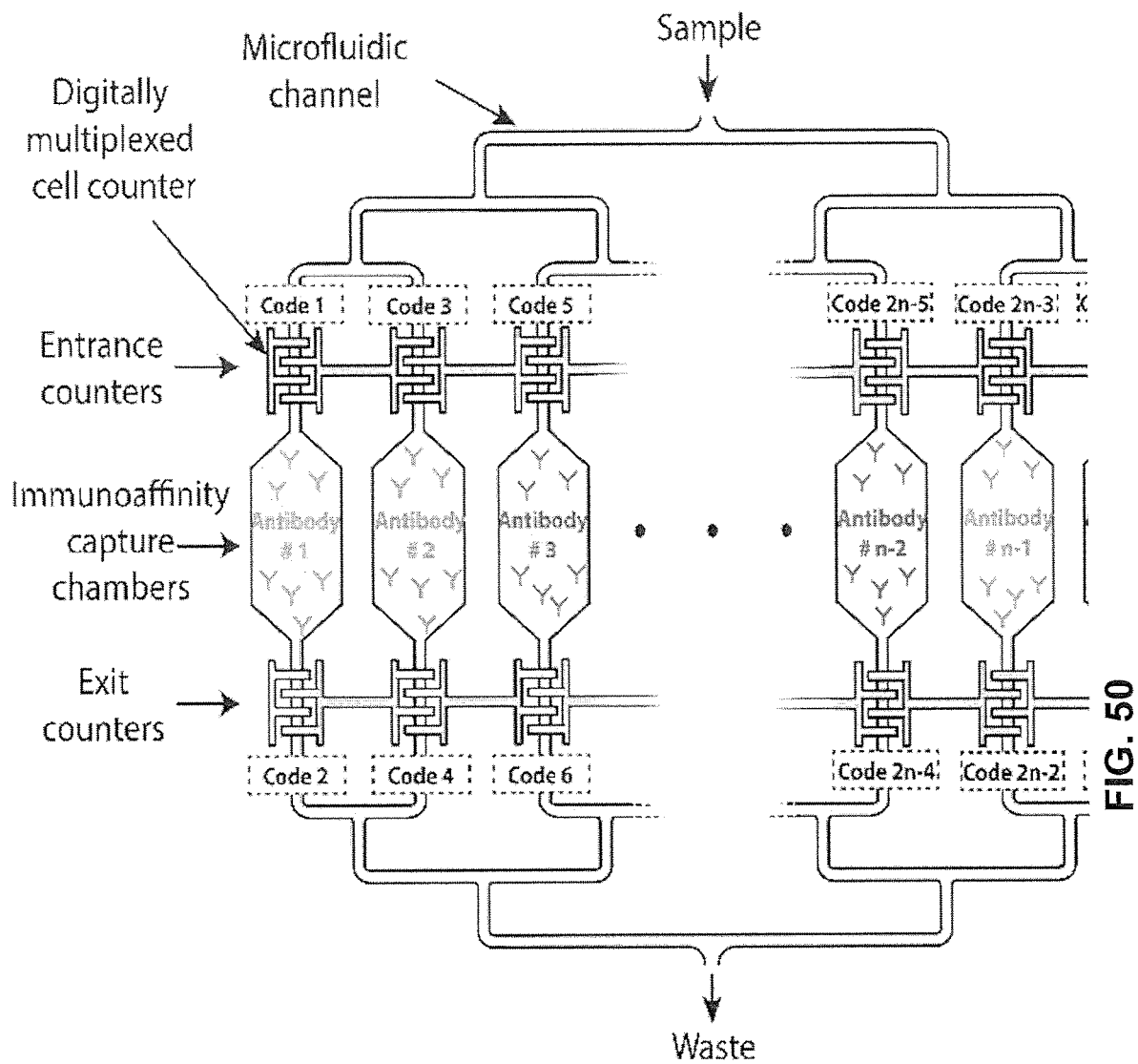
FIG. 50 shows a schematic demonstrating a system and method to carry out label-free electronic immunophenotyping of a cell and/or particle population.
Figure 51:
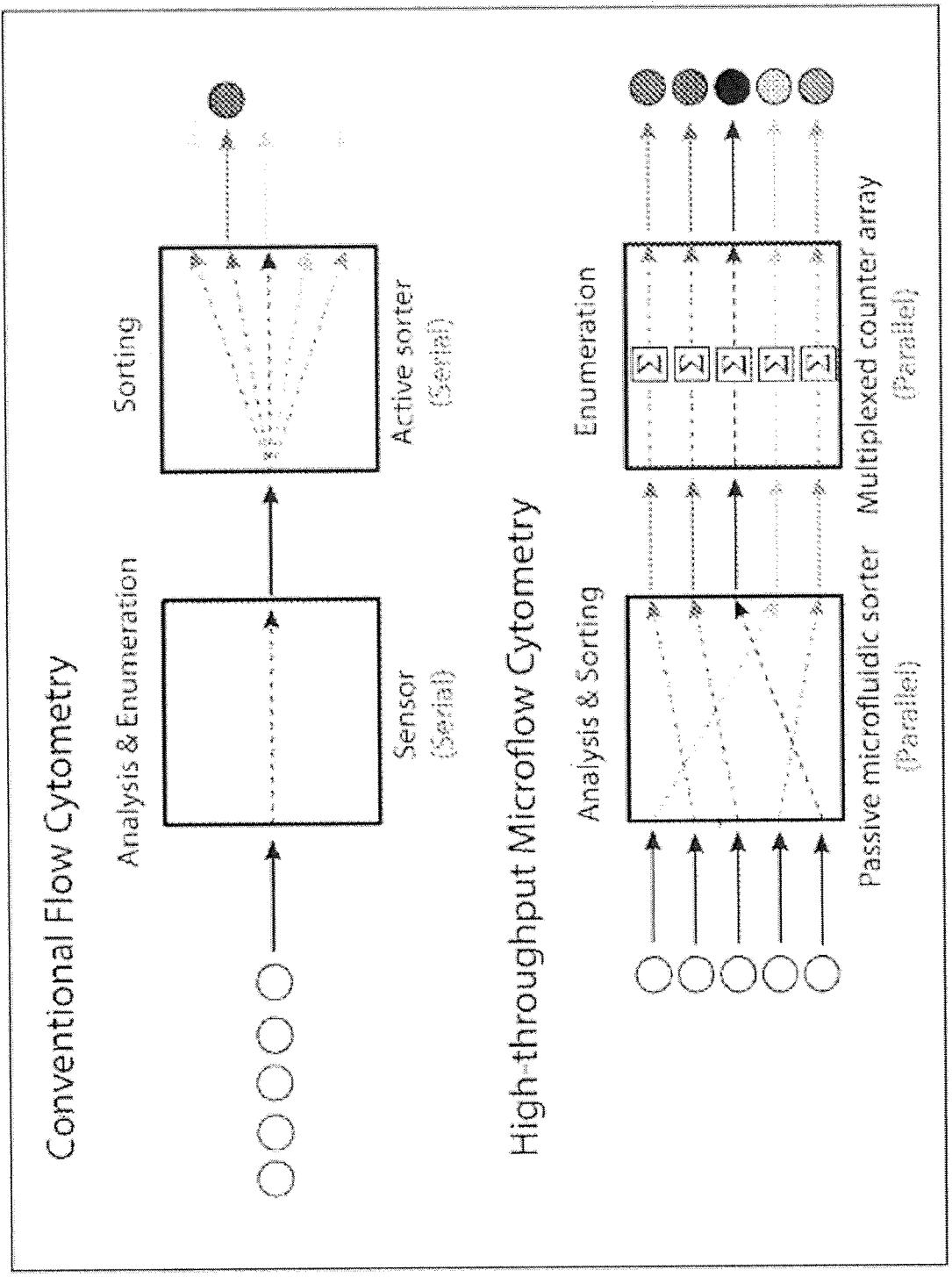
FIG. 51 shows a schematic demonstrating conventional flow-cytometry and high-throughput microflow cytometry that can be accomplished using the microfluidic CODES or other devices demonstrated herein.
Figure 52:
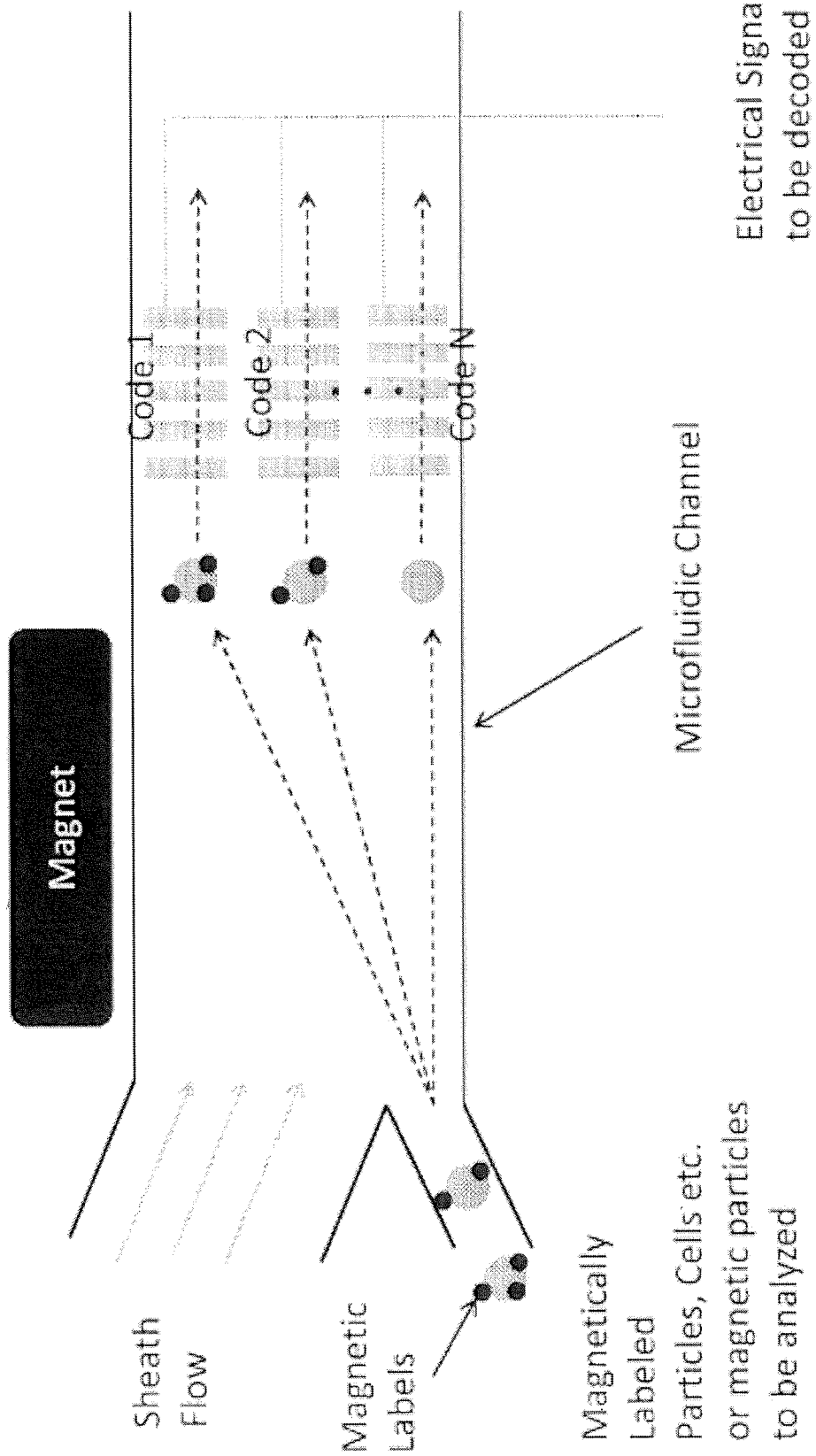
FIG. 52 shows a schematic demonstrating one embodiment of magnetophoretic flow cytometry and sorting using a microfluidic CODES device.
Figure 53:
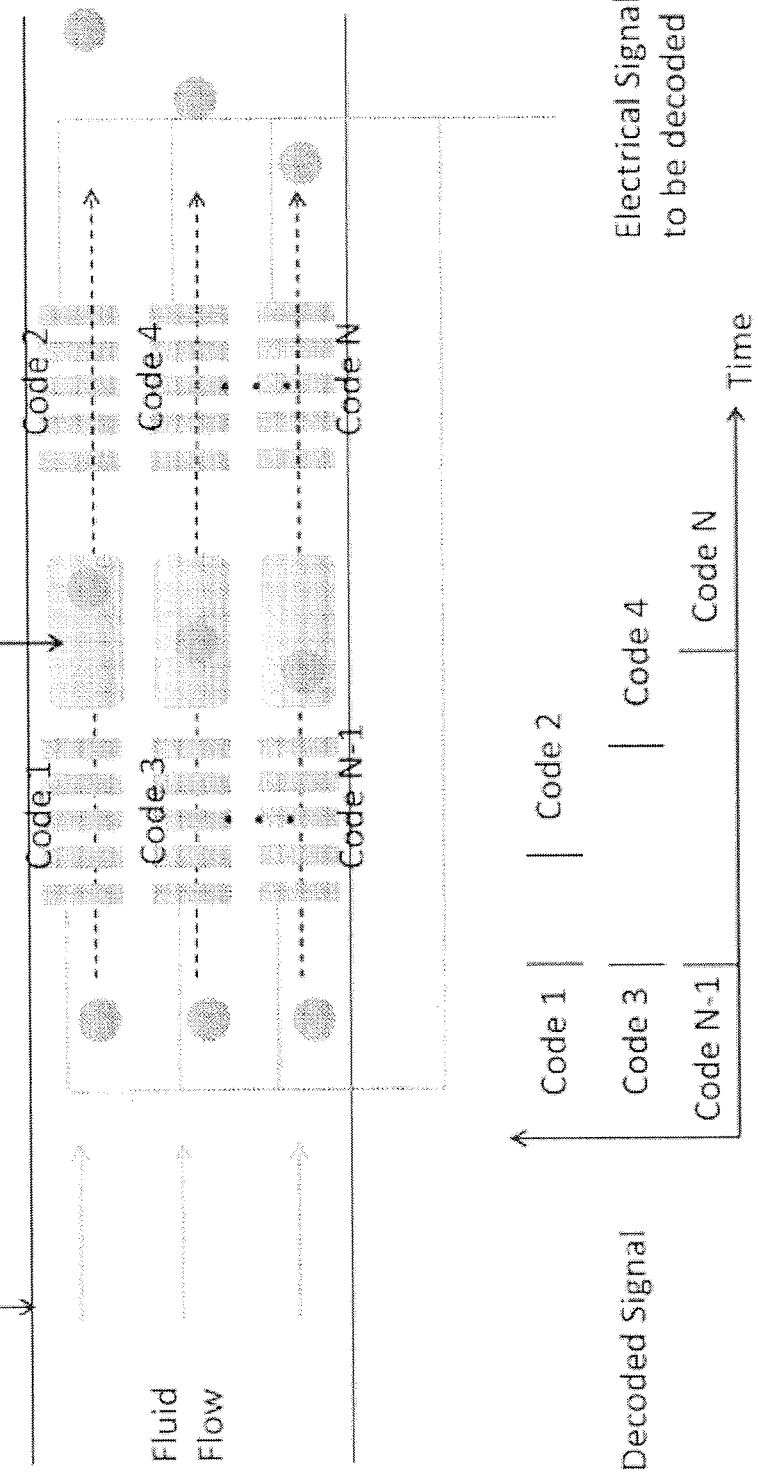
FIG. 53 shows a schematic demonstrating one embodiment of delay cytometry using a microfluidic CODES device.
Figure 54:
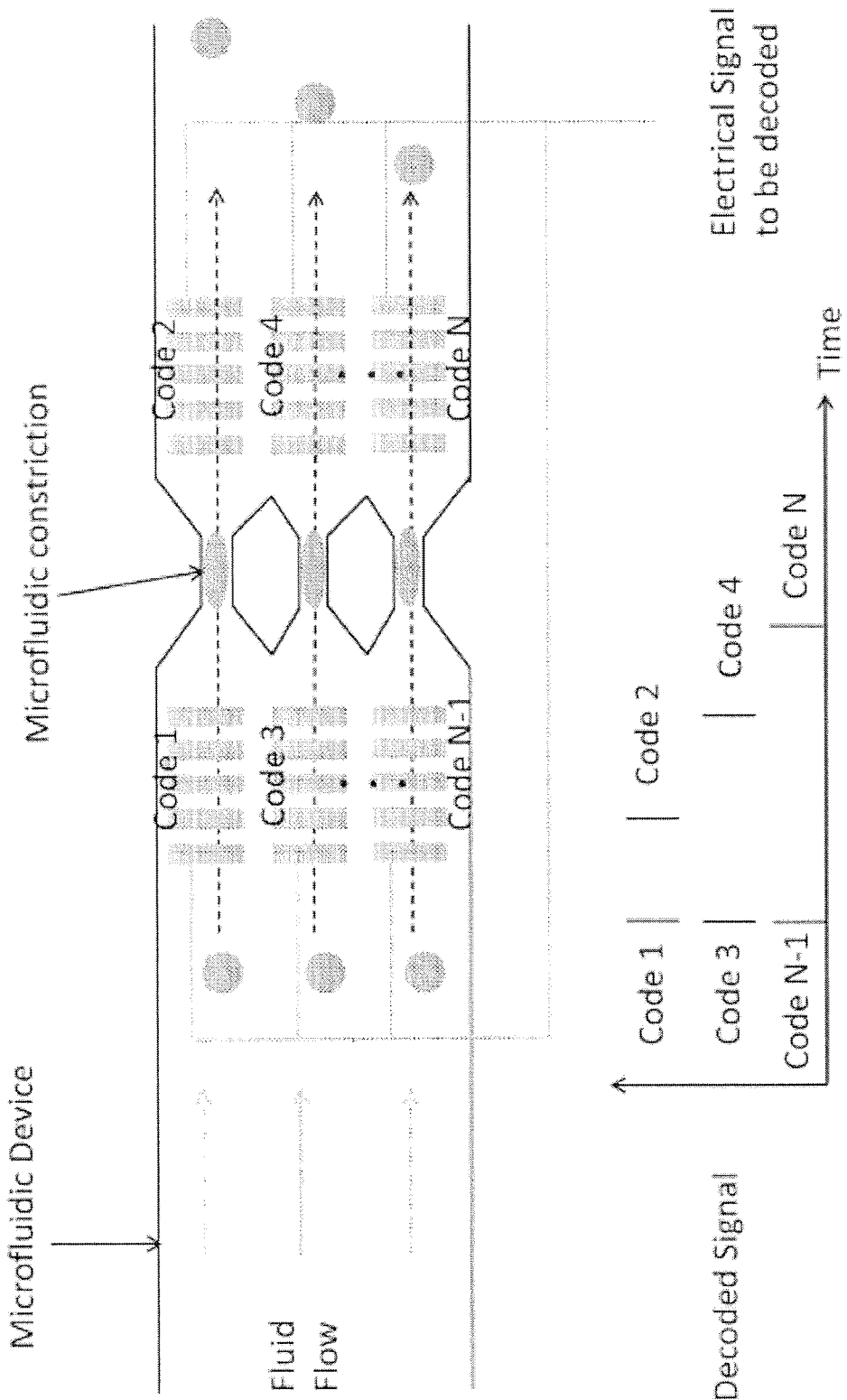
FIG. 54 shows a schematic demonstrating one embodiment of mechanical cytometry using a microfluidic CODES device.
Figure 55:
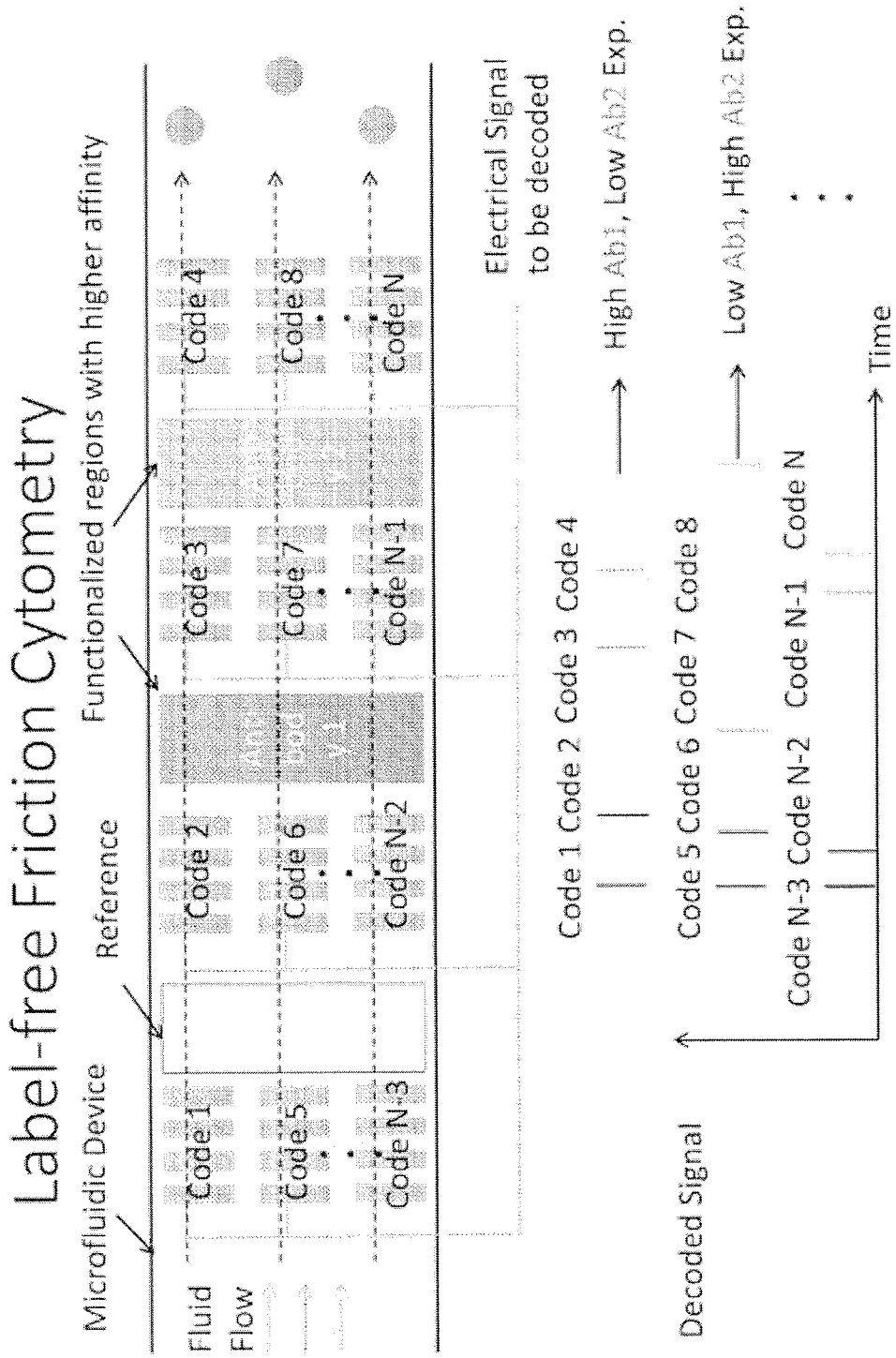
FIG. 55 shows a schematic demonstrating one embodiments of label-free friction cytometry using a microfluidic CODES device.
Figure 56:
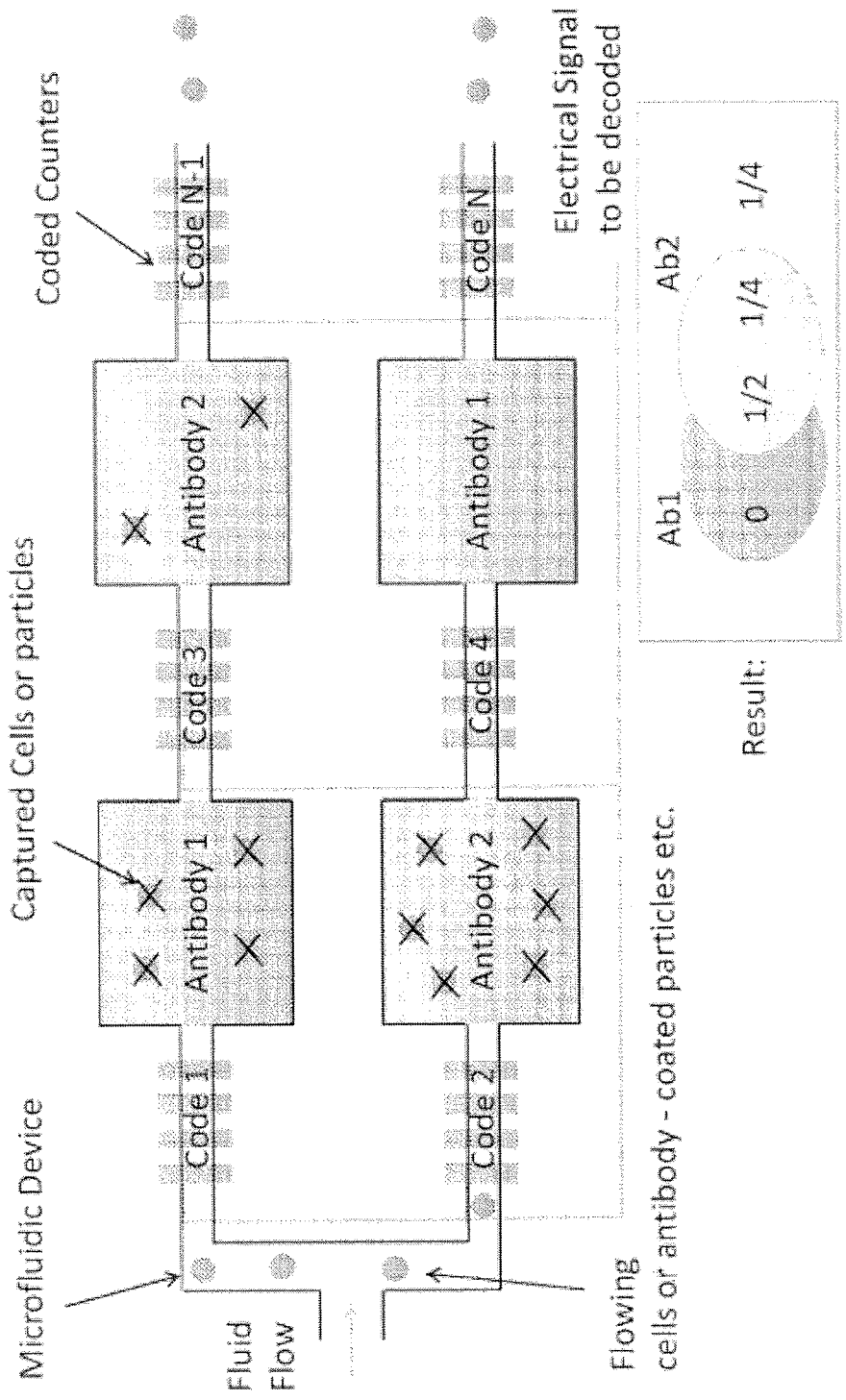
FIG. 56 shows a schematic demonstrating label-free combinatorial cell population-level surface expression profiling using a microfluidic CODES device.
Figure 57:
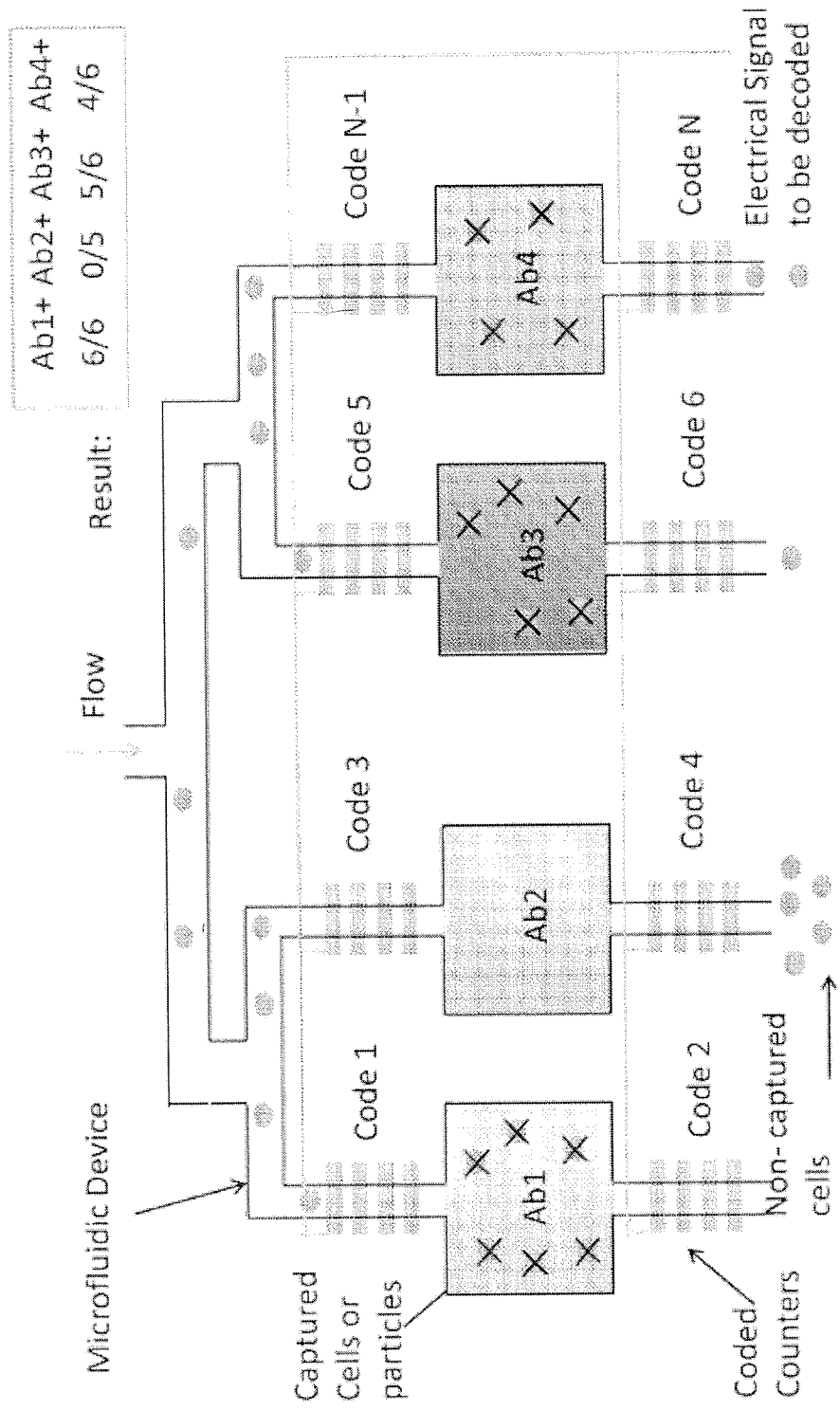
FIG. 57 shows a schematic demonstrating label-free cell population-level surface expression profiling using a microfluidic CODES device.
Figure 58:
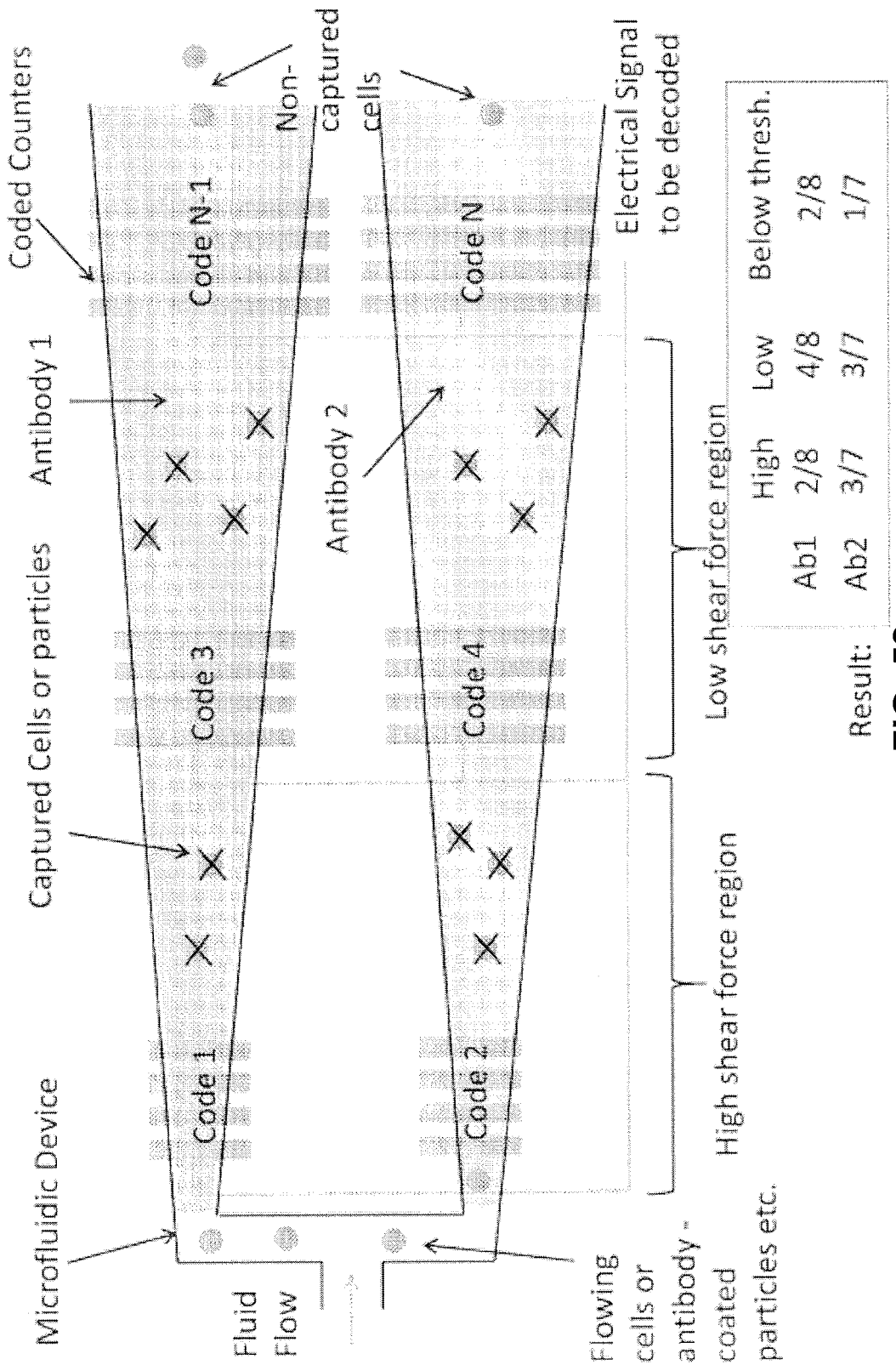
FIG. 58 shows a schematic demonstrating label-free population-level cytometry using a microfluidic CODES device.

Non-limiting exemplary systems are now described. In some instances the systems can resolve spatial information in affinity-based assays. As shown in FIG. 50, the concept of an integrated electronic platform for label-free immunophenotyping of leukocytes. The proposed system will be a microfluidic chip composed of (1) an array of immunoaffinity-capture chambers (ICCs), each functionalized with a different antibody to target a specific surface antigen of interest, (2) on-chip multiplexed electrical sensors that count blood cells both at the entrance and exit of each ICC to determine the percentage of captured, i.e., antigen-positive subpopulation. An advantage of the system described herein is that it uses an innovative electronic sensing technology to replace microscopic analysis that is required for downstream analysis of conventional microarray immnunoassays. This will allow development of a fully integrated device that will be fast, low-cost, portable and more amenable to point-of-care use at mobile and resource-limited settings than existing methods. Such a device will be transformative in monitoring of immune status for both disease diagnosis and prognosis. In addition, the flow rate of the sample can be modulated (even with a feedback loop), to measure instantaneous changes in the capture rates from each channel. This information can be used to assess the level of affinity, which is proportional cell surface antigen density. This can be achieved, because the sensors and devices provided herein also measure flow the speed of the moving particles. In other words, with varying sample flow rate, our technique can provide multidimensional data, which is usually only available using expensive benchtop flow cytometers.

Figure 67:
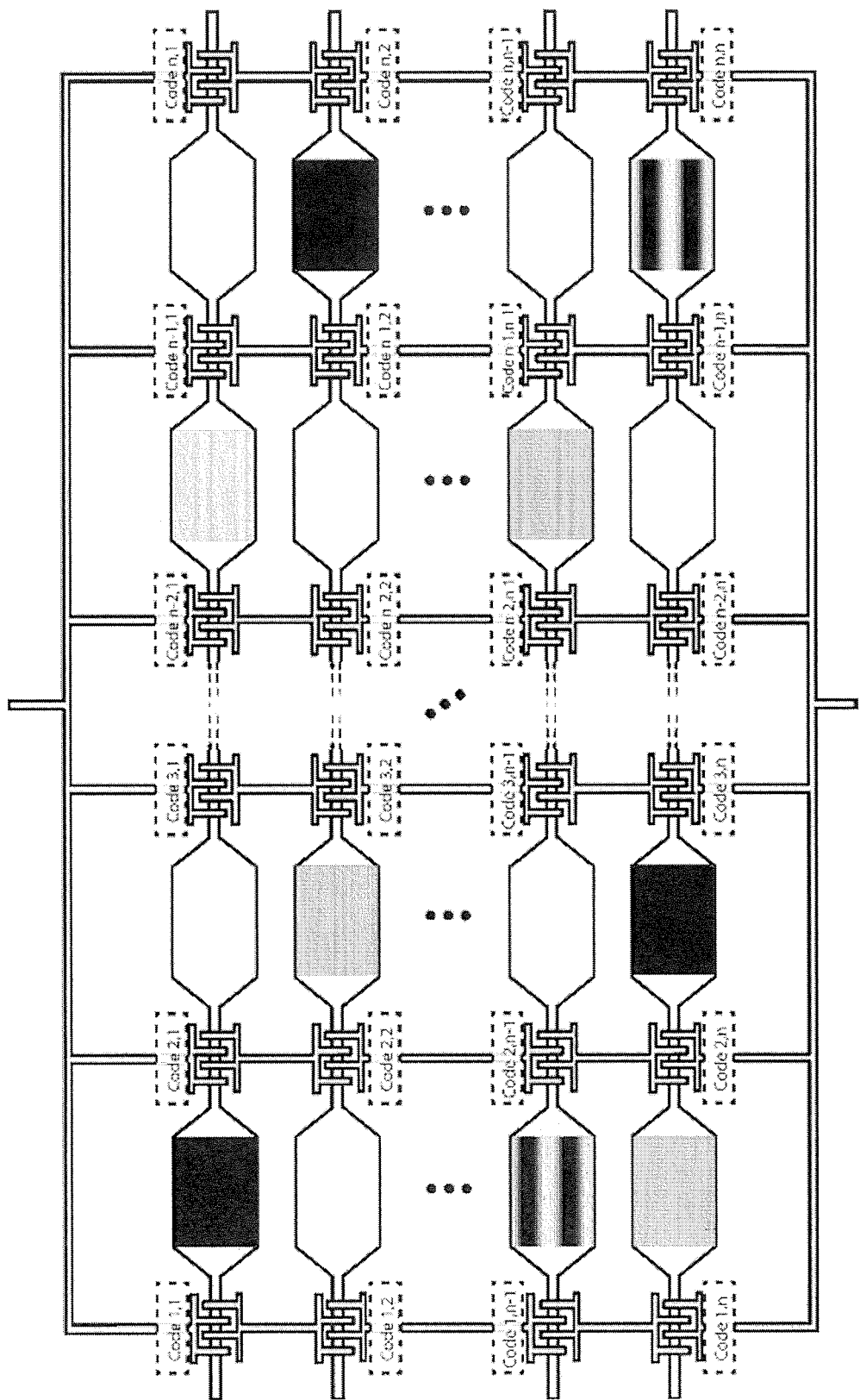
FIG. 67 shows a schematic demonstrating a system and method to carry out label-free electronic immunophenotyping of a cell and/or particle population for multichannel series detection.

For multiplexed detection of surface antigens, we can create devices capable of probing all possible cell phenotypes for antibodies of interest. One approach will be to construct an immunocapture chamber matrix, in which each row contains cascaded chambers with all possible permutations of antibody sequences (FIG. 67). At each node, a sensor producing a distinguishable signal will quantify number of cells transferred between chambers.

Figure 68:
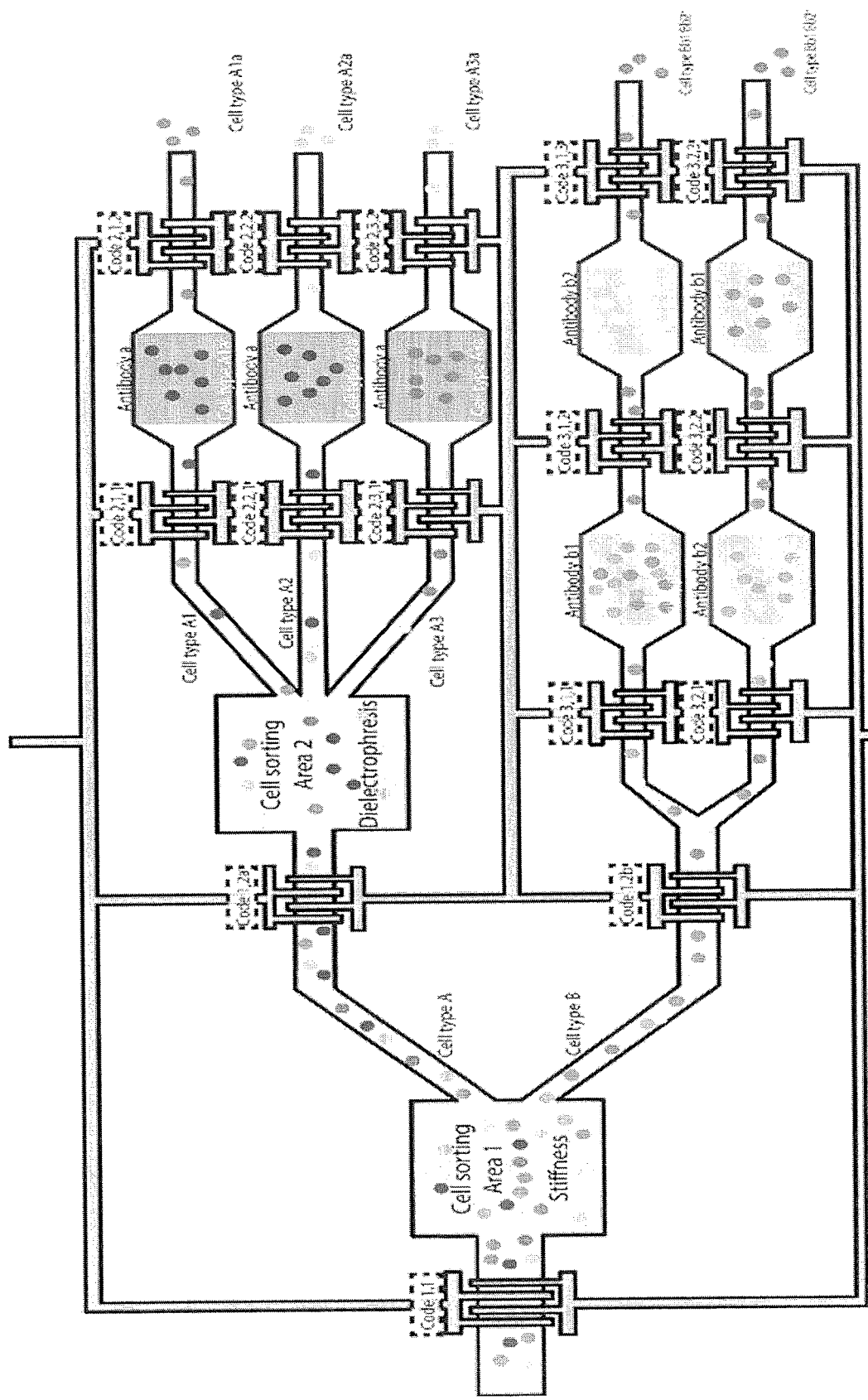
FIG. 68 shows a schematic demonstrating a system and method to carry out label-free electronic multi-modal phenotyping of a cell and/or particle population using multiple fractionation stages.

We can also combine multi-modal manipulation capabilities of microfluidics with a network of on-chip electronic sensors to track cells as they are fractionated on the device (FIG. 68). A device of this sort can electronically analyze cell properties in multiple domains.

Another example where these devices provided herein can be useful is in microfluidic sorting, where cells and particles are spatially mapped to different microfluidic channels based on their properties. Therefore the sensor and devices described herein offers a quantitative readout for sorting based microfluidic devices.

In some embodiments, channels between electrodes can be moved. The devices described herein do not necessarily operate with physical channels. The channels are can be defined by the sensing volumes. As long as the traces are well isolated from each other sensing areas can be laid out to do orthogonal sensing in a single non-compartmentalized microfluidic channel.

Figure 91:
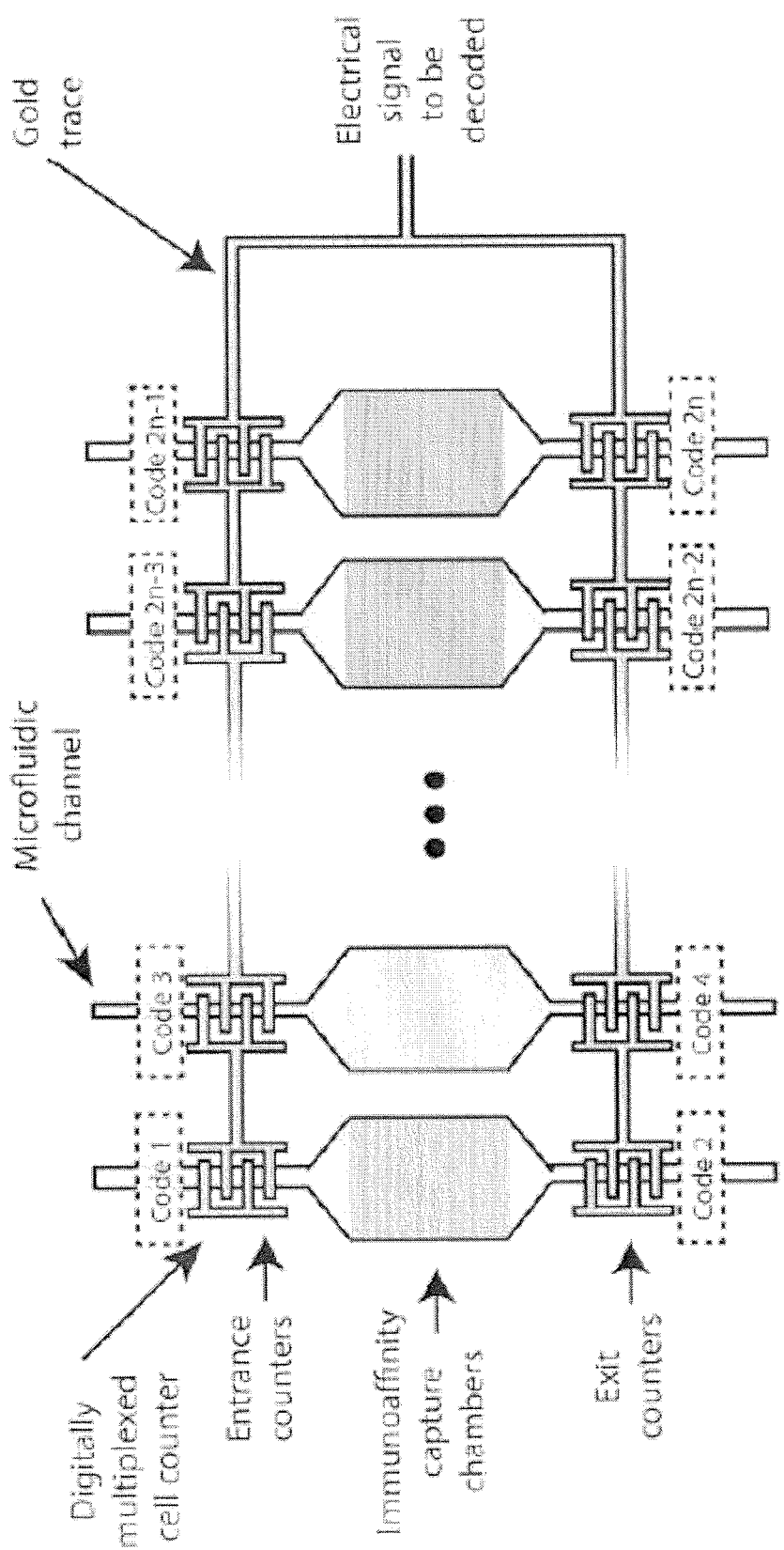
FIG. 91 shows one embodiment of a multiplexed microfluidic device having a coded fluid path.
Figure 92:
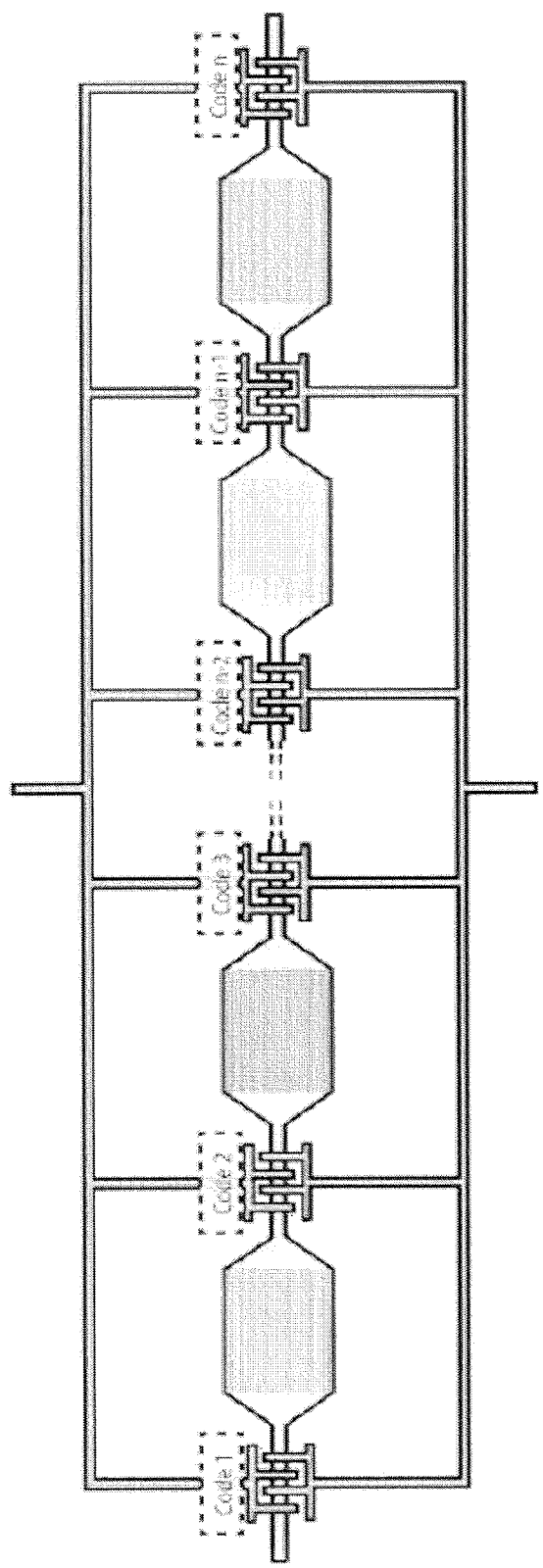
FIG. 92 shows one embodiment of a multiplexed microfluidic device having a coded fluid path.

Besides parallel structures for cell surface antigen or label recognition, the technology provided herein can be used in series connection devices and mixed connection devices. By using an M×N structure, it is possible to detect and count a series of antigen expression or label on many kinds of cells simultaneously (see e.g. FIGS. 67 and 91-92).

Figure 93:
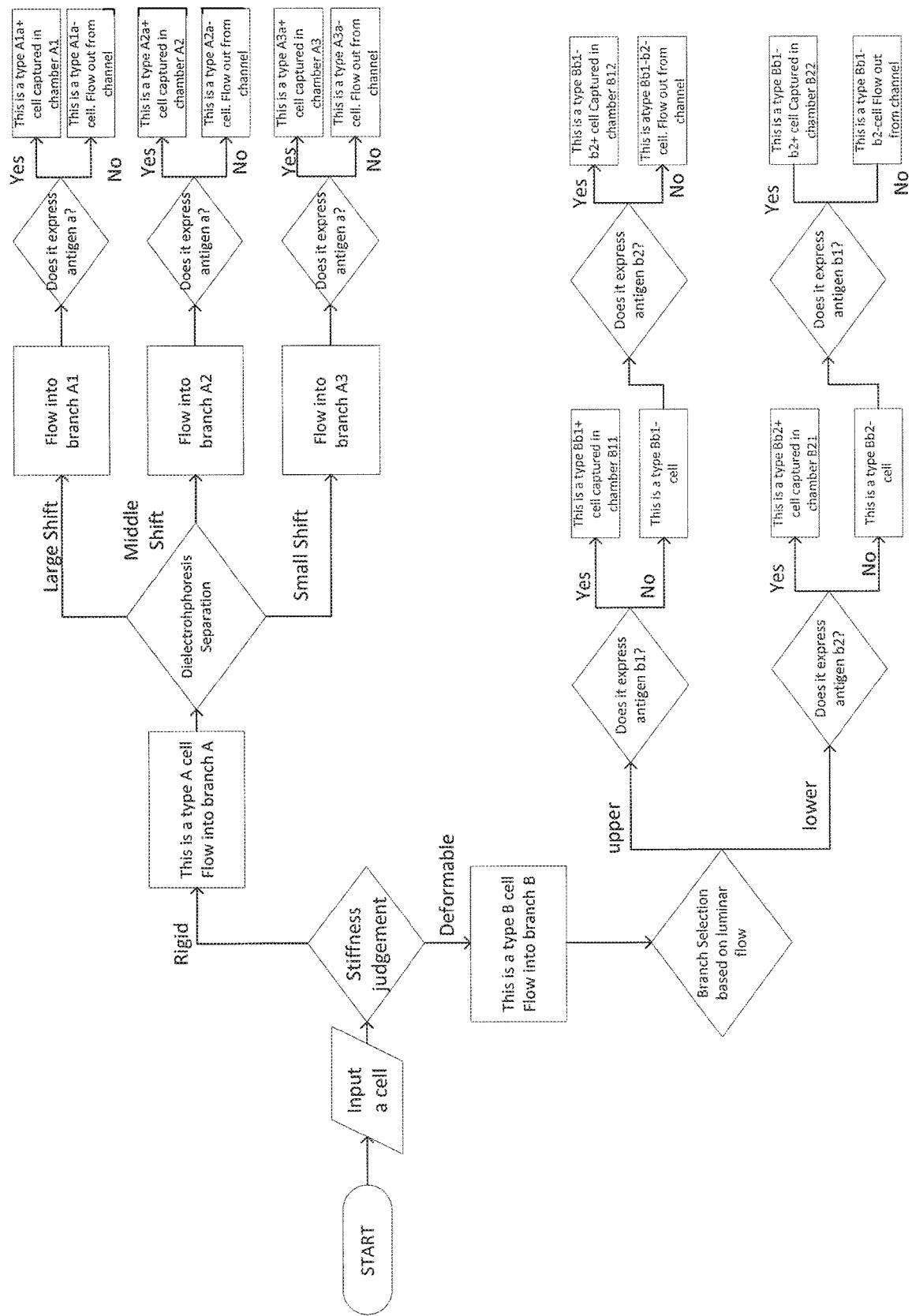
FIG. 93 shows an embodiment of a multiple step particle sorting and antigen and/or label detection process utilizing a multiplexed microfluidic device having a coded fluid path.

As shown in e.g. FIGS. 68 and 93, multiple step particle (e.g., cell) sorting and cell surface antigen or label detection can be conducted together. As shown in these figures, after the first step of sorting based on a particle property (e.g. a cell biophysical property) the cell can be separated in set A1 for a next step B based on a physical field sorting procedure. For cells after each sorting procedure, they can go to antigen expression or label capture chambers to fulfill the antigen or label detection.

Introducing more connections to the microfluidic device can further increase the multiplexing capability of our technology. In this case, the total number of locations that can be monitored using our technology will be proportional to the product of number of chip connections and multiplexing capability through coding.

Additional non-limiting examples are demonstrated in FIGS. 51-58 and 91 and 92.

Example 5

Integration of electronic sensors on microfluidic chips to spatially track sorted/captured particles can allow for low-cost, integrated lab-on-a-chip assays for testing of biological and other samples in resource-limited settings. To electronically track particles on a microfluidic chip, a multiplexed electronic sensor technology, called microfluidic CODES was developed by creating a micromachined electrode network that generates distinct resistive pulse sequences when a particle is detected (Liu et al., 2016. Lab Chip. 16:1350-1357). There, orthogonal codes (e.g., Gold sequences) were used, in a bipolar form so that the interfering sensor signals from different microfluidic channels could be decoded.

Here, a multiplexing scheme is introduced that works with arbitrary pulse sequences. Advantages of using arbitrary pulse sequences can be the flexibility in code design and improved scalability due to a reduction of sensing volume as compared to sensor designs based on Gold sequences. As a result, particles are less likely to overlap in the sensing volume, which can lead to a reduced error rate.

Figure 69A:
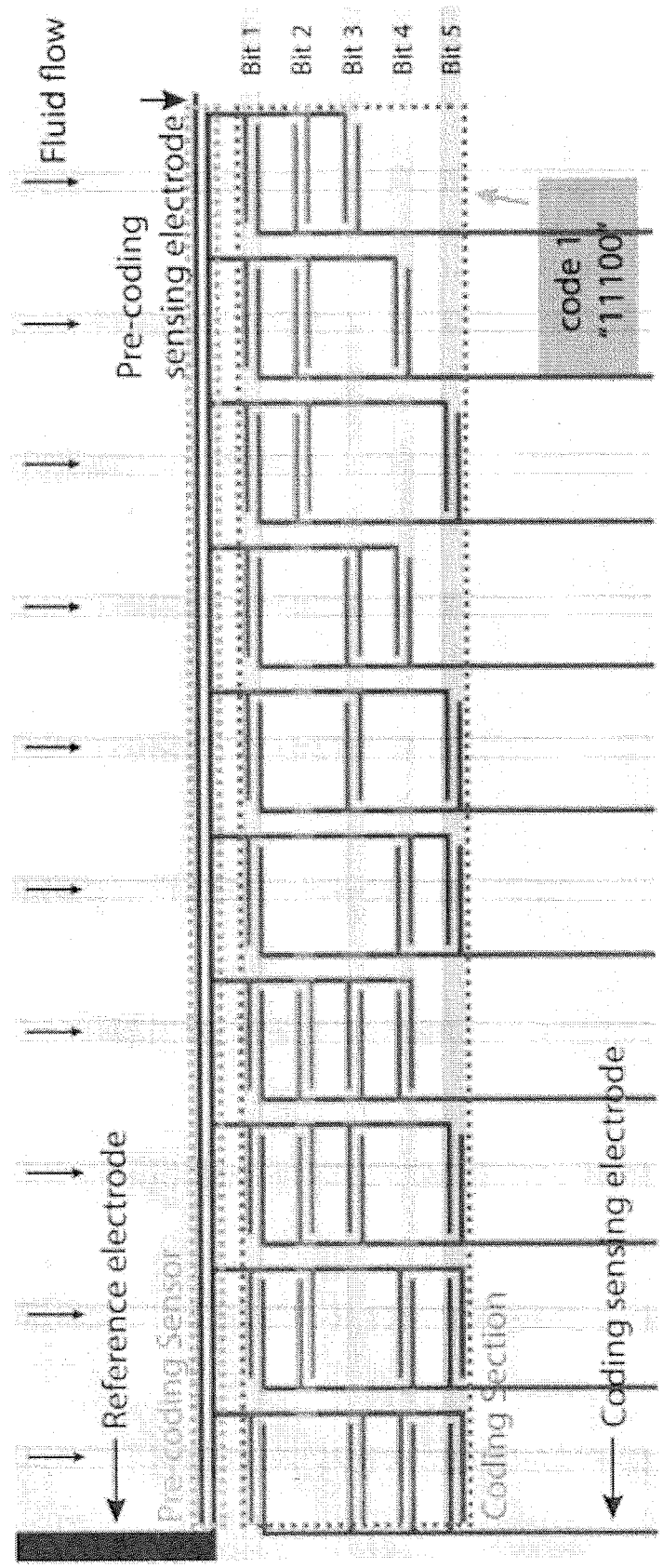
FIG. 69A shows an image (FIG. 69A) of a fabricated microfluidic device and experimental set up (FIG. 69B). The image of FIG. 69A shows a fabricated microfluidic device employing a pre-coding sensor in front of (up flow) of a coding sensor (or coding electrodes). Each of the 10 microfluidic channels is coded with a 5-bit digital code that are not orthogonal to each other.

The detection schemes presented here include a resistive pulse sensor as a pre-coding sensor that is ahead of (up flow) from the coding electrode(s) (FIG. 69A). The pre-coding sensor signal can be used to measure size, speed and relative timing of each particle, all but its spatial location. Based on measured parameters, the first coding signal contained in an experimental waveform is estimated and subtracted. This process will iterate until no pre-coding sensor signal can be detected. Information from the pre-coding sensor is important since it significantly reduces the parameter space to be swept for the fitting. Moreover, the differences in particle size and speed guarantee a unique solution for fitting, while these variations can be detrimental to the performance of Gold-sequence based multiplexing (R. Gold, "Optimal binary sequences for spread spectrum multiplexing," IEEE Trans. Inf. Theory, 13, 619-621, 1967).

Figure 69B:
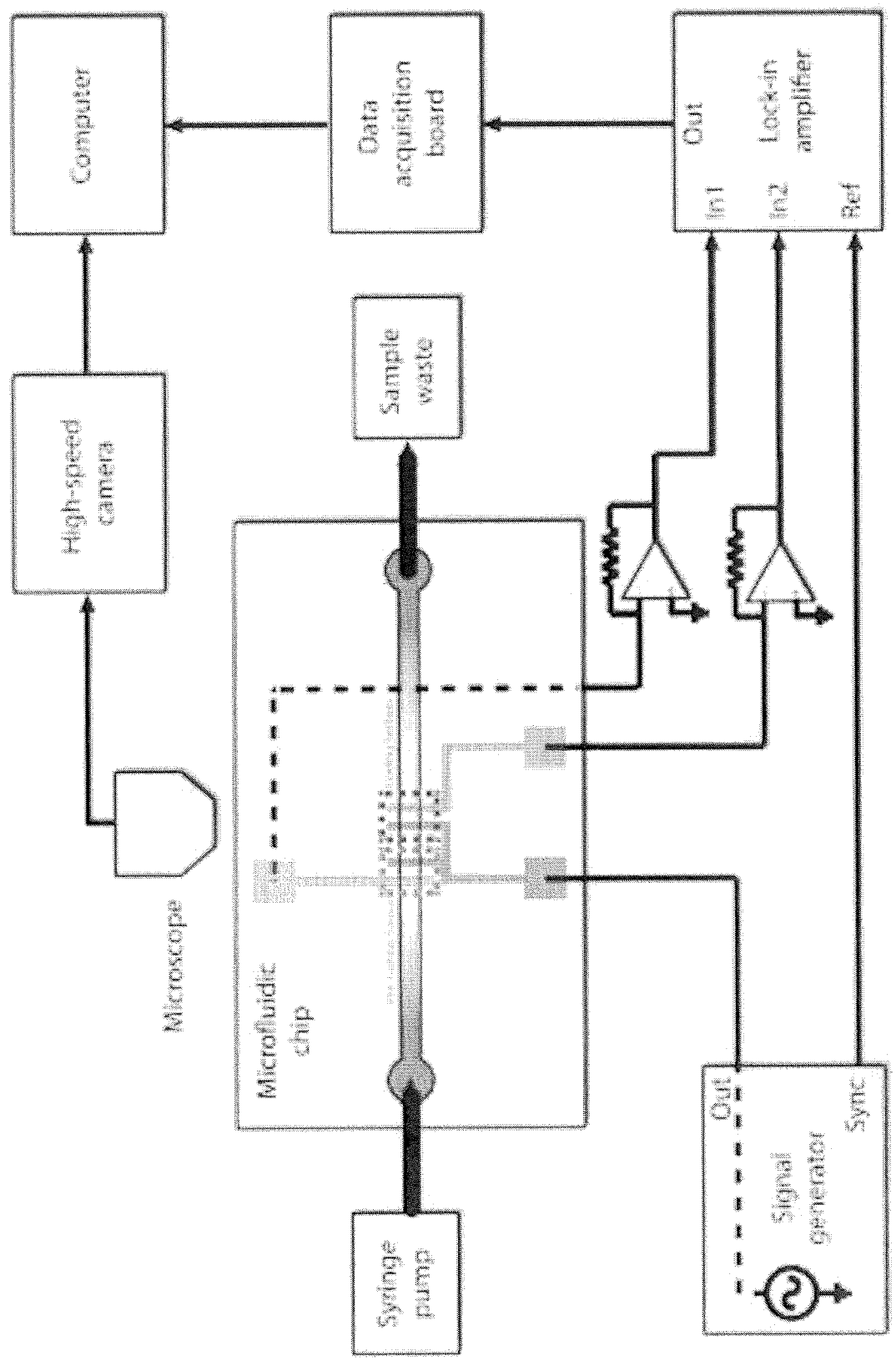
FIG. 69B shows an experimental setup. A HeyA8 cell suspension was driven at a constant flow rate through the microfluidic chip using a syringe pump. An AC signal was applied to the reference electrodes. Pre-coding sensor and code signals were acquired through independent trans-impedance amplifiers and a lock-in amplifier. Signals are collected by a data acquisition board and processed in a computer. High-speed microscopy was used for validating the electrical measurements.

To test the device, a simulated biological sample of HeyA8 human ovarian cancer cells suspended in phosphate buffer saline was prepared. A 500 kHz AC signal was applied to the reference electrode and measured current change in the circuit using a lock-in amplifier as the sample was driven through the microfluidic chip at a constant flow rate (FIG. 69B).

Figure 70A:
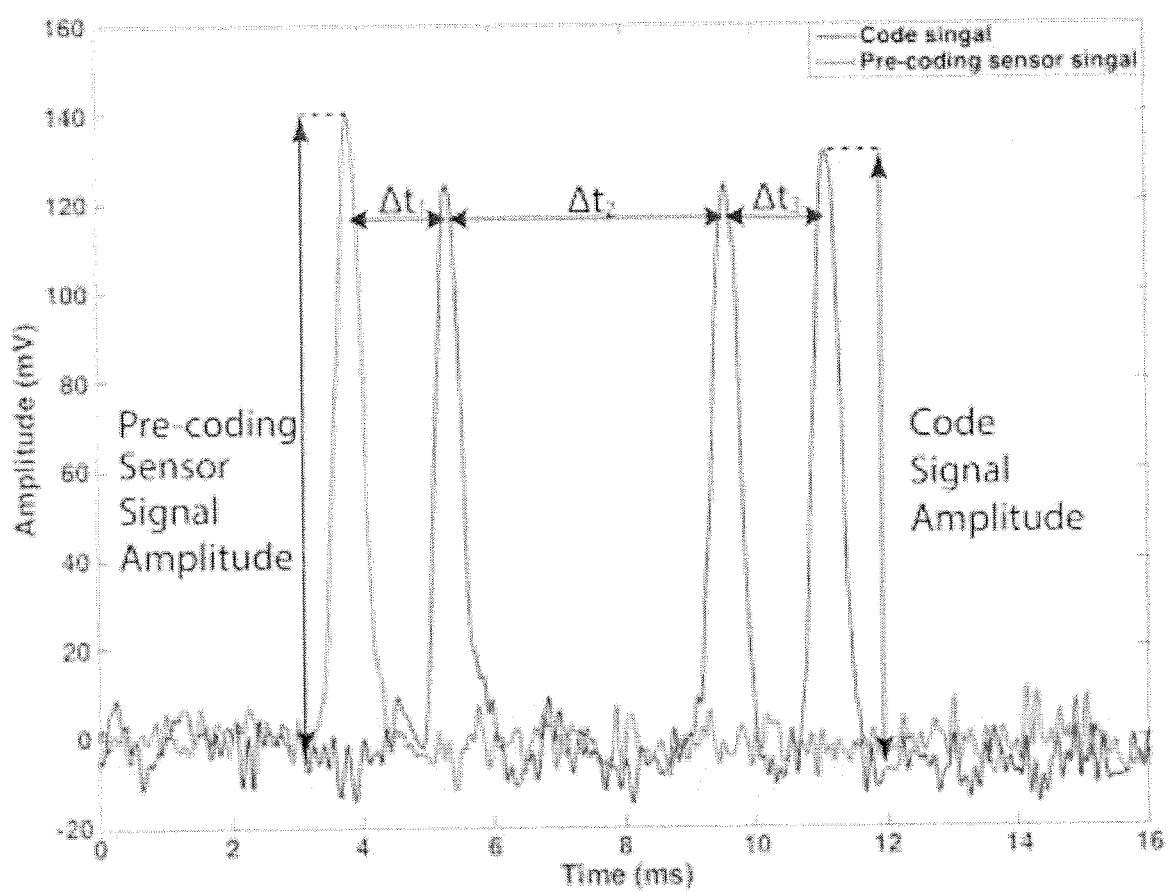
FIGS. 70A-70C shows graphs (FIGS. 70A-70B) and an image of a device (FIG. 70C) showing a measured signal corresponding to the code "10011" (FIG. 70A), decoding of a two-cell overlapping case (FIG. 70B), and high speed microscopy image validating that two overlapping cells occupied the channel 9 ("11011") ad channel 8 ("11101").
Figure 70B:
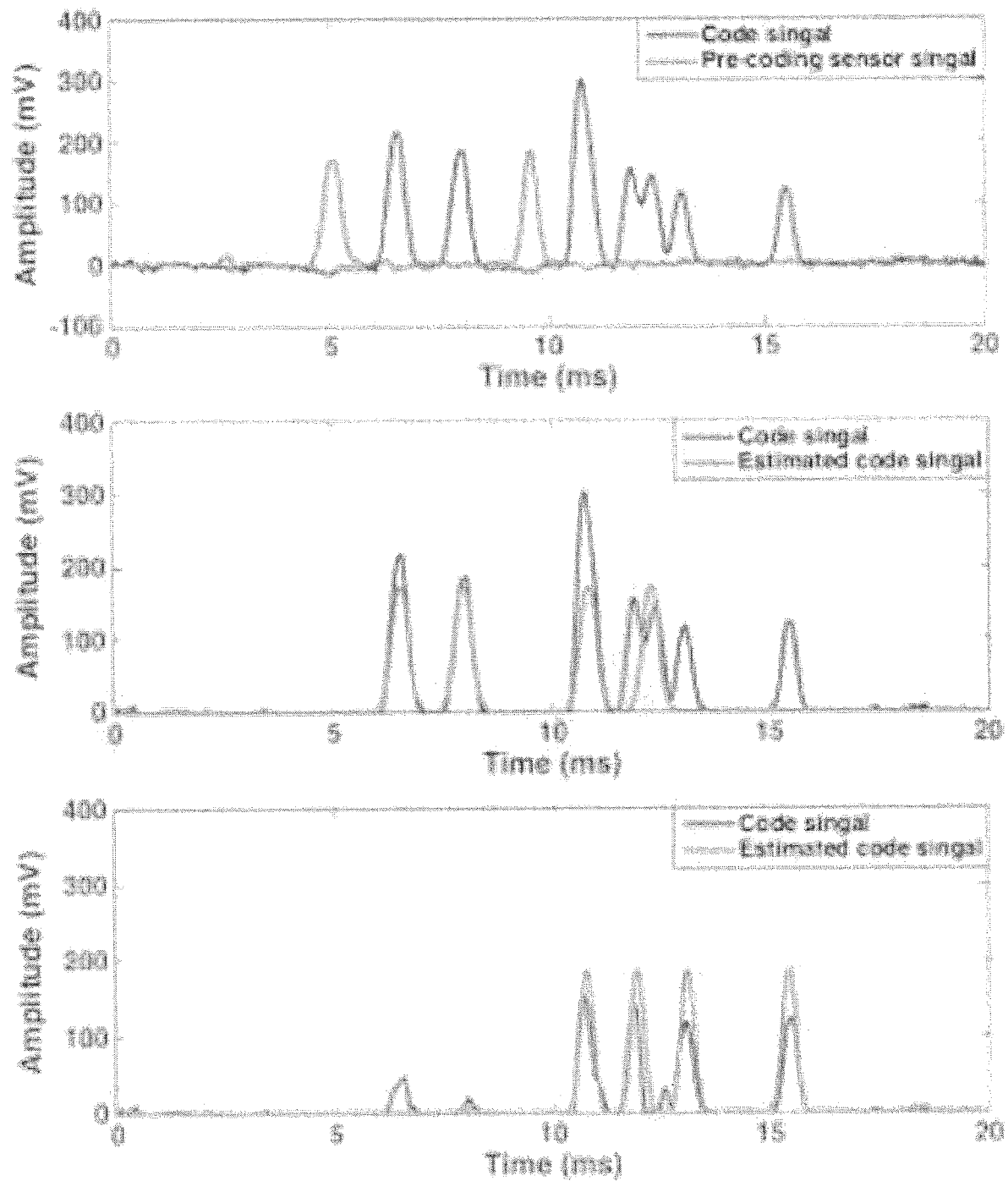
Figure 70C:
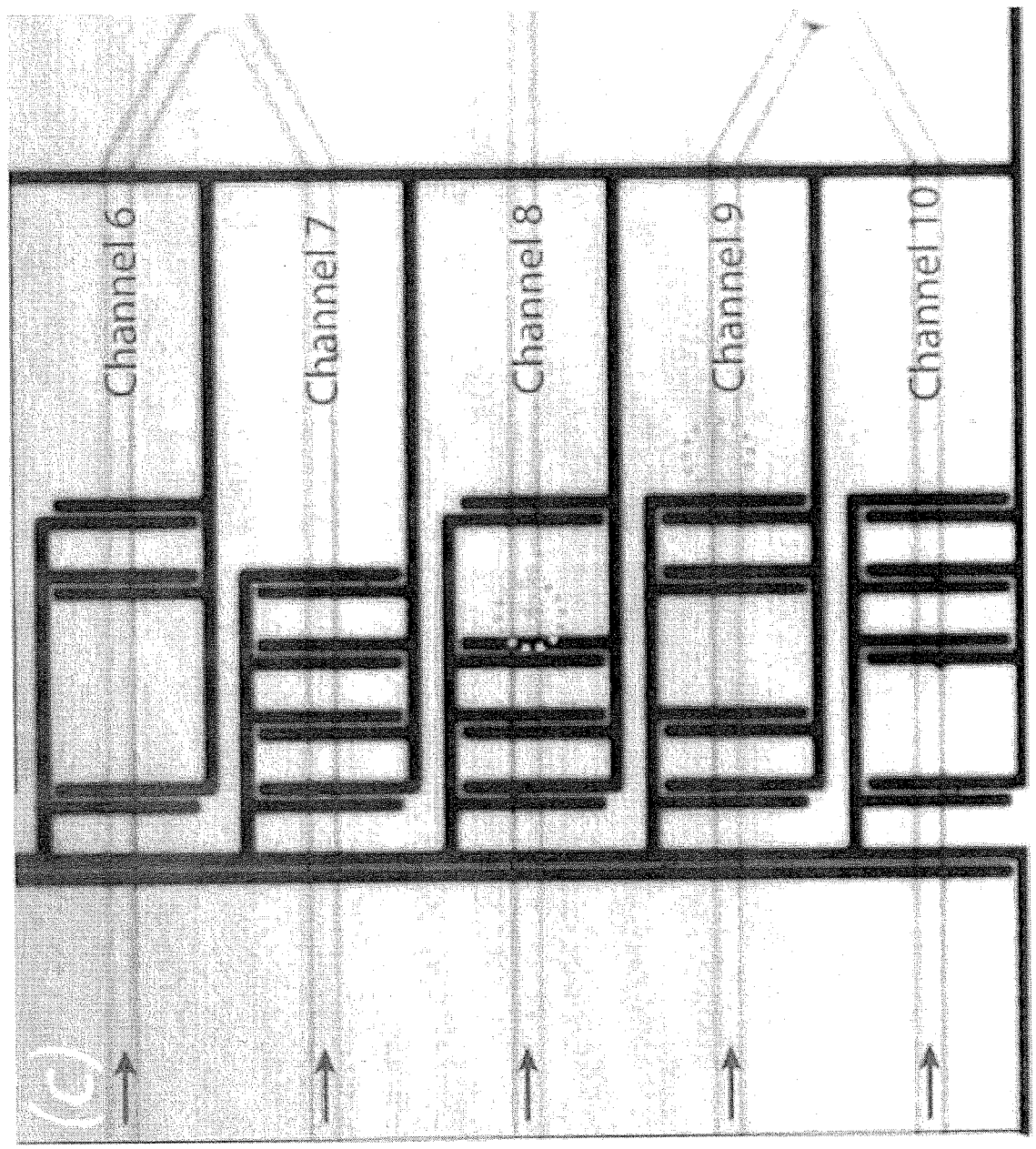

The results are demonstrated in FIGS. 70A-70C. FIG. 70A shows a recorded pre-coding sensor signal overlaid with the corresponding code signal. Time delays between the peaks match with the coding electrode layout of the specific channel, provided that cell speed remains constant. Also, it was determined that the ratio of the peak amplitudes of the precoding sensor signal and code signal is constant and is a direct consequence of the sensor circuit layout. Therefore, pre-sensor signal can be used to estimate the amplitude and temporal properties of the code signals.

FIG. 70B shows the decoding of code signals due to two interfering cells. In the first iteration, the first pulse in the pre-coding sensor signal was used to estimate the corresponding code signal. Then the first pulse in the pre-coding sensor signal was removed and the estimated code signal and iterated the process until no pulses remain in the pre-coding sensor signal. These results were also confirmed by the simultaneously recorded high-speed video (FIG. 70C).

Example 6

Figure 71:
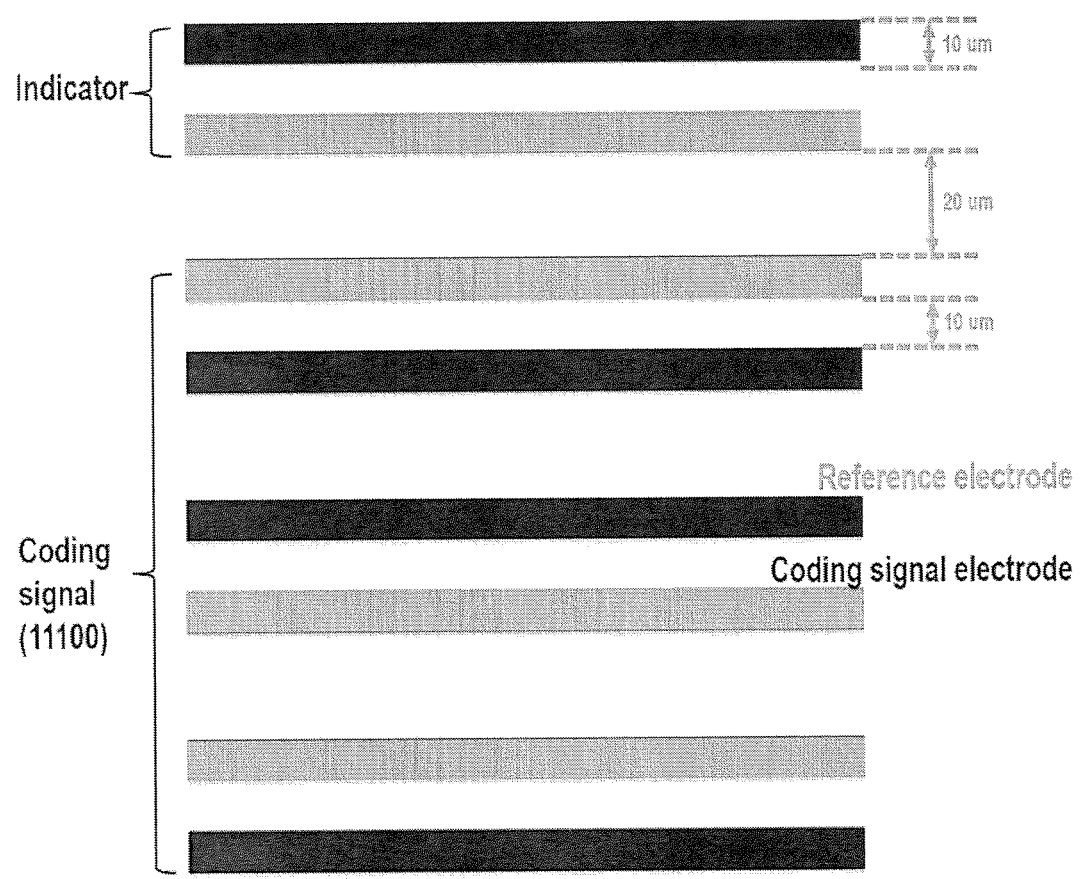
FIG. 71 shows an embodiment of an electrode configuration for a microfluidic device having a coded fluid path.
Figure 72:
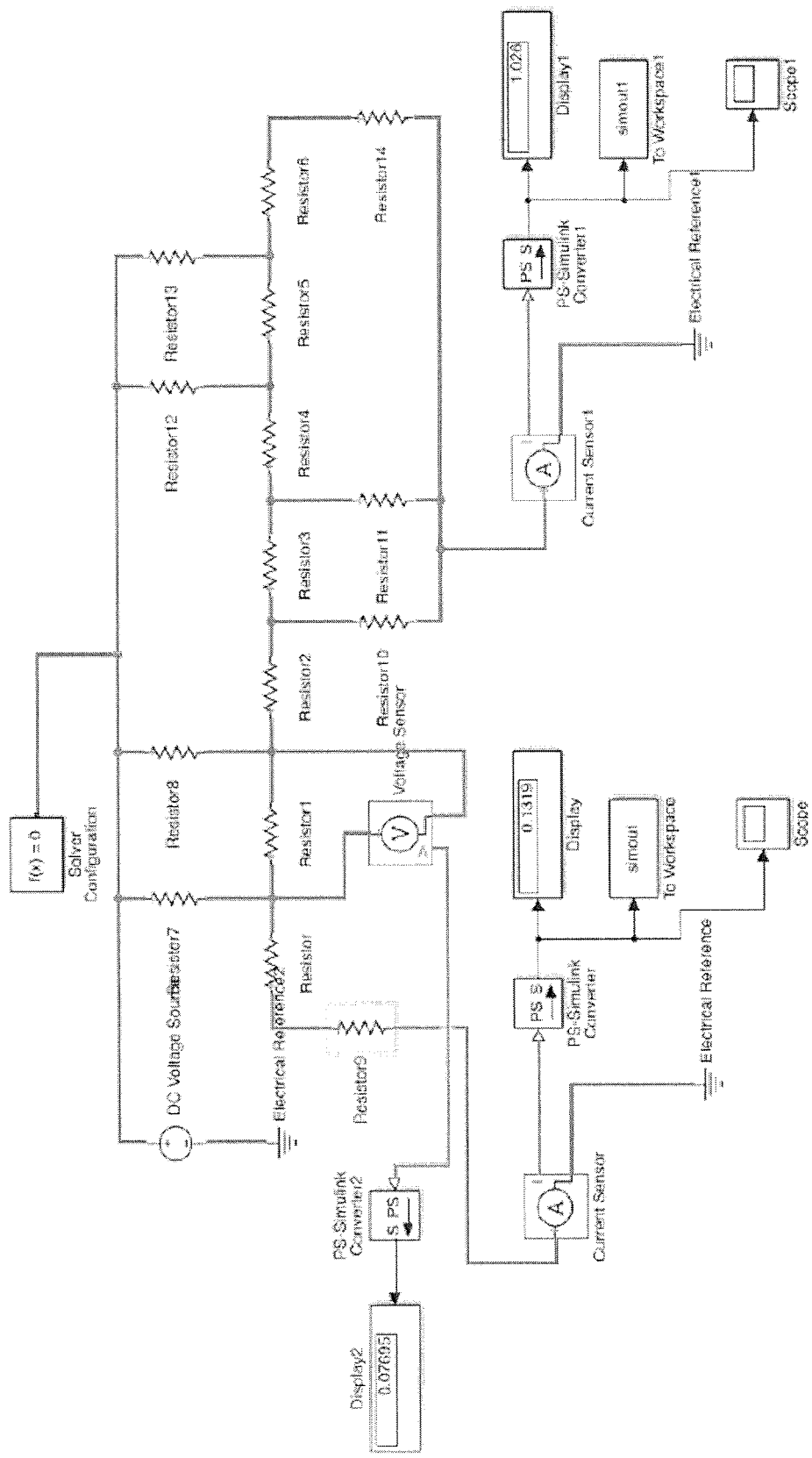
FIG. 72 shows the MATLAB Simulink circuit.

A simulation for a microfluidic device having coded channels was generated. Resistors were used as resistive impedance to make an equivalent circuit for pre-sensing and the coding device. FIG. 71 shows one embodiment of an electrode configuration of the microfluidic device. The circuit was simulated using Simulink (MATLAB) (FIG. 72).

Figure 73:
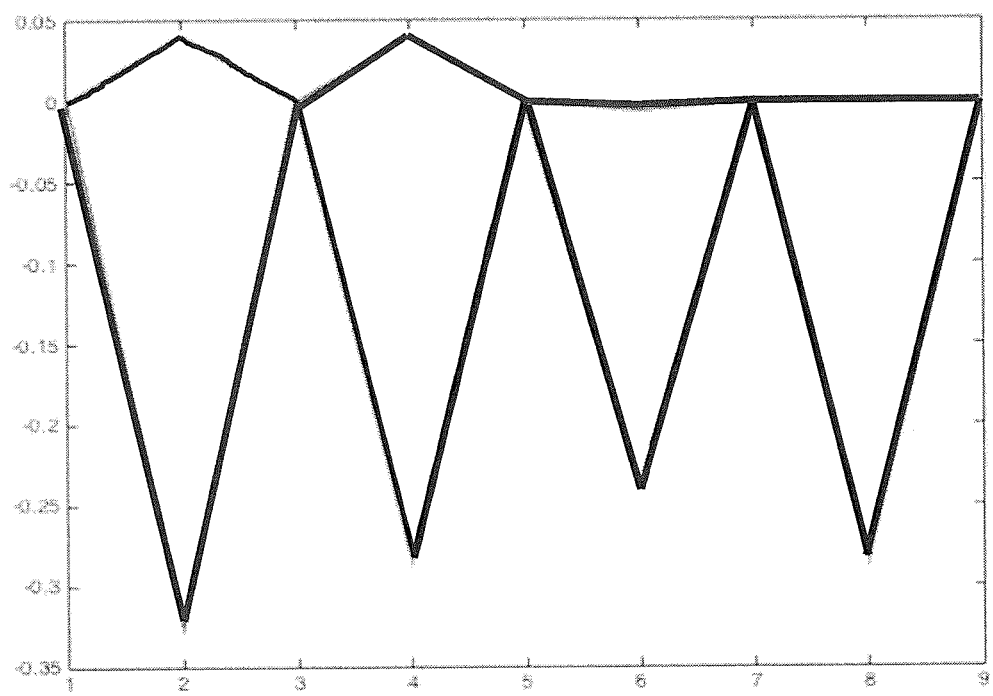
FIG. 73 shows a graph demonstrating the simulation result for coding 11100, when considering 1Ω for liquid without cell, 101Ω for a liquid with cell, 1Ω for an electrode branch and 10Ω for a gap.

FIG. 73 shows a graph demonstrating the simulation result for coding 11100, when considering 1Ω for liquid without cell, 101Ω for a liquid with cell, 1Ω for an electrode branch and 10Ω for a gap. Differences between amplitudes among coding regions can be less if the gap resistance is increased.

Figure 74:
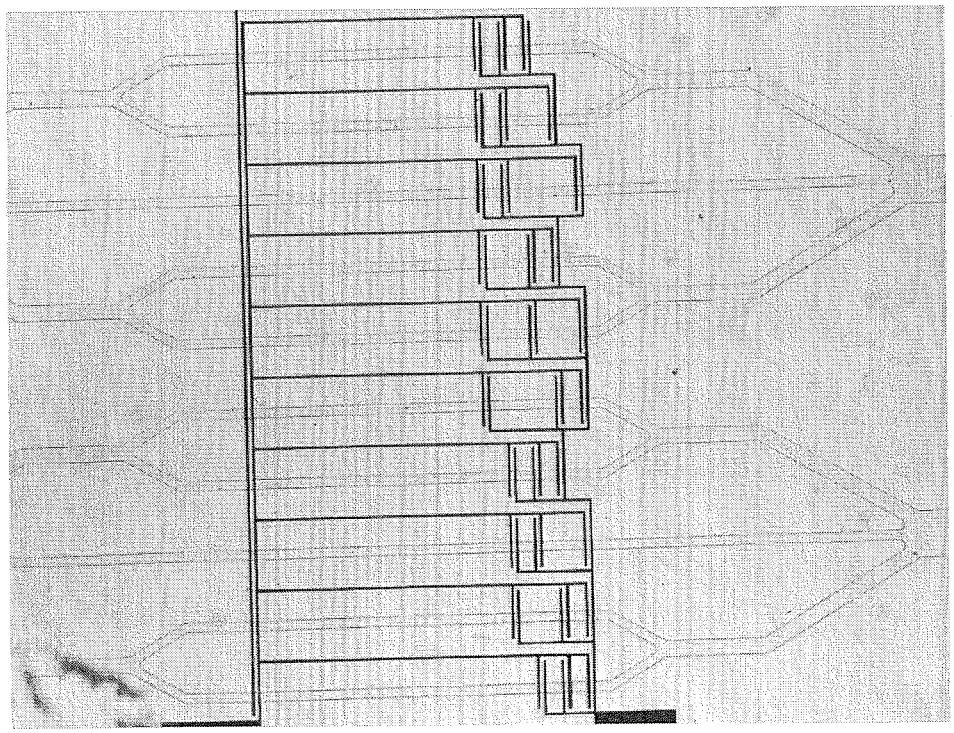
FIG. 74 shows an image of a 2-electrode pair with a 750 μm gap between the pre-sensing area and the coding region and a 50 μm gap between each bit in the coding region.
Figure 75:
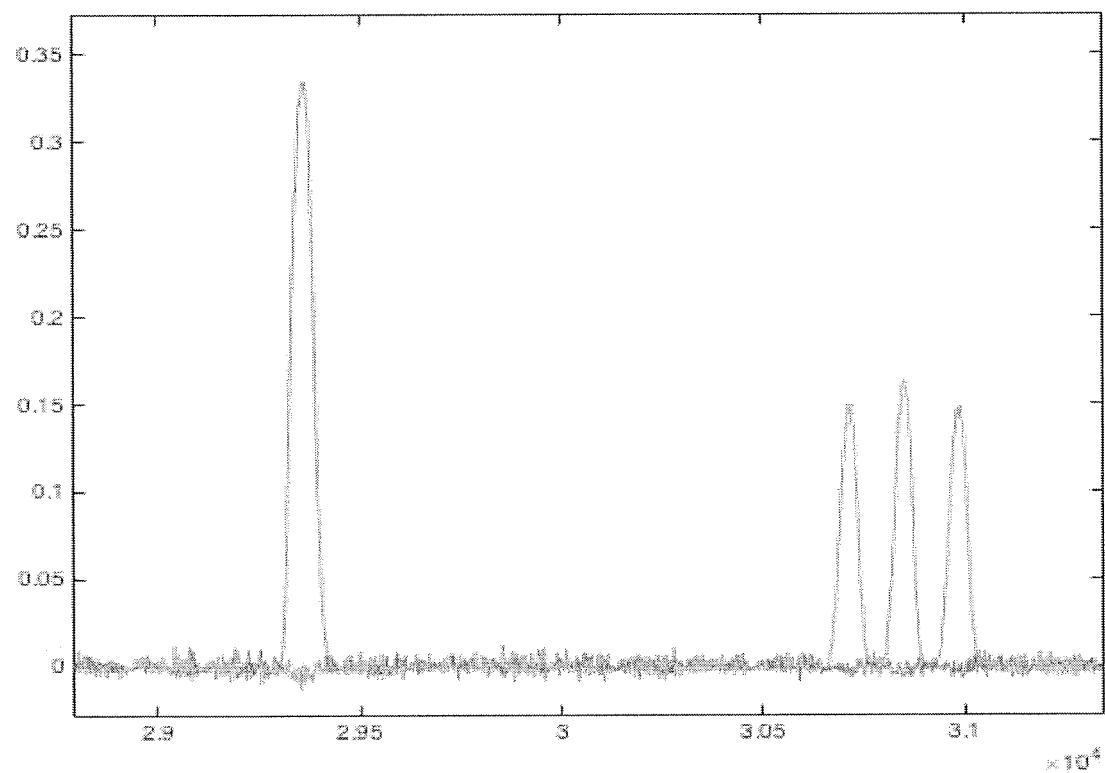
FIG. 75 shows a graph demonstrating a sample signal from channel 1 of the device of FIG. 74.

FIG. 74 shows an image of a 2-electrode pair with a 750 μm gap between the pre-sensing area and the coding region and a 50 μm gap between each bit in the coding region. FIG. 75 shows a sample signal from channel 1 of the device of FIG. 74.

Figure 76:
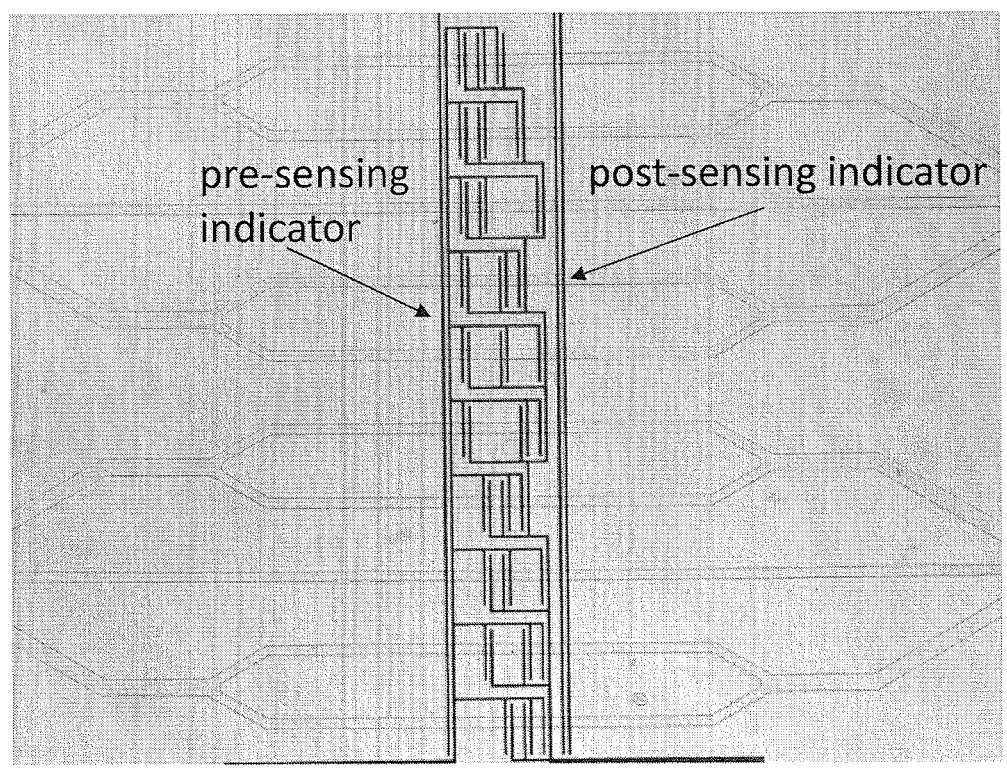
FIG. 76 shows an image of a two indicator device having one pre-sensing indicator and one post sensing indicator.

FIG. 76 shows an image of a two indicator device having one pre-sensing indicator and one post sensing indicator.

Figure 77:
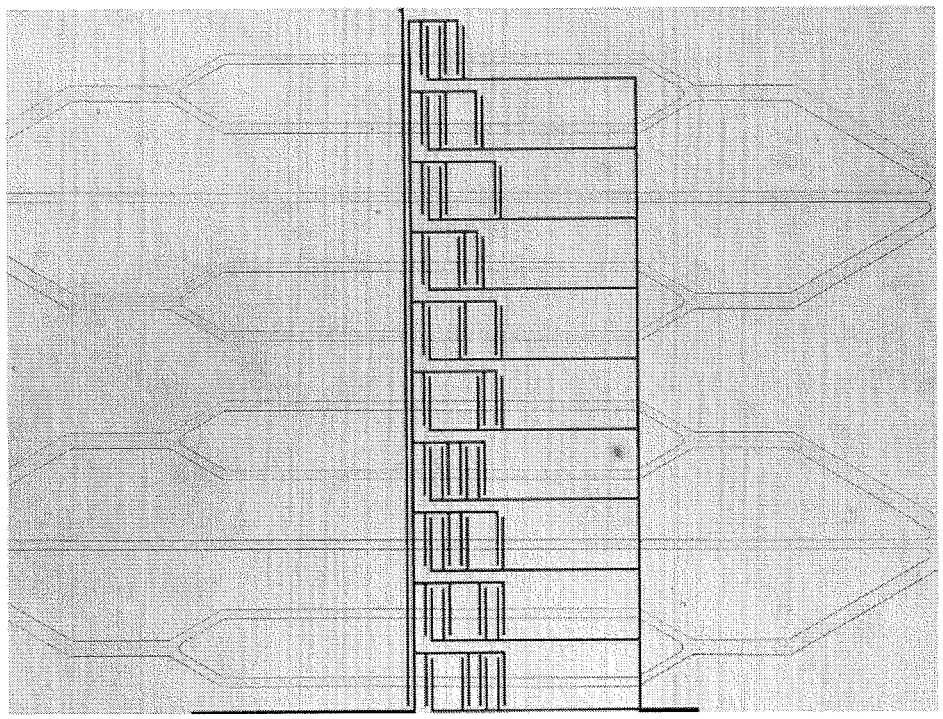
FIG. 77 shows an image of a 2-electrode pair device where code set 2 was set with all initial 1 code.
Figure 78:
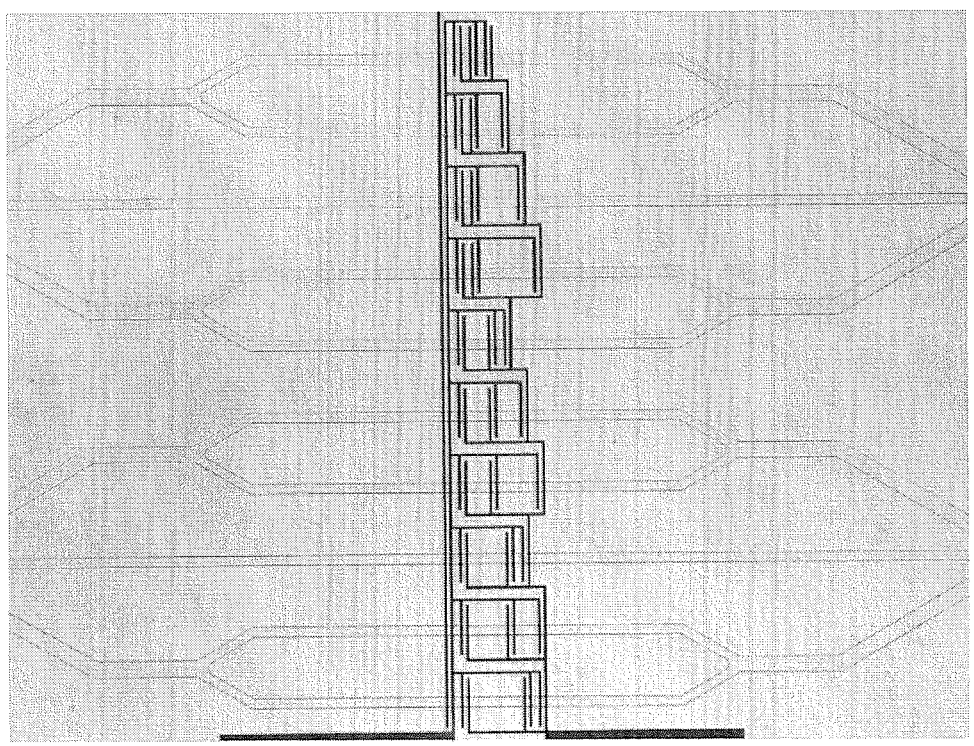
FIG. 78 shows an image of a 2-electrode pair device where code set 2 was changed to a set with all initial 1 code and the same bit number (6 bits) and same 1 number in these bits (3 "1"s among 6 bits).

Changes were also made to the coding area as shown in FIGS. 77 and 78, wherein code set 2 was set with all initial 1 code (FIG. 77) or code set 2 was changed to a set with all initial 1 code and the same bit number (6 bits) and same 1 number in these bits (3 "1"s among 6 bits) (FIG. 78).

Example 7

Figure 79A:
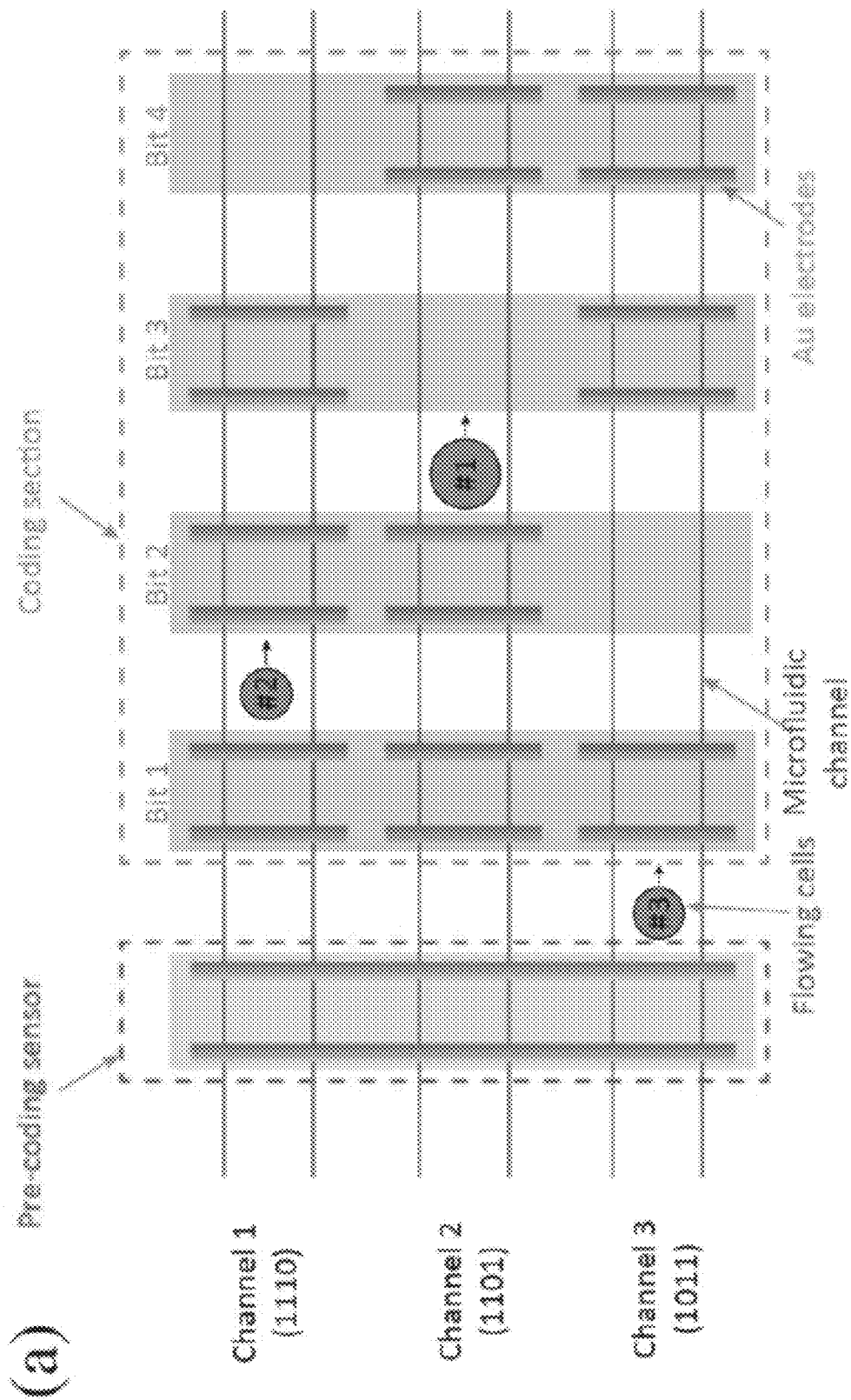
FIGS. 79A-79C show a schematic (FIG. 79A) of a detection scheme that includes a pre-coding sensor (or electrode) prior to the coding sensor (or coding electrodes) an example output (FIG. 79B) from the device of FIG. 79A, and a signal processing method (FIG. 79C) for resolving information on particles flowing though the channels of the device.
Figure 79B:
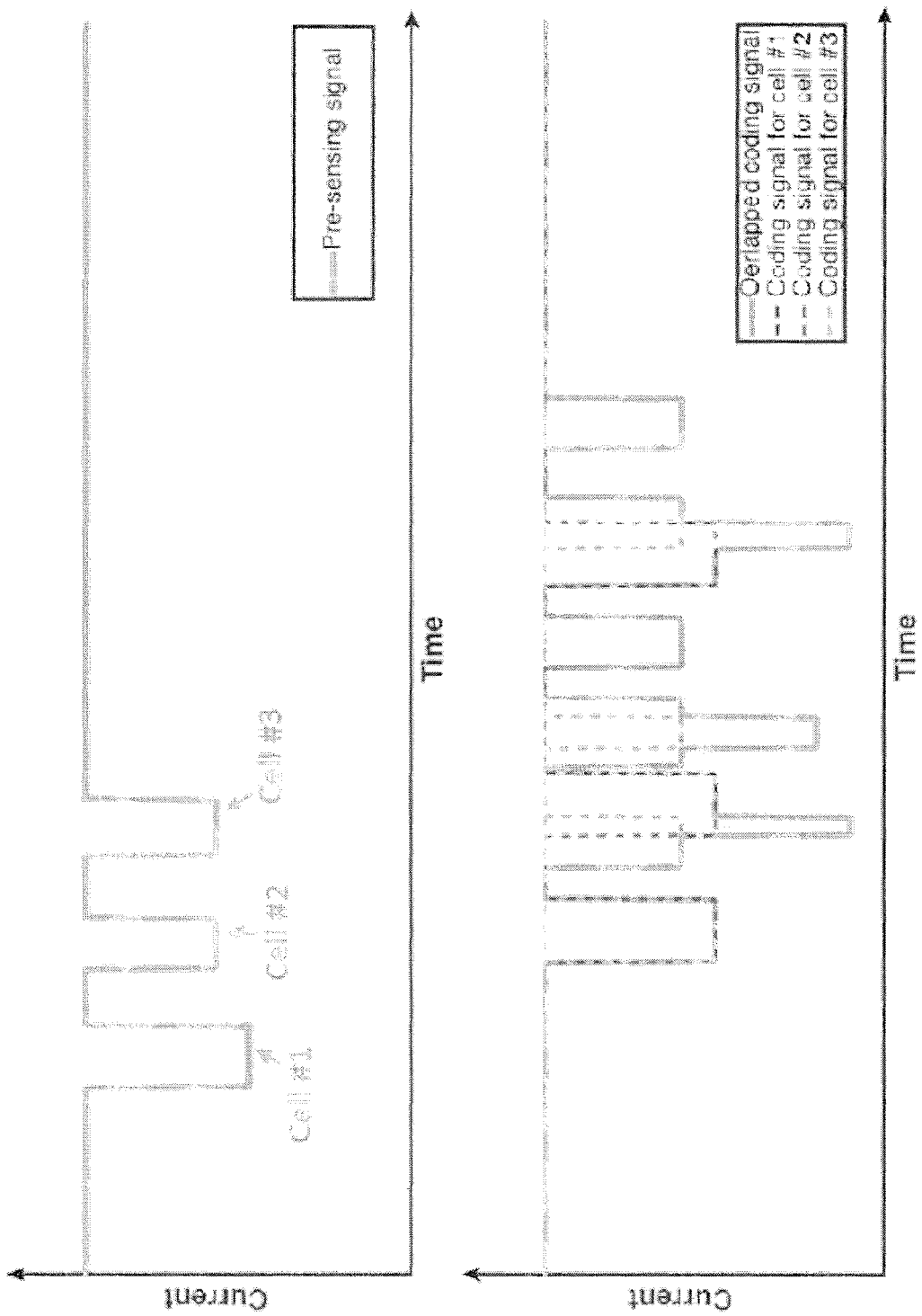
Figure 79C:
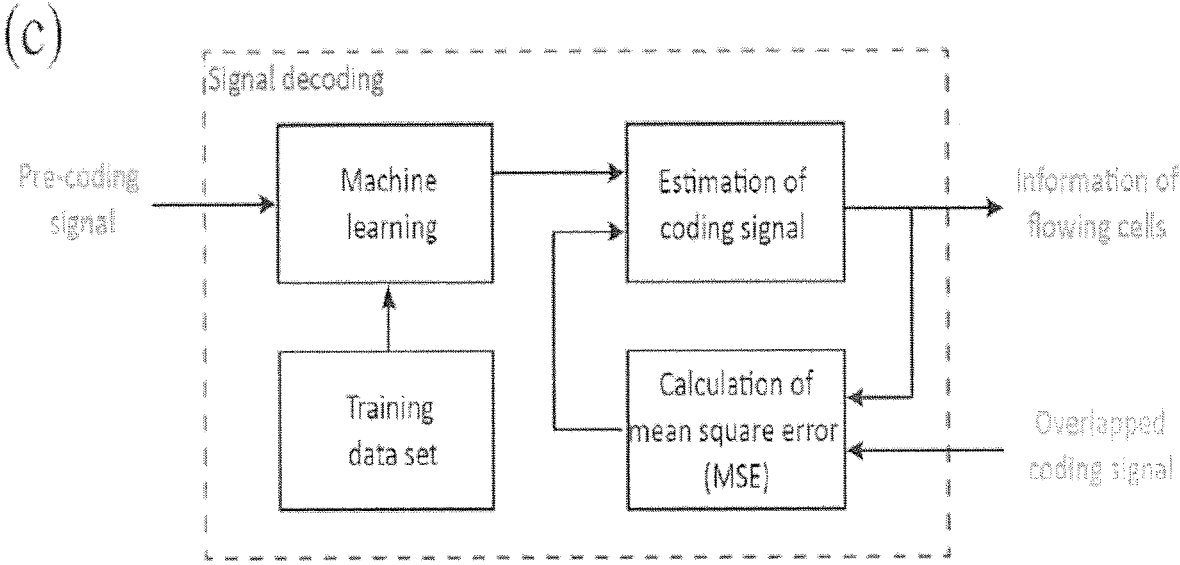

The detection scheme can include a pre-coding sensor (or electrode) prior to (or upflow) the coding sensor (or coding electrodes) (FIG. 79A). The pre-coding sensor can be a resistive pulse sensor composed of 2 co-planar electrodes. A signal peak can be generated when the particle passes the electrodes (FIG. 79B). The coding sensor (or section) can be composed of a series of electrode (or finger electrodes). By varying the arrangement of the electrode pairs, the coding section can encodes each channel with a specific label. When multiple particles are passing through the device, the pre-coding sensor will generate a series of peaks, each of which stands for a particle and can be used to measure different characteristics of that particular particle including size, speed, and relative timing but not the spatial location of that particle. The code signal will be a superposition of multiple label signals. A decoding algorithm based on the aforementioned measurements from the pre-coding signal can be used to analyzed the code signal (or waveform) produced, from which the spatial information of particles can be acquired.

As previously discussed, a 10-channel, 5 bit microfluidic device to demonstrate this design was generated (FIG. 69A). In the fabricated device, three coplanar electrodes were micromachined to create the pre-coding sensor and the coding section. The pre-coding sensor was composed of a reference electrode and a precodingsensing electrode. The coding section (sensor) was composed of the same reference electrode and a coding sensing electrode. As shown in the device layout (FIG. 69A), the label for channel 1 is "11100" based on the electrode pattern.

Figure 80:
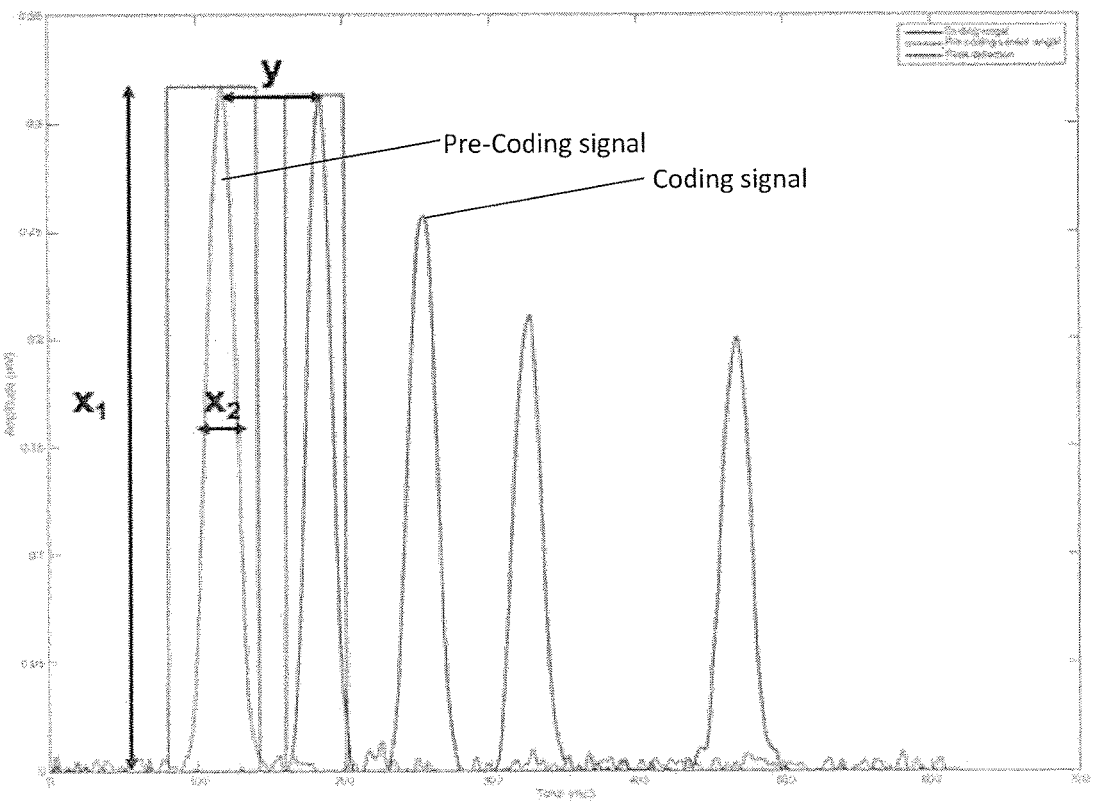
FIG. 80 shows a graph demonstrating pre-coding and coding signals and regions of the signals used to determine information on the cells passing through the channel.
Figure 81:
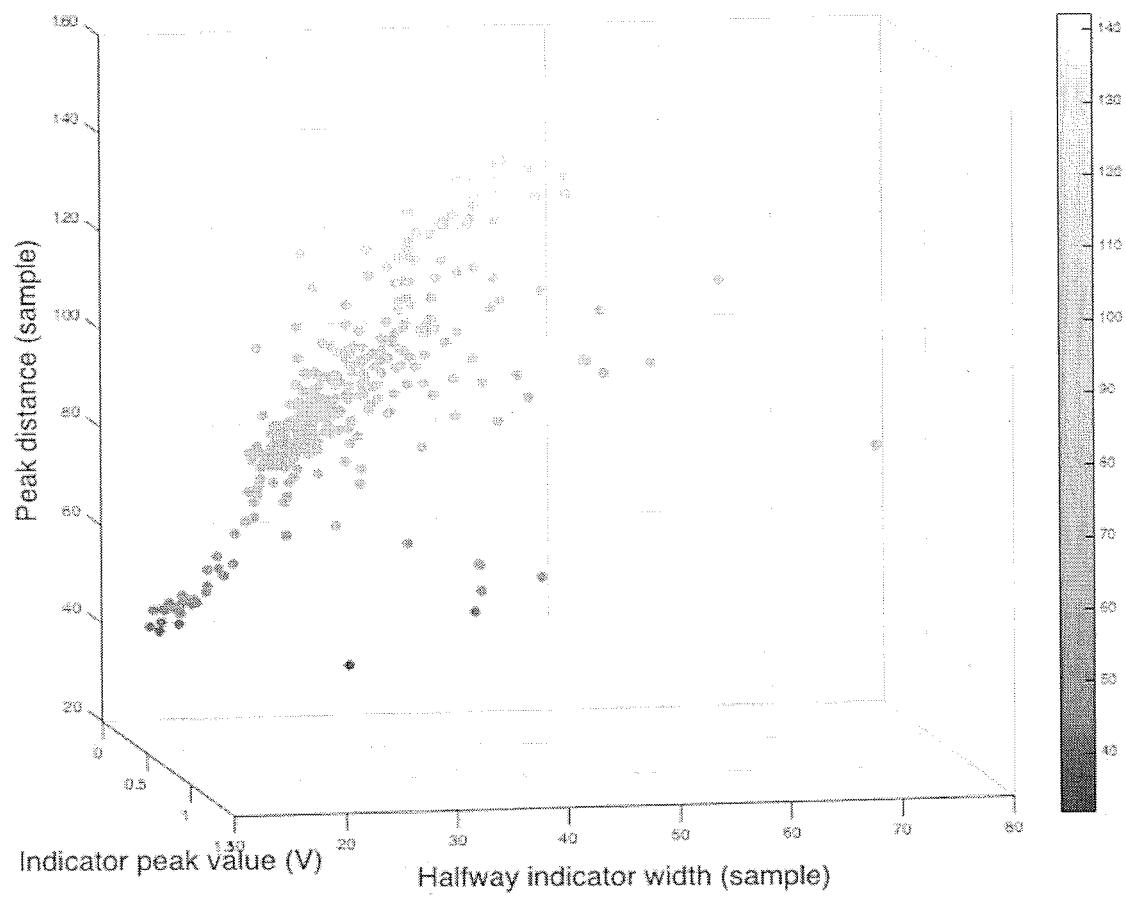
FIG. 81 shows a two-dimensional linear regression demonstrating the relationship between the peak distance, halfway peak indicator width, and indicator amplitude of the pre-coding and coding signals.

Decoding. The indicator was first used to obtain the amplitude and velocity information of the cells passing through the channels. As shown in FIG. 80. $X_1$ was used as the peak amplitude, $X_2$ was used as the width of the indicator at half amplitude, and Y was used as the distance between indicator peak and the first coding signal peak. Statistics were then used to determine the relationship between these values. FIG. 81 shows a two-dimensional linear regression demonstrating the relationship between the peak distance, halfway peak indicator width, and indicator amplitude of the pre-coding and coding signals.

Figure 82:
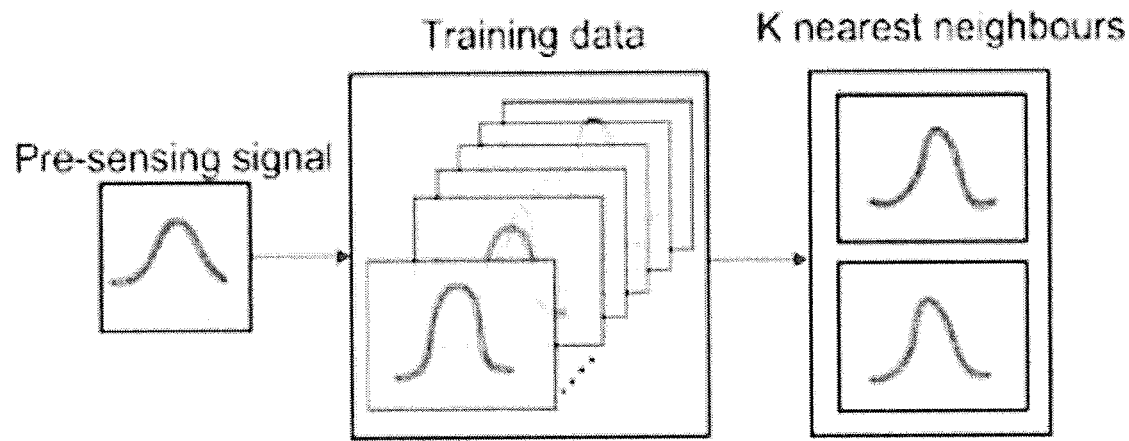
FIG. 82 shows a training dataset was aggregated using pre-sensing signals and their corresponding cell travel times between the pre-coding sensor and the first bit of coding section.
Figures 83, 84:
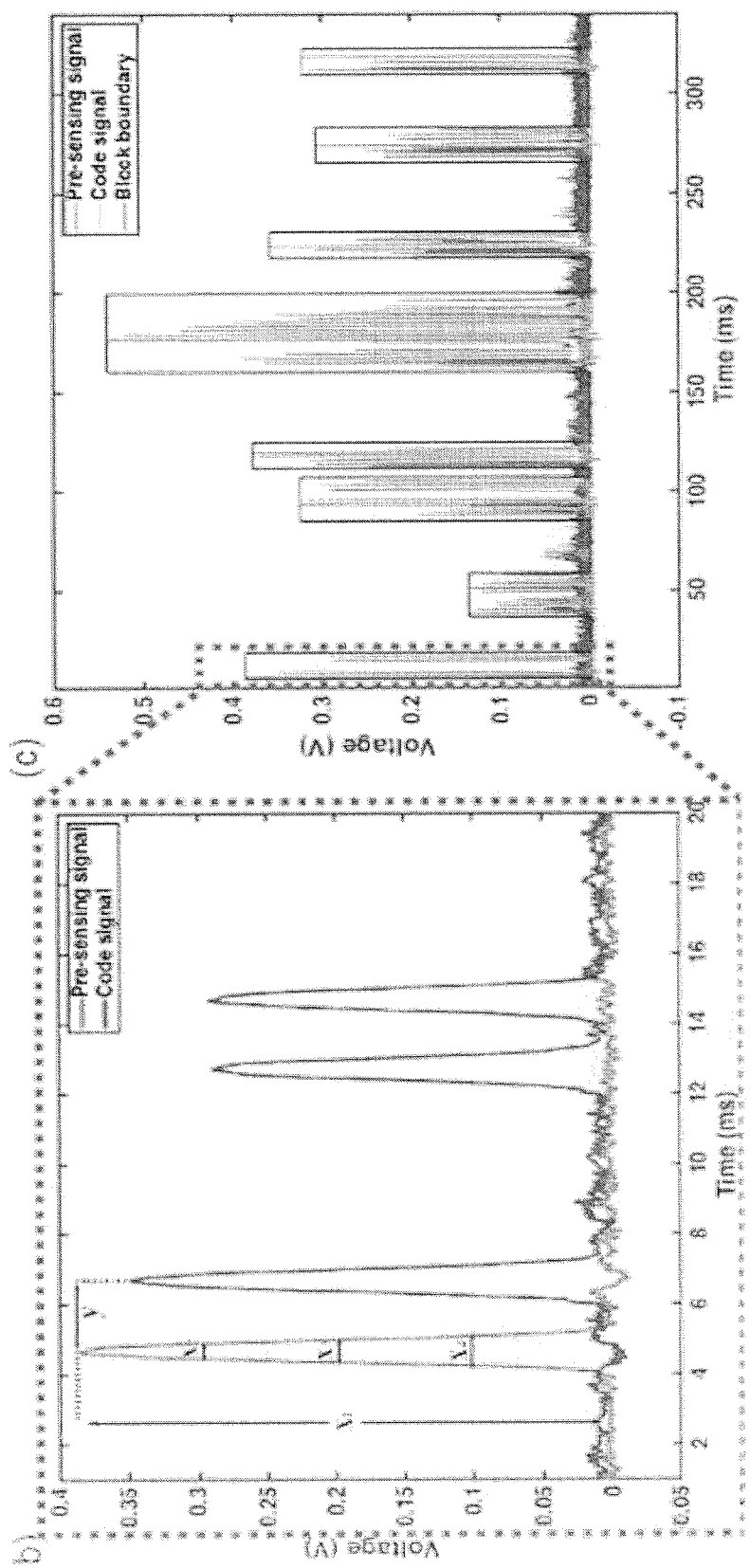
FIG. 83 shows a graph demonstrating the pre-sensing signal features, X1, X2, X3, and X4 that are input into the K-NN algorithm.
FIG. 84 shows a graph demonstrating a typical data readout from which the pre-coding signals and their corresponding coding signals can be extracted.

K-nearest neighbors (k-NN) has also been tried for analysis. Using the k-NN algorithm, we developed a model that predicts cell speed using the features of the resistive pulse signal it induces on the pre-sensing channel. FIG. 82 shows a training dataset was aggregated using pre-sensing signals and their corresponding cell travel times between the pre-coding sensor and the first bit of coding section. The algorithm learns the relationship between the pre-sensing signal's features and the cell travel time. It will then be able to predict cell travel time given a test pre-sensing signal using the relationship it had learned from the training dataset. This prediction is an average of a certain number of cell speed values that correspond to pre-sensing signals that most resemble the test pre-sensing signal—also known as its nearest neighbors. The number of nearest neighbors used is denoted by k, and the optimum value for this parameter can be found. FIG. 83 shows a graph demonstrating the pre-sensing signal features, X1, X2, X3, and X4 that are input into the K-NN algorithm. They represent the peak amplitude, and the width (time) of the peak at %, ½, and ¼ of the amplitude, respectively. Y represents the cell travel time between the pre-coding sensor and the first bit of coding section. FIG. 84 shows a graph demonstrating a typical data readout from which the pre-coding signals and their corresponding coding signals can be extracted.

Figure 85:
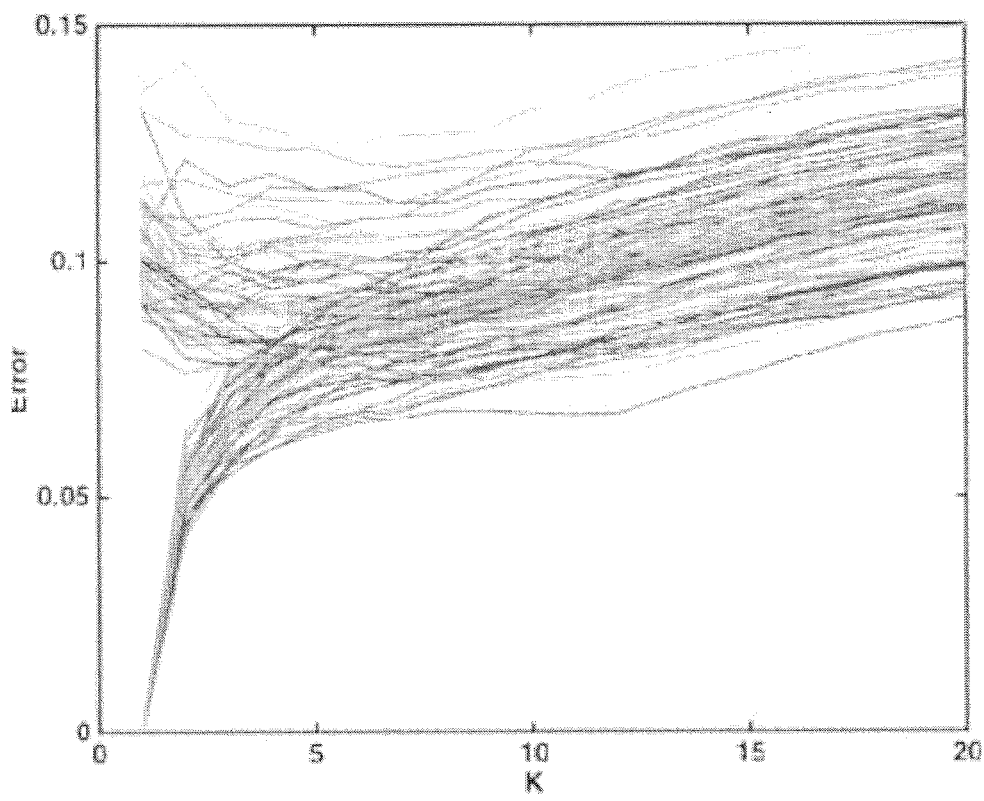
FIG. 85 shows a graph demonstrating the results of repeated random sub-sampling validation to find the best k.
Figure 86:
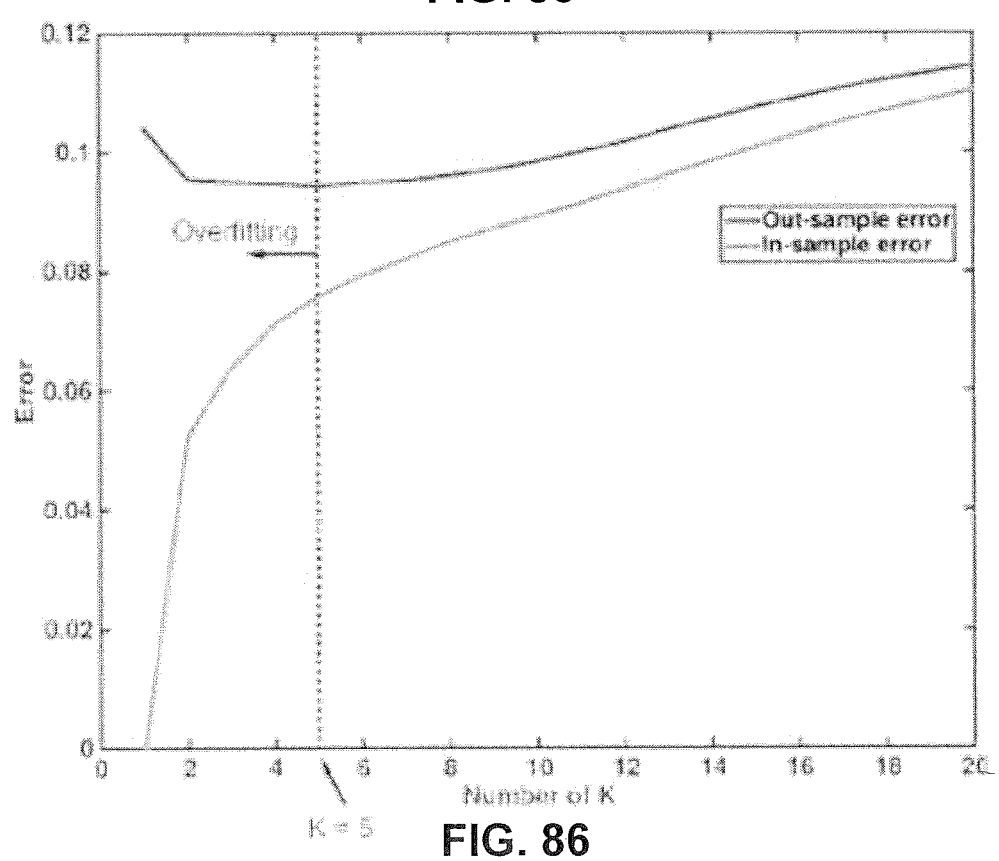
FIG. 86 shows a graph demonstrating the average error values of each of plotline groups (upper and lower).
Figure 87:
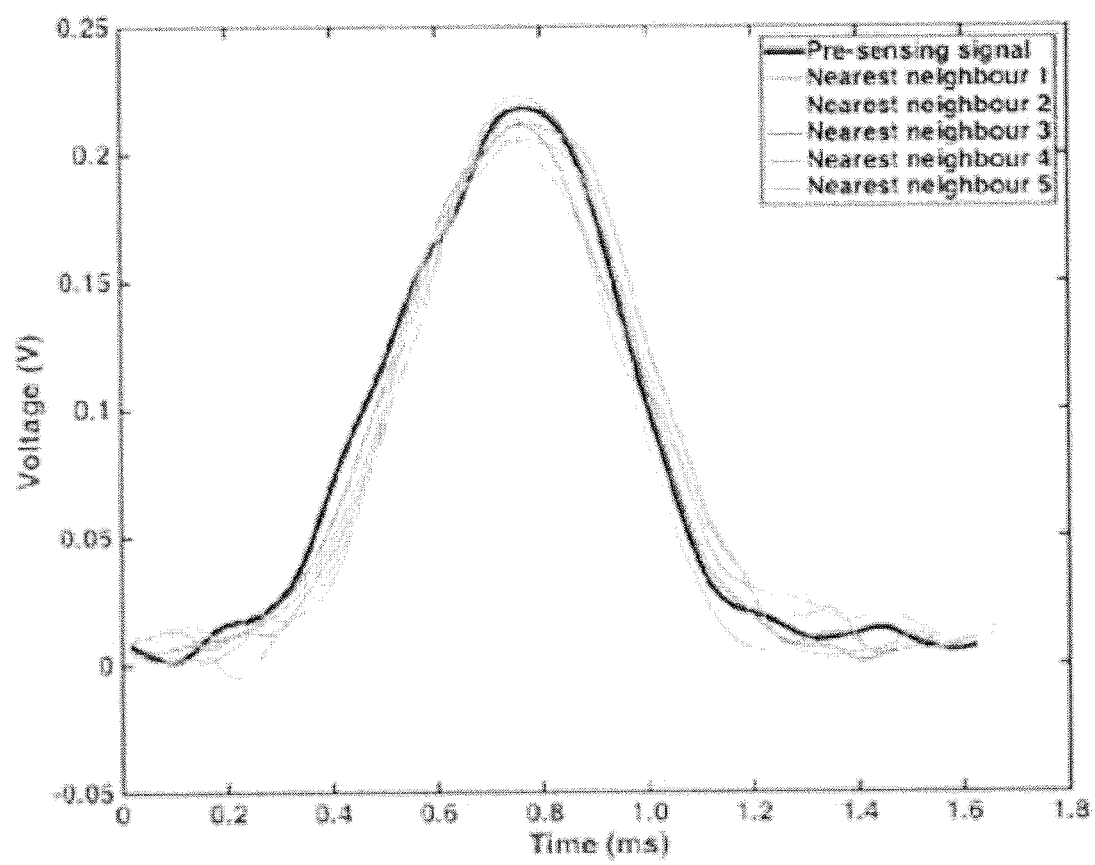
FIG. 87 shows a graph demonstrating a pre-sensing signal plotted alongside the 5 nearest neighbors produced by the k-NN algorithm.

FIG. 85 shows graphs demonstrating the results of repeated random sub-sampling validation to find the best k. The original training dataset was randomly split into two equally populous subsets; a training and a test subset. The first evaluation was done solely using the training subset and makes up the lower group of plotlines. Each plot line in this group represents the error between a single sample's cell travel time and the average of cell travel times of an incremented number of the single sample's nearest neighbors i.e., k. This error vs. number of nearest neighbors plot was repeated for all members of the training subset. The second evaluation involved both the test and training subsets and makes up the upper group of plotlines. The sole difference in this evaluation is that the single sample selection was made from the test subset instead of the training subset. FIG. 86 shows a graph demonstrating the average error values of each of plotline groups (upper and lower). FIG. 87 shows a graph demonstrating a pre-sensing signal plotted alongside the 5 nearest neighbors produced by the k-NN algorithm.

Figure 88:
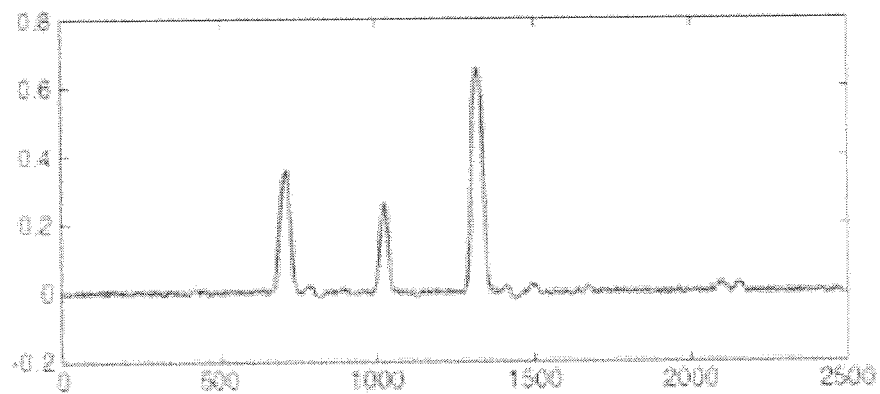
FIG. 88 shows graphs demonstrating the pre-sensing and coding signals.
Figure 88:
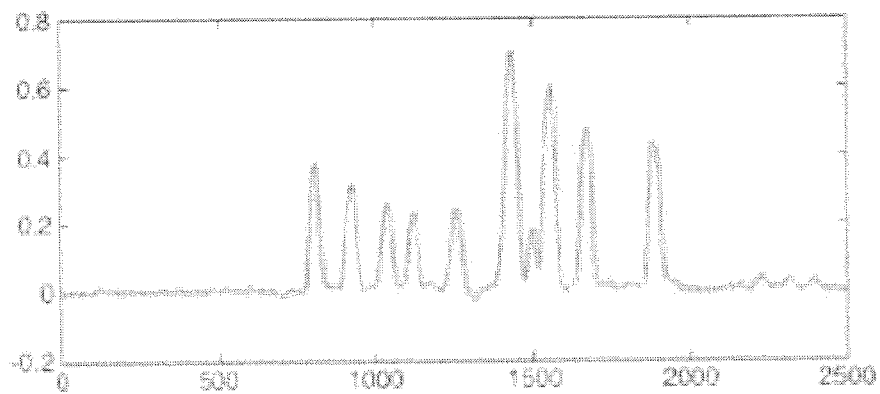
Figure 89:
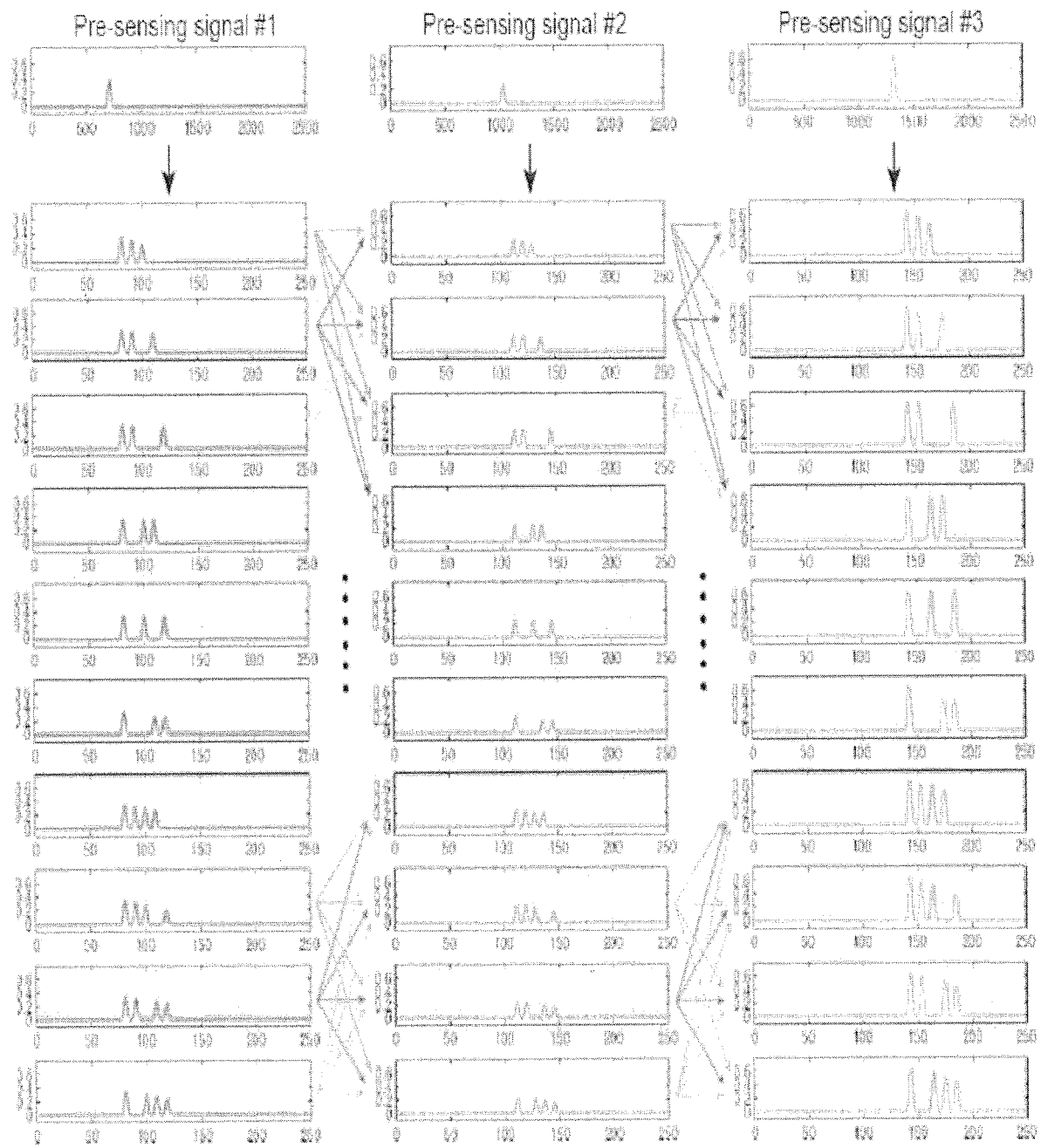
FIG. 89 shows graphs demonstrating the processing of each indicator.
Figure 90:
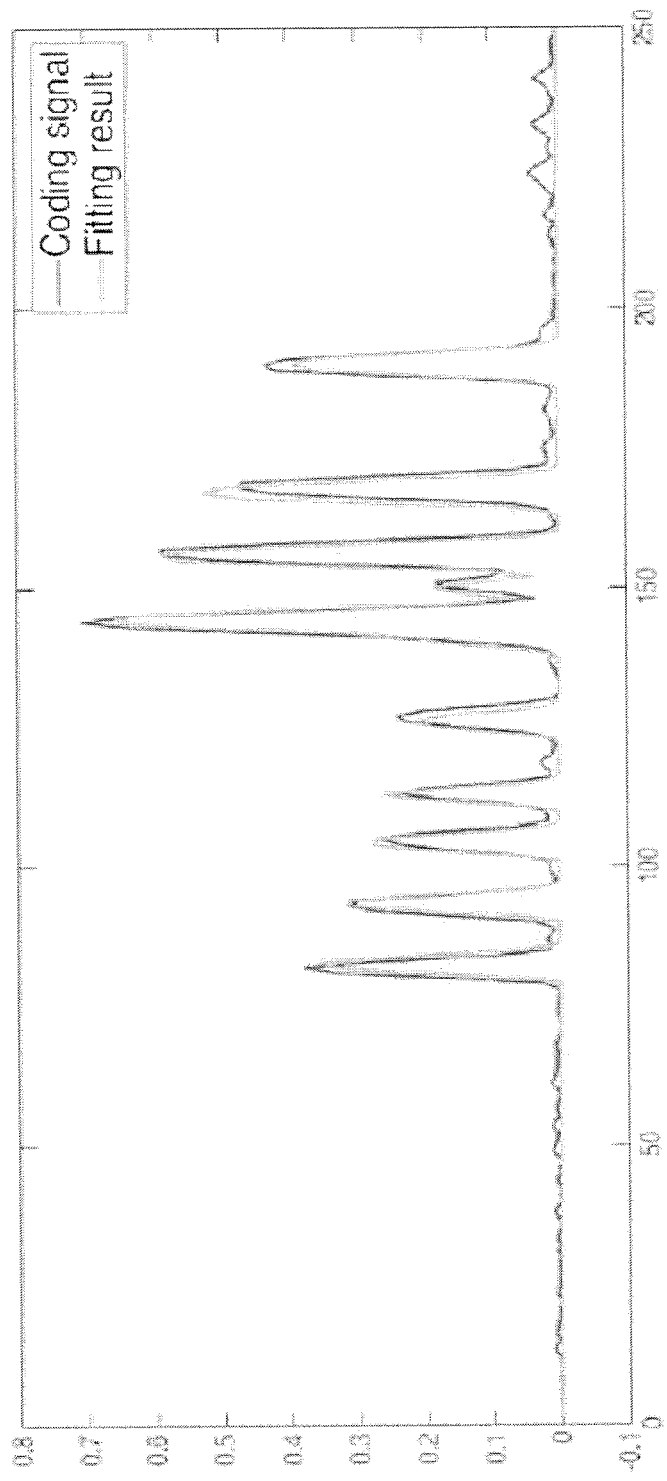
FIG. 90 shows a graph demonstrating the coding signal and the fitting result.

FIGS. 88-90 demonstrate the decoding of a 3-cell overlapping signal. Three indicators were identified from the signals. Each indicator will go through the KNN algorithm. After getting the cell speed for each indicator, all the term possibilities for each indicator were generated based on the speed and the signal templates. These possibilities were be combined with each other to find the best solution for the code signal. Minimum mean square error was used to find the best matching signal. Then the spatial information for each indicator was known.

I claim:

1. A microfluidic device comprising:
a first coded fluid path comprising a first sensor configured to generate a first output code corresponding to the first coded fluid path based upon a first sensed distortion in a fluid flowing along the first coded fluid path over the first sensor and a second coded fluid path comprising a second sensor configured to generate a second output code corresponding to the second coded fluid path based upon a second sensed distortion in a fluid flowing along the second coded fluid path over the second sensor;
a positive electrode and a negative electrode;
wherein the first sensor and second sensor each comprises a first set of positive electrode fingers connected to the positive electrode, a second set of negative electrode fingers connected to the negative electrode, wherein the positive electrode fingers and negative electrode fingers, are coplanar and arranged across the coded fluid path in a coded pattern, and wherein each finger of the positive and negative electrode fingers are separated from each other by a distance greater than zero;
wherein the coded pattern of the positive electrode fingers and negative electrode fingers is unique for each sensor; and
wherein the first output code and the second output code are and are transmitted in a single electrical signal and are mathematically distinguishable.

2. The device of claim 1, wherein the first sensed distortion is generated by a particle in the fluid flowing along the fluid path.

3. The device of claim 1, wherein the first electrode and the second electrode are affixed on opposite sides of the coded fluid path.

4. The device of claim 1, wherein the distance between electrode fingers is uniform.

5. The device of claim 1, wherein the distance between electrode fingers not uniform.

6. The device of claim 1, wherein the distance between electrode fingers is about the size of the particle being analyzed.

7. The device of claim 1, wherein at least one of the electrode fingers is rectangular.

8. The device of claim 1, wherein at least one of the electrode fingers is not rectangular.

9. The device of claim 1, wherein all the electrode fingers are uniform in width.

10. The device of claim 1, wherein the electrode fingers are not uniform in width.

11. A method comprising:
applying a fluid sample to the device of claim 1;
moving the sample through the coded fluid paths;
collecting output signals from the sensors representing overlapping output codes;

decoding the overlapping output codes to identify the output codes for each sensor; and determining the presence of a particle in a fluid sample in the coded fluid paths from the output codes.

12. The microfluidic device of claim 1, further comprising a neutral electrode, wherein the first sensor and second sensor each comprises a third set of reference electrodes connected to the neutral electrode, wherein the positive electrode fingers, negative electrode fingers, and reference electrode fingers are coplanar and arranged across the coded fluid path in a coded pattern, wherein each finger of the positive, negative, and reference electrode fingers are separated from any other finger by a distance greater than zero, wherein the coded pattern of the positive electrode fingers, negative electrode fingers, and reference electrode fingers is distinct for each sensor.

13. The device of claim 12, wherein the third electrode fingers are arranged between each first electrode finger and second electrode finger.

\* \* \* \* \*